United States Patent
Dahn et al.

(10) Patent No.: US 12,100,812 B2
(45) Date of Patent: Sep. 24, 2024

(54) BATTERY SYSTEMS BASED ON TWO-ADDITIVE ELECTROLYTE SYSTEM

(71) Applicant: Tesla Motors Canada ULC, North York (CA)

(72) Inventors: Jeffery R. Dahn, Halifax (CA); Jing Li, Halifax (CA); Stephen Laurence Glazier, Halifax (CA)

(73) Assignees: Tesla, Inc., Austin, TX (US); Panasonic Holdings Corporation, Osaka (JP)

( * ) Notice: Subject to any disclaimer, the term of this patent is extended or adjusted under 35 U.S.C. 154(b) by 0 days.

(21) Appl. No.: 17/073,176

(22) Filed: Oct. 16, 2020

(65) Prior Publication Data

US 2021/0175547 A1 Jun. 10, 2021

Related U.S. Application Data

(63) Continuation of application No. 15/663,976, filed on Jul. 31, 2017, now abandoned.

(51) Int. Cl.
| | |
|---|---|
| *H01M 10/0569* | (2010.01) |
| *H01M 4/50* | (2010.01) |
| *H01M 10/0525* | (2010.01) |
| *H01M 10/0567* | (2010.01) |
| *H01M 10/0568* | (2010.01) |

(52) U.S. Cl.
CPC ....... *H01M 10/0569* (2013.01); *H01M 4/502* (2013.01); *H01M 10/0525* (2013.01); *H01M 10/0567* (2013.01); *H01M 10/0568* (2013.01); *H01M 2220/20* (2013.01); *H01M 2300/0037* (2013.01)

(58) Field of Classification Search
CPC ..................................... H01M 10/0566–0569
See application file for complete search history.

(56) References Cited

U.S. PATENT DOCUMENTS

| | | |
|---|---|---|
| 9,281,541 B2 | 3/2016 | Tokuda et al. |
| 9,608,290 B2 | 3/2017 | Lim et al. |
| 2012/0258366 A1 | 10/2012 | Yu |
| 2013/0095392 A1 | 4/2013 | Shin et al. |

(Continued)

FOREIGN PATENT DOCUMENTS

| | | |
|---|---|---|
| CN | 102484284 | 5/2012 |
| CN | 103339784 | 10/2013 |

(Continued)

OTHER PUBLICATIONS

Dell'anna, et al.; Pollen discrimination and classification by Fourier transform infrared {FT-IR) microspectroscopy and machine learning; Anal Bioanal Chem 394; 2009; pp. 1443-1452.

(Continued)

*Primary Examiner* — Stephan J Essex
(74) *Attorney, Agent, or Firm* — Knobbe Martens Olson & Bear, LLP

(57) ABSTRACT

Improved battery systems have been developed for lithium-ion based batteries. The improved battery systems consist of two-additive mixtures in an electrolyte solvent that is a carbonate solvent, an organic solvent, a non-aqueous solvent, and/or methyl acetate. The positive electrode of the improved battery systems may be formed from lithium nickel manganese cobalt compounds, and the negative electrode of the improved battery system may be formed from natural or artificial graphite.

16 Claims, 36 Drawing Sheets

(56) References Cited

U.S. PATENT DOCUMENTS

| | | | |
|---|---|---|---|
| 2013/0224578 | A1 | 8/2013 | Sawa et al. |
| 2013/0260261 | A1 | 10/2013 | Kotani et al. |
| 2014/0038062 | A1 | 2/2014 | Kawakami |
| 2014/0080010 | A1 | 3/2014 | Tode et al. |
| 2014/0295219 | A1 | 10/2014 | Bhat et al. |
| 2015/0140446 | A1 | 5/2015 | Li et al. |
| 2015/0221977 | A1 | 8/2015 | Hallac et al. |
| 2015/0288033 | A1 | 10/2015 | Lee et al. |
| 2015/0340736 | A1 | 11/2015 | Kim et al. |
| 2016/0149263 | A1 | 5/2016 | Hallac et al. |
| 2016/0268633 | A1 | 9/2016 | Schofield et al. |
| 2017/0025706 | A1 | 1/2017 | Dahn et al. |
| 2017/0133675 | A1 | 5/2017 | Zhu et al. |
| 2018/0114651 | A1 | 4/2018 | Shimamoto et al. |
| 2020/0251769 | A1 | 8/2020 | Ma |

FOREIGN PATENT DOCUMENTS

| | | |
|---|---|---|
| CN | 104737354 | 6/2015 |
| CN | 104810551 | 7/2015 |
| CN | 105591150 | 5/2016 |
| CN | 105977525 | 9/2016 |
| CN | 106920992 | 7/2017 |
| EP | 2 144 321 | 1/2010 |
| EP | 2 573 855 | 3/2013 |
| EP | 3 098 882 | 11/2016 |
| JP | 2006-172775 | 6/2006 |
| JP | 2007-011762 | 1/2007 |
| JP | 2007-141830 | 6/2007 |
| JP | 2007-173180 | 7/2007 |
| JP | 2015-028875 | 2/2015 |
| JP | 2016-071998 | 5/2016 |
| JP | 2016-085838 | 5/2016 |
| JP | 2016-184579 | 10/2016 |
| KR | 2015 0095248 | 8/2015 |
| WO | WO 16/116867 | 7/2016 |
| WO | WO 16/166912 | 10/2016 |
| WO | WO 17/055282 | 4/2017 |

OTHER PUBLICATIONS

Ellis, et al.; Rapid and Quantitative Detection of the Microbial Spoilage of Meat by Fourier Transform Infrared Spectroscopy and Machine Learning; Applied and Environmental Microbiology; vol. 68, No. 6; Jun. 2002; pp. 822-2828.

Gachot, et al.; Gas Chromatography/Mass Spectrometry as a Suitable Tool for the Li-Ion Battery Electrolyte Degradation Mechanisms Study; American Chemical Society; Analytical Chemistry; vol. 83, No. 2; Jan. 15, 2011; pp. 178-485; [Published on the web Dec. 14, 2010].

Goodacre, Royston; Explanatory analysis of spectroscopic data using machine learning of simple, interpretable rules; Vibrational Spectroscopy 32; 2003; pp. 33-45.

Gueguen, et al.; Decomposition of LiPF6 in High Energy Lithium-Ion Batteries Studied with Online Electrochemical Mass Spectrometry; Journal of The Electrochemical Society; vol. 163; 2016; pp. 095-A1100.

Handel, et al.; Thermal aging of electrolytes used in lithium-ion batteries—An investigation of the impact of protic impurities and different housing materials; Journal of Power Sources 267; 2014; pp. 255-259.

Kardamakis, et al.; Linear predictive spectral coding and independent component analysis in identifying gasoline constituents using infrared spectroscopy; ScienceDirect; Chemometrics and Intelligent Laboratory Systems 89; 2007; p. 51-58.

Kim et al., Dec. 2015, A combination of lithium difluorophosphate and vinylene carbonate as reducible additives to improve cycling performance of graphite electrodes at high rates; Electrochemistry Communications, 61:121-124.

Kraft, et al.; Qualitative and quantitative investigation of organophosphates in an electrochemically and thermally created lithium hexafluorophosphate-based lithium ion battery electrolyte by a developed liquid chromatography-andem quadrupole mass spectrometry method; The Royal Society of Chemistry; vol. 6; 2016; pp. 8-17.

Kraft, et al.; Two-dimensional ion chromatography for the separation of ionic organophosphates generated in thermally decomposed lithium hexafluorophosphate-based lithium ion battery electrolytes; Journal of Chromatography I\; vol. 1409; 2015; pp. 201-209.

Monnighoff, et al.; Super critical carbon dioxide extraction of electrolyte from spent lithium ion batteries and its characterization by gas chromatography with chemical ionization; Journal of Power Sources 352; 2017; pp. 56-63.

Nowak, et al.; Review—Chemical Analysis for a Better Understanding of Aging and Degradation Mechanisms of Non-aqueous Electrolytes for Lithium Ion Batteries: Method Development, Application and Lessons Learned; Journal of the Electrochemical Society; vol. 162; 2015; pp A2500-A2508.

Wang, et al.; A Systematic Study of Electrolyte Additives in Li[Ni1/3Mn1/3Co1/3]02 {NMC)/Graphite Pouch Cells; Journal of Electrochemical Society, 161 (12) (2014); Aug. 23, 2014; pp. 818-A1827.

International Search Report and Written Opinion; International application No. PCT/IB2018/055745; Nov. 19, 2018; 14 pgs.

Bond et al., 2013, Improving precision and accuracy in coulombic efficiency measurements of li-ion batteries, Journal of the Electrochemical Society, 160(3):A521-A527.

Burns et al., 2013, Predicting and extending the lifetime of Li-ion batteries, Journal of the Electrochemical Society, 160(9):A1451-A1456.

Downie et al, 2013, The impact of electrolyte additives determined using isothermal microcalorimetry, ECS Electrochemical Letters 2(10):A106-A109.

Downie et al., 2014, Determination of the voltage dependence of parasitic heat flow in lithium ion cells using isothermal microcalorimetry, Journal of the Electrochemical Society, 161(12):A1782-A1787.

Glazier et al., 2017, Measuring the parasitic heat flow of lithium ion pouch cells containing ec-free electrolytes, Journal of the Electrochemical Society, 164(4):A567-A573.

Petibon, et al; Study of Electrolyte Components in Li Ion Cells Using Liquid-Liquid Extraction and Gas Chromatography Coupled with Mass Spectrometry; Journal of The Electrochemical Society; vol. 161; 2014; pp. 167-1\1172.

Schultz, et al.; Quantitative investigation of the decomposition of organic lithium ion battery electrolytes with LC-MS/ MS; Royal Society of Chemistry; RSC Adv.; vol. 7; 2017; pp. 27853-27862.

Schultz, et al.; Separation and Quantification of Organic Electrolyte Components in Lithium-Ion Batteries via a Developed HPLC Method; Journal of the Electrochemical Society; vol. 162; 2015; pp A629-A634.

Weber, et al.; Identification of alkylated phosphates by gas chromatography-mass spectrometric investigations with different ionization principles of a thermally aged commercial lithium ion battery electrolyte; Journal of Chromatography; vol. 1394; 2015; pp. 128-136.

WEBER; et al.; Ion and gas chromatography mass spectrometry investigations of organophosphates in lithium ion battery electrolytes by electrochemical aging at elevated cathode potentials; Journal of Power Sources 306; 2016; pp. 193-199.

Wiemers-Meyer, et al.; Mechanistic insights into lithium ion battery electrolyte degradation—a quantitative NMR study; The Royal Society of Chemistry; Phys. Chem. Chem. Phys; 2016; 18; pp. 26595-26601.

Wilken et al.; Initial stages of thermal decomposition of LiPF6-based lithium ion battery electrolytes by detailed Raman and NMR spectroscopy; The Royal Society of Chemistry; 2013; pp. 16359-16364.

BATTERY SYSTEMS BASED ON TWO-ADDITIVE ELECTROLYTE SYSTEM

CROSS-REFERENCE TO RELATED APPLICATION

This application is a continuation of, and claims priority to, U.S. patent application Ser. No. 15/663,976 entitled 'NOVEL BATTERY SYSTEMS BASED ON TWO-ADDITIVE ELECTROLYTE SYSTEMS' and filed on Jul. 31, 2017. The above-recited application are hereby incorporated herein by reference in its entirety.

TECHNICAL FIELD

The present disclosure relates to rechargeable battery systems, and more specifically to the chemistry of such systems, including operative, electrolyte additives and electrodes, for improving the properties of the rechargeable lithium-ion-battery systems.

BACKGROUND

Rechargeable batteries are an integral component of energy-storage systems for electric vehicles and for grid storage (for example, for backup power during a power outage, as part of a microgrid, etc.). Depending on the application, the energy-storage systems require different properties. Tradeoffs in the chemistry of a battery system may need to be made to create a suitable system for a particular application. For example, in automobile applications—particularly those in an electric vehicle—the ability to charge and discharge quickly is an important property of the system. An electric vehicle owner may need to quickly accelerate in traffic, which requires the ability to quickly discharge the system. Further, fast charging and discharging places demands on the system, so the components of the system may also need to be chosen to provide sufficient lifetime under such operation conditions.

Electrolyte additives have been shown to be operative and increase the lifetime and performance of Li-ion-based batteries. For example, in J. C. Burns et al., Journal of the Electrochemical Society, 160, A1451 (2013), five proprietary, undisclosed electrolyte additives were shown to increase cycle life compared to an electrolyte system with no or only one additive. Other studies have focused on performance gains from electrolyte systems containing three or four additives as described in US20170025706. However, researchers typically do not understand the interaction between different additives that allow them to work together synergistically with the electrolyte and specific positive and negative electrodes. Thus, the identity of certain systems is often based on trial and error and cannot be predicted beforehand.

Prior studies have not identified two-additive electrolyte systems that can be combined into a lithium-ion battery system to yield a robust system with sufficient properties for grid or automobile applications. As discussed in US20170025706, two-additive systems studied (for example, 2% VC+1% allyl methanesulfonate and 2% PES+1% TTSPi) typically performed worse than the three- and four-additive electrolyte systems. (See, e.g., US20170025706 at Tables 1 and 2.) US20170025706 discloses that a third compound, often tris(-trimethly-silyl)-phosphate (TTSP) or tris(-trimethyl-silyl)-phosphite (TTSPi), was necessary in concentrations of between 0.25-3 wt % to produce a robust lithium-ion-battery system. (See, e.g., US20170025706 at ¶72.) However, because additives can be expensive and difficult to include within Li-ion batteries on a manufacture scale, more simple, yet effective battery systems are needed, including those with fewer additives.

SUMMARY

This disclosure covers novel battery systems with fewer operative, electrolyte additives that may be used in different energy storage applications, for example, in vehicle and grid-storage. More specifically, this disclosure includes two-additive electrolyte systems that enhance performance and lifetime of Li-ion batteries, while reducing costs from other systems that rely on more additives. This disclosure also discloses effective positive electrodes and negative electrodes that work with the disclosed two-additive electrolyte systems to provide further systematic enhancements.

Two-operative, additive electrolyte systems disclosed include 1) vinylene carbonate (VC) combined with 1,3,2-dioxathiolane-2,2-dioxide (DTD, also known as ethylene sulfate) or another sulfur-containing additive (such as methylene methane disulfonate, trimethylene sulfate, 3-hydroxy-propanesulfonic acid γ-sultone, glycol sulfite, or another sulfur-containing additive), 2) fluoro ethylene carbonate (FEC) combined with DTD or another sulfur-containing additive, and 3) prop-1-ene-1,3-sultone (PES) combined with DTD or another sulfur-containing additive. Further, because VC and FEC provide similar improvements (and are believed to function similarly), a mixture of VC and FEC may be considered as only a single operative electrolyte. That is, another disclosed two-operative, additive electrolyte system includes a mixture of VC and FEC combined with DTD or another sulfur-containing additive. When used as part of a greater battery system (which includes the electrolyte, electrolyte solvent, positive electrode, and negative electrode), these two-operative, additive electrolyte systems produce desirable properties for energy storage applications, including in vehicle and grid applications.

More specifically, lithium nickel manganese cobalt oxide (NMC) positive electrodes, a graphite negative electrodes, a lithium salt dissolved in an organic or non-aqueous solvent, which may include methyl acetate (MA), and two additives to form a battery system with desirable properties for different applications. The electrolyte solvent may be the following solvents alone or in combination: ethylene carbonate (EC), ethyl methyl carbonate (EMC), methyl acetate, propylene carbonate, dimethyl carbonate, diethyl carbonate, another carbonate solvent (cyclic or acyclic), another organic solvent, and/or another non-aqueous solvent. Solvents are present in concentrations greater than the additives, typically greater than 6% by weight. The solvent may be combined with the disclosed two-additive pairs (such as VC with DTD, FEC with DTD, a mixture of VC and FEC with DTD, or another combination) to form a battery system with desirable properties for different applications. The positive electrode may be coated with a material such as aluminum oxide ($Al_2O_3$), titanium dioxide ($TiO_2$), or another coating. Further, as a cost savings, the negative electrode may be formed from natural graphite, however depending on the pricing structure, in certain instances artificial graphite is cheaper than natural graphite.

The disclosure herein is supported by experimental data that shows the symbiotic nature of the two-additive electrolyte systems and selected electrodes. Exemplary battery systems include two additives (for example, FEC, VC, or PES and DTD or another sulfur-based additive), a graphite negative electrode (either naturally occurring graphite or an artificial, synthetic graphite), an NMC positive electrode, a lithium electrolyte (formed from, for example, a lithium salt such as lithium hexafluorophosphate with chemical composition $LiPF_6$), and an organic or non-aqueous solvent.

BRIEF DESCRIPTION OF THE DRAWINGS

FIG. 4A illustrates time normalized coulombic inefficiency per hour (CIE/h) versus cycle number for electrolyte systems including 1% DTD, 2% VC, and 2% VC+1% DTD.

FIG. 4B illustrates coulombic efficiency (CE) versus cycle number for electrolyte systems including 1% DTD, 2% VC, and 2% VC+1% DTD.

FIG. 4C illustrates the capacity of the charge endpoint plotted versus cycle number for number for electrolyte systems including 1% DTD, 2% VC, and 2% VC+1% DTD.

FIG. 4D illustrates the discharge capacity verses cycle number for electrolyte systems including 1% DTD, 2% VC, and 2% VC+1% DTD.

FIG. 4E illustrates the change in open circuit voltage versus cycle number for electrolyte systems including 1% DTD, 2% VC, and 2% VC+1% DTD.

FIG. 4F illustrates time normalized coulombic inefficiency per hour (CIE/h) versus cycle number for electrolyte systems including 1% DTD, 2% FEC, and 2% FEC+1% DTD.

FIG. 4G illustrates coulombic efficiency (CE) versus cycle number for electrolyte systems including 1% DTD, 2% FEC, and 2% FEC+1% DTD.

FIG. 4H illustrates the capacity of the charge endpoint plotted versus cycle number for electrolyte systems including 1% DTD, 2% FEC, and 2% FEC+1% DTD.

FIG. 4I illustrates the discharge capacity verses cycle number for electrolyte systems including 1% DTD, 2% FEC, and 2% FEC+1% DTD.

FIG. 4J illustrates the difference between the average charge voltage and the average charge voltage (Delta V) versus cycle number for electrolyte systems including 1% DTD, 2% FEC, and 2% FEC+1% DTD.

FIG. 5A illustrates the average coulombic inefficiency per hour for the last three cycles of data generated during the experiments shown in FIG. 4.

FIG. 5B illustrates the average fractional slippage for the last three cycles of data generated during the experiments shown in FIG. 4.

FIG. 5C illustrates the average fractional fade for the last three cycles of data generated during the experiments shown in FIG. 4.

FIG. 6A illustrates capacity versus cycle number for electrolyte systems including 1% DTD, 2% FEC, 2% FEC+1% DTD, 2% VC, and 2% VC+1% DTD, cycling between 3.0 V and 4.2 V.

FIG. 6B illustrates normalized capacity versus cycle number for electrolyte systems including 1% DTD, 2% FEC, 2% FEC+1% DTD, 2% VC, and 2% VC+1% DTD, cycling between 3.0 V and 4.2 V.

FIG. 6C illustrates voltage hysteresis (difference between the average charge voltage and the average charge voltage) versus cycle number for electrolyte systems including 1% DTD, 2% FEC, 2% FEC+1% DTD, 2% VC, and 2% VC+1% DTD, cycling between 3.0 V and 4.2 V.

FIG. 6D illustrates capacity versus cycle number for electrolyte systems including 1% DTD, 2% FEC, 2% FEC+1% DTD, 2% VC, and 2% VC+1% DTD, cycling between 3.0 V and 4.2 V.

FIG. 6E illustrates normalized capacity versus cycle number for electrolyte systems including 1% DTD, 2% FEC, 2% FEC+1% DTD, 2% VC, and 2% VC+1% DTD, cycling between 3.0 V and 4.2 V.

FIG. 6F illustrates voltage hysteresis (difference between the average charge voltage and the average charge voltage) versus cycle number for electrolyte systems including 1% DTD, 2% FEC, 2% FEC+1% DTD, 2% VC, and 2% VC+1% DTD, cycling between 3.0 V and 4.2 V.

FIG. 7A illustrates capacity versus cycle number for electrolyte systems including 1% DTD, 2% FEC, 2% FEC+1% DTD, 2% VC, and 2% VC+1% DTD, cycling between 3.0 V and 4.3 V.

FIG. 7B illustrates normalized capacity versus cycle number for electrolyte systems including 1% DTD, 2% FEC, 2% FEC+1% DTD, 2% VC, and 2% VC+1% DTD, cycling between 3.0 V and 4.3 V.

FIG. 7C illustrates voltage hysteresis (difference between the average charge voltage and the average charge voltage) versus cycle number for electrolyte systems including 1% DTD, 2% FEC, 2% FEC+1% DTD, 2% VC, and 2% VC+1% DTD, cycling between 3.0 V and 4.3 V.

FIG. 7D illustrates capacity versus cycle number for electrolyte systems including 1% DTD, 2% FEC, 2% FEC+1% DTD, 2% VC, and 2% VC+1% DTD, cycling between 3.0 V and 4.3 V.

FIG. 7E illustrates normalized capacity versus cycle number for electrolyte systems including 1% DTD, 2% FEC, 2% FEC+1% DTD, 2% VC, and 2% VC+1% DTD, cycling between 3.0 V and 4.3 V.

FIG. 7F illustrates voltage hysteresis (difference between the average charge voltage and the average charge voltage) versus cycle number for electrolyte systems including 1% DTD, 2% FEC, 2% FEC+1% DTD, 2% VC, and 2% VC+1% DTD, cycling between 3.0 V and 4.3 V.

FIG. 8A illustrates peak capacity versus cycle number for electrolyte systems including 2% FEC, 1% FEC+1% DTD, 2% FEC+1% DTD, 1% FEC+1% MMDS, and 2% FEC+1% MMDS, cycling between 3.0 V and 4.3 V at 40° C. in a base electrolyte of 1.2M $LiPF_6$ in 30% ethylene carbonate and 70% ethyl methyl carbonate.

FIG. 8B illustrates normalized capacity versus cycle number for electrolyte systems including 2% FEC, 1% FEC+1%

DTD, 2% FEC+1% DTD, 1% FEC+1% MMDS, and 2% FEC+1% MMDS, cycling between 3.0 V and 4.3 V at 40° C. in a base electrolyte of 1.2M LiPF$_6$ in 30% ethylene carbonate and 70% ethyl methyl carbonate.

Figure 8A:
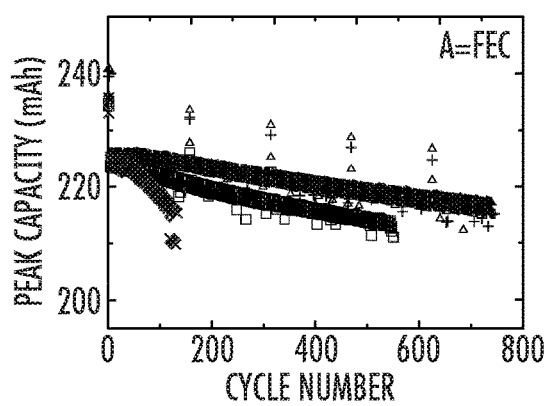
FIGS. 8A-I illustrate typical experiential data collected during cycling experiments for electrolyte compositions according to certain embodiments of the present disclosure.
Figure 8B:
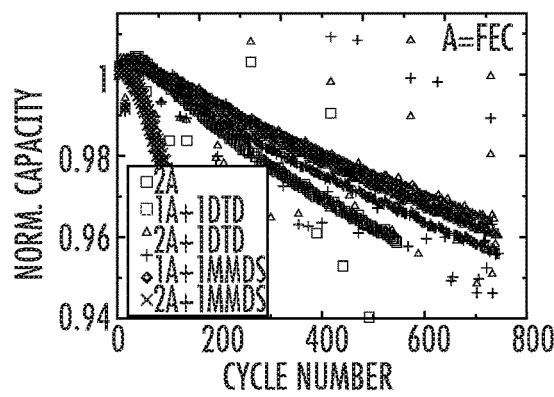
Figure 8C:
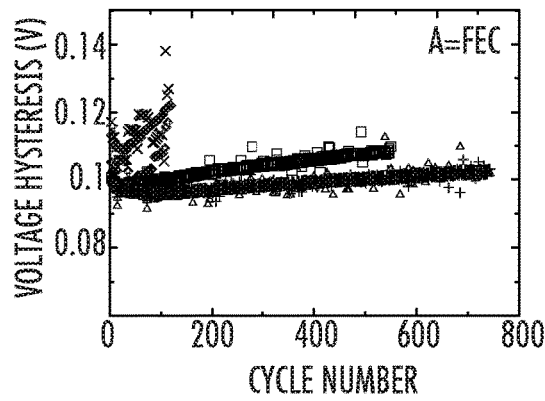

FIG. 8C illustrates voltage hysteresis (difference between the average charge voltage and the average charge voltage) for electrolyte systems including 2% FEC, 1% FEC+1% DTD, 2% FEC+1% DTD, 1% FEC+1% MMDS, and 2% FEC+1% MMDS, cycling between 3.0 V and 4.3 V at 40° C. in a base electrolyte of 1.2M LiPF$_6$ in 30% ethylene carbonate and 70% ethyl methyl carbonate.

Figure 8D:
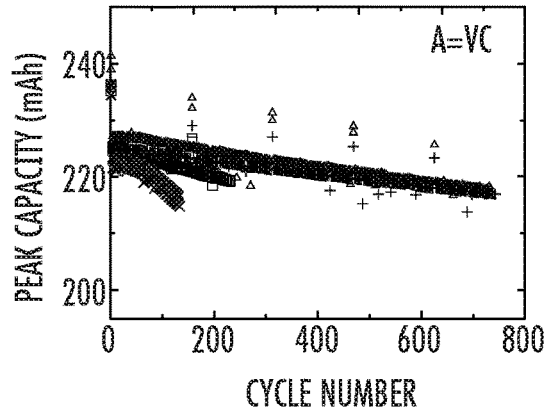

FIG. 8D illustrates peak capacity versus cycle number for electrolyte systems including 2% VC, 1% VC+1% DTD, 2% VC+1% DTD, 1% VC+1% MMDS, and 2% VC+1% MMDS, cycling between 3.0 V and 4.3 V at 40° C. in a base electrolyte of 1.2M LiPF$_6$ in 30% ethylene carbonate and 70% ethyl methyl carbonate.

Figure 8E:
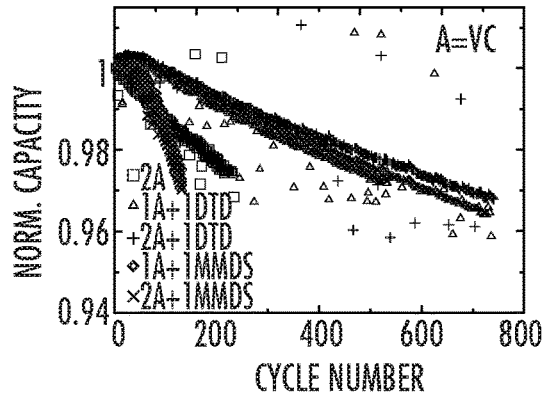

FIG. 8E illustrates normalized capacity versus cycle number for electrolyte systems including 2% VC, 1% VC+1% DTD, 2% VC+1% DTD, 1% VC+1% MMDS, and 2% VC+1% MMDS, cycling between 3.0 V and 4.3 V at 40° C. in a base electrolyte of 1.2M LiPF$_6$ in 30% ethylene carbonate and 70% ethyl methyl carbonate.

Figure 8F:
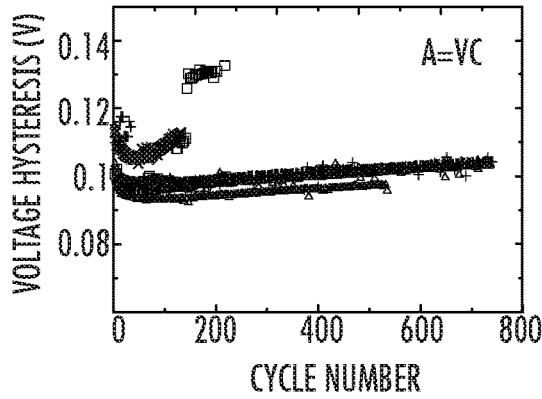

FIG. 8F illustrates voltage hysteresis (difference between the average charge voltage and the average charge voltage) for electrolyte systems including 2% FEC, 1% VC+1% DTD, 2% VC+1% DTD, 1% VC+1% MMDS, and 2% VC+1% MMDS, cycling between 3.0 V and 4.3 V at 40° C. in a base electrolyte of 1.2M LiPF$_6$ in 30% ethylene carbonate and 70% ethyl methyl carbonate by weight.

Figure 8G:
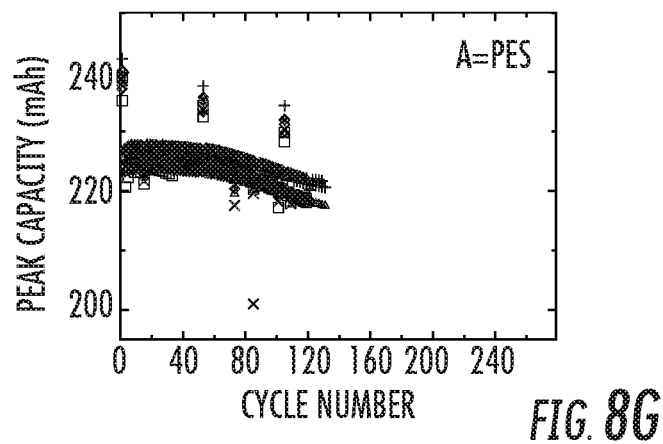

FIG. 8G illustrates peak capacity versus cycle number for electrolyte systems including 2% PES, 1% PES+1% DTD, 2% PES+1% DTD, 1% PES+1% MMDS, and 2% PES+1% MMDS, cycling between 3.0 V and 4.3 V at 40° C. in a base electrolyte of 1.2M LiPF$_6$ in 30% ethylene carbonate and 70% ethyl methyl carbonate.

Figure 8H:
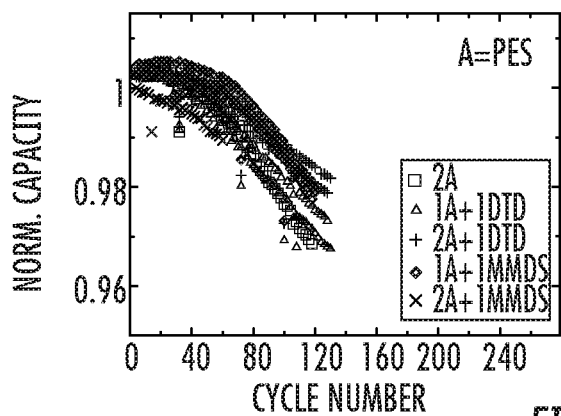

FIG. 8H illustrates normalized capacity versus cycle number for electrolyte systems including 2% PES, 1% PES+1% DTD, 2% PES+1% DTD, 1% PES+1% MMDS, and 2% PES+1% MMDS, cycling between 3.0 V and 4.3 V at 40° C. in a base electrolyte of 1.2M LiPF$_6$ in 30% ethylene carbonate and 70% ethyl methyl carbonate.

Figure 8I:
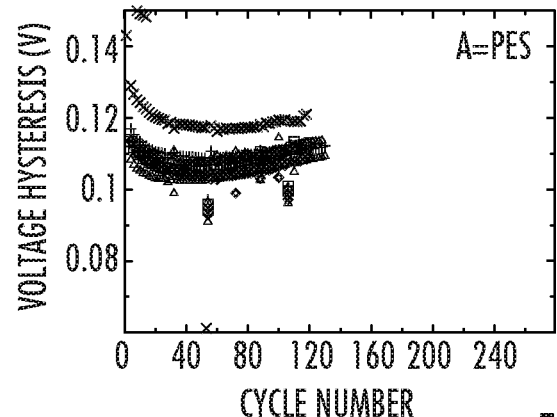

FIG. 8I illustrates voltage hysteresis (difference between the average charge voltage and the average charge voltage) for electrolyte systems including 2% FEC, 1% PES+1% DTD, 2% PES+1% DTD, 1% PES+1% MMDS, and 2% PES+1% MMDS, cycling between 3.0 V and 4.3 V at 40° C. in a base electrolyte of 1.2M LiPF$_6$ in 30% ethylene carbonate and 70% ethyl methyl carbonate.

FIGS. 9A-9I illustrate typical experimental data collected during some of the ultra-high-precision-charging experiments that show that methyl acetate can be added to electrolyte systems containing VC or FEC with DTD to increase electrolyte conductivity and lower viscosity without sacrificing much lifetime. Increasing conductivity and decreasing viscosity is important for certain applications requiring a faster rate of charge.

Figure 9A:
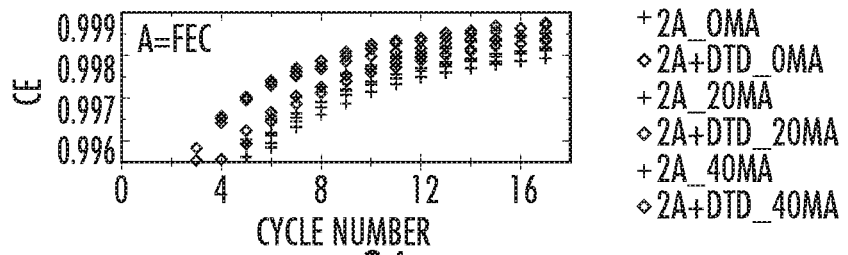

FIG. 9A illustrates typical experimental data showing coulombic efficiency (CE) versus cycle number for electrolyte systems according to certain embodiments of the present disclosure.

Figure 9B:
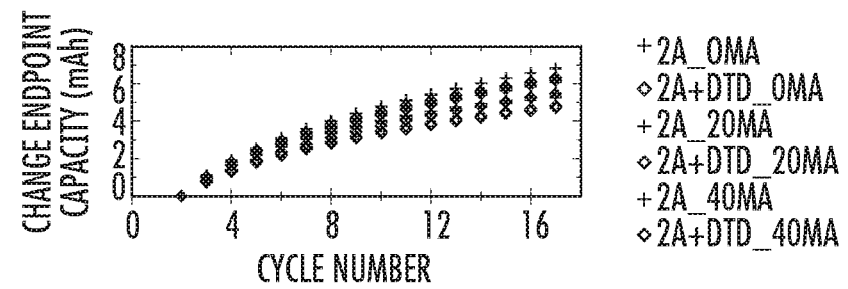

FIG. 9B illustrates typical experimental data showing the capacity of the charge endpoint plotted versus cycle number for electrolyte systems according to certain embodiments of the present disclosure.

Figure 9C:
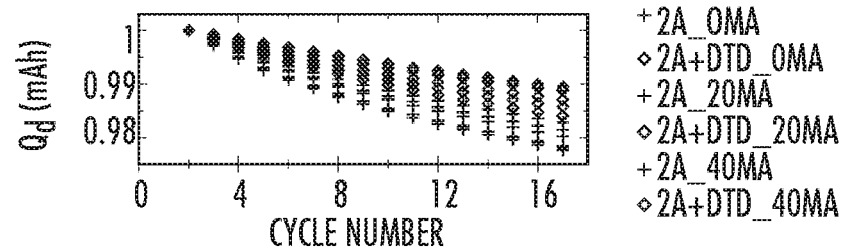

FIG. 9C illustrates typical experimental data showing the discharge capacity versus cycle number for electrolyte systems according to certain embodiments of the present disclosure.

Figure 9D:
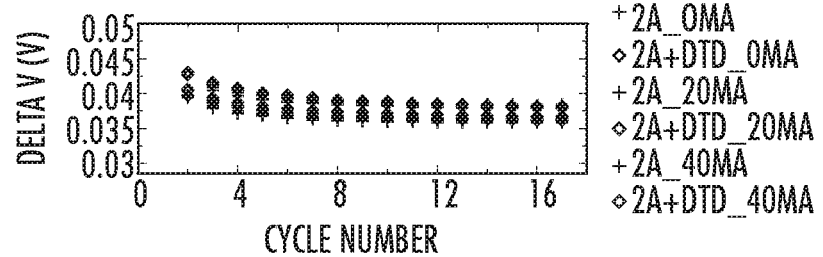

FIG. 9D illustrates typical experimental data showing the difference between the average charge voltage and the average charge voltage (Delta V) in open circuit voltage versus cycle number for electrolyte systems according to certain embodiments of the present disclosure.

Figure 9F:
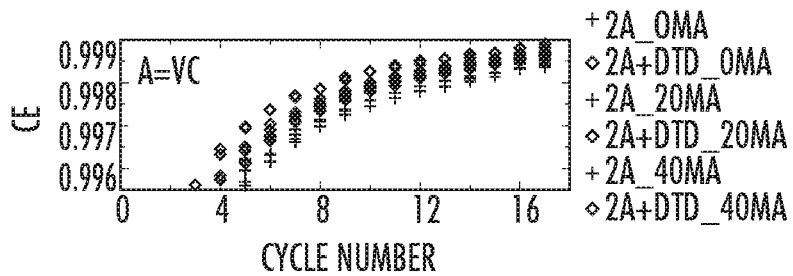

FIG. 9F illustrates typical experimental data of coulombic efficiency (CE) versus cycle number for electrolyte systems according to certain embodiments of the present disclosure.

Figure 9G:
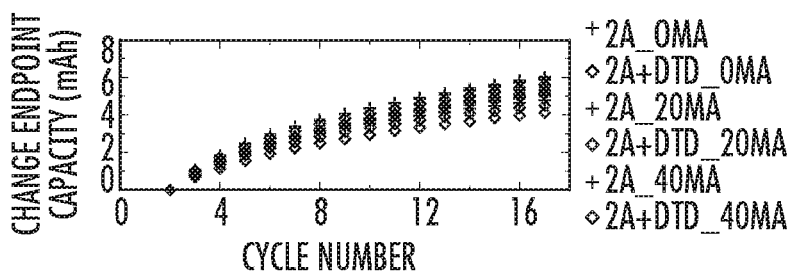

FIG. 9G illustrates typical experimental data of the capacity of the charge endpoint plotted versus cycle number for electrolyte systems according to certain embodiments of the present disclosure.

Figure 9H:
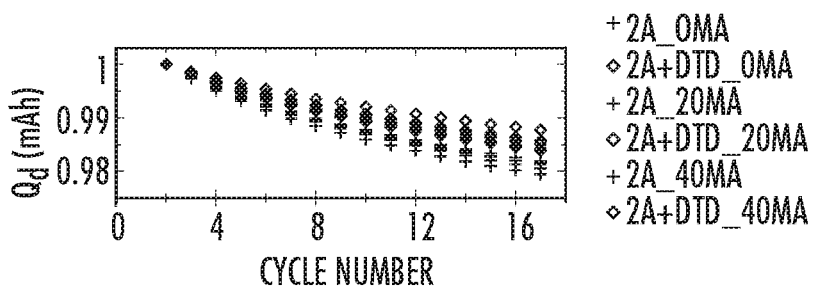

FIG. 9H illustrates typical experimental data of the discharge capacity versus cycle number for electrolyte systems according to certain embodiments of the present disclosure.

Figure 9I:
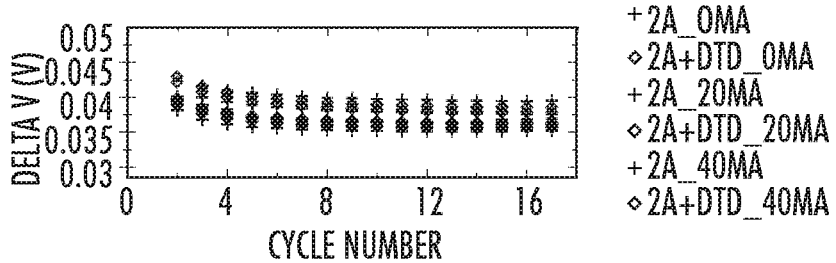

FIG. 9I illustrates typical experimental data of the difference between the average charge voltage and the average charge voltage (Delta V) versus cycle number for electrolyte systems according to certain embodiments of the present disclosure.

Figure 10A:
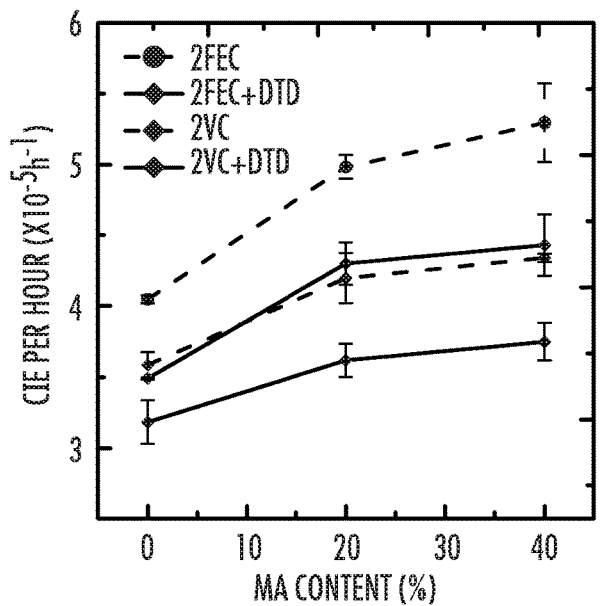
Figure 10B:
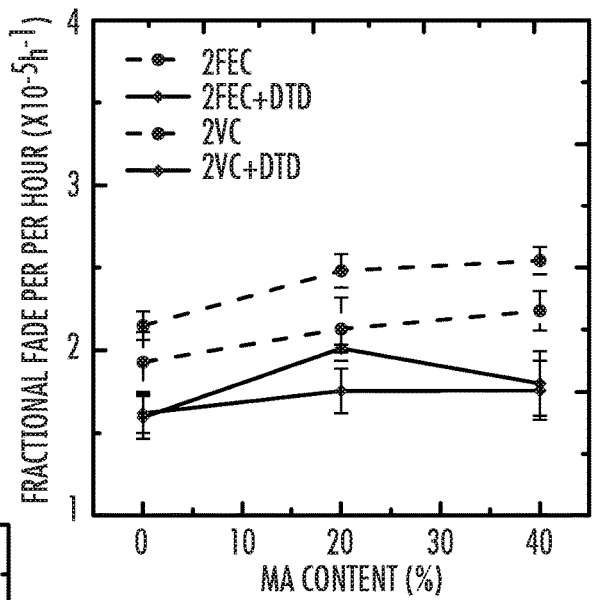
Figure 10C:
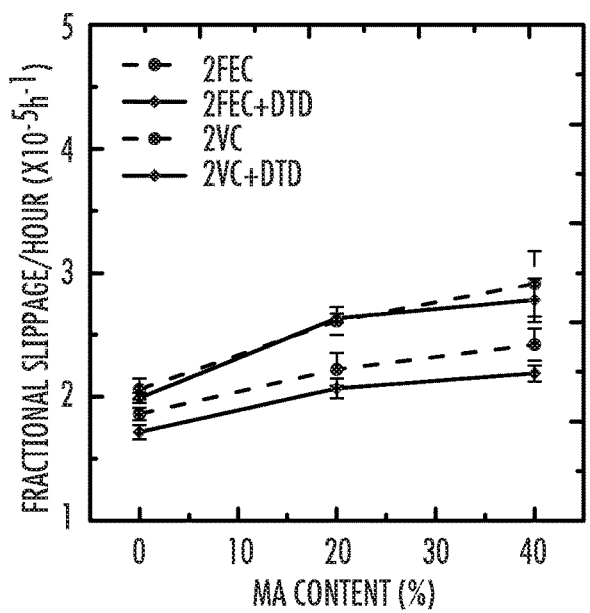

FIGS. 10A-C are plots that summarize experimental data and illustrate that as the MA content increases, the electrolyte additives VC and FEC, both alone and in the presence of DTD, still offer acceptable performance.

FIG. 10A is a plot that summarizes experimental data of time normalized CIE as a function of MA content.

FIG. 10B is a plot that summarizes experimental data of time normalized fractional fade as a function of MA content.

FIG. 10C is a plot that summarizes experimental data of time normalized fractional charge endpoint capacity slippage as a function of MA content.

Figure 11:
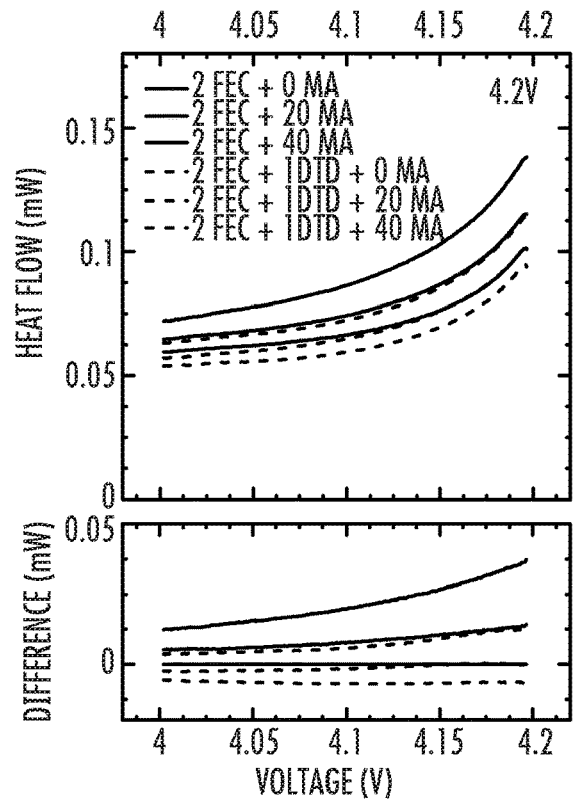

FIG. 11 is a plot that summarizes experimental data of parasitic heat flow and difference between the parasitic heat flow and that of the cell containing 2% FEC+0% MA as a function of the voltage for different electrolyte compositions that contain FEC in the voltage range of 4.0 V to 4.2 V.

Figures 12A, 12B:
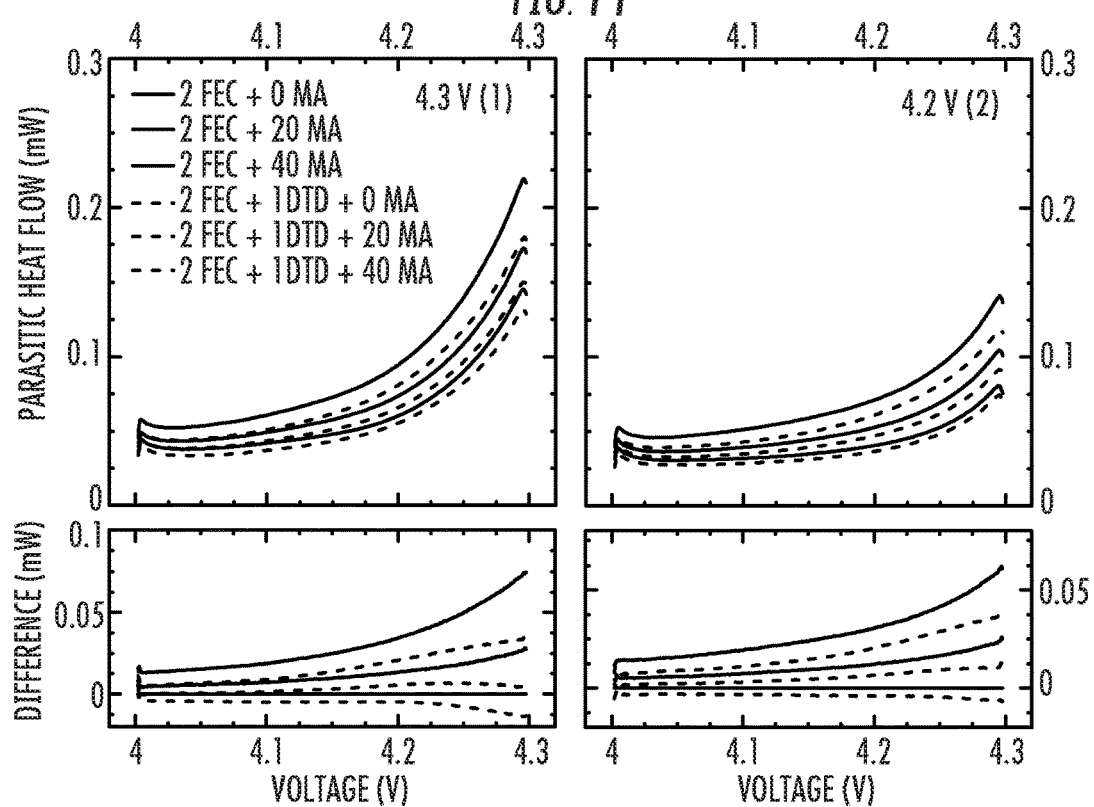

FIG. 12 A-B are plots that summarizes experimental data of parasitic heat flow and difference between the parasitic heat flow and that of the cell containing 2% FEC+0% MA as a function of the voltage for different electrolyte compositions that contain FEC in the voltage range of 4.0 V to 4.3 V. FIG. 12 A shows results for the first cycle to 4.3 V. FIG. 12B shows results for the second cycle.

Figures 13A, 13B:
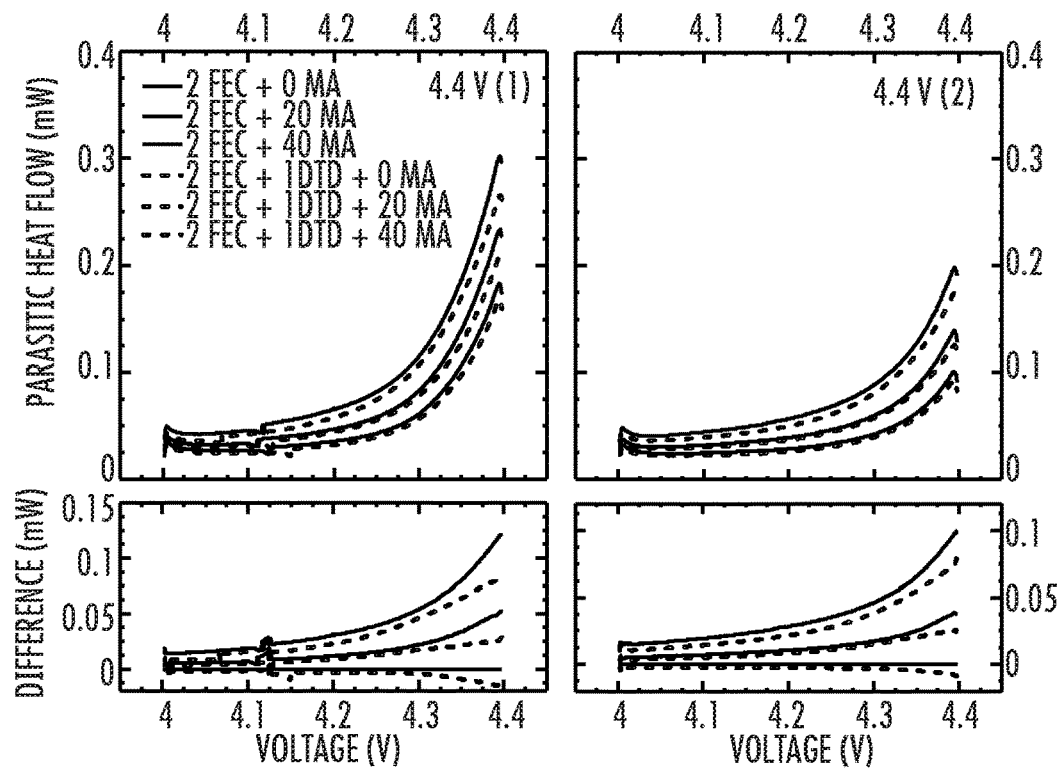

FIG. 13A-B are plots that summarizes experimental data of parasitic heat flow and difference between the parasitic heat flow and that of the cell containing 2% FEC+0% MA as a function of the voltage for different electrolyte compositions that contain FEC in the voltage range of 4.0 V to 4.4 V. FIG. 13A shows results for the first cycle to 4.4 V. FIG. 13B shows results for the second cycle.

Figure 14:
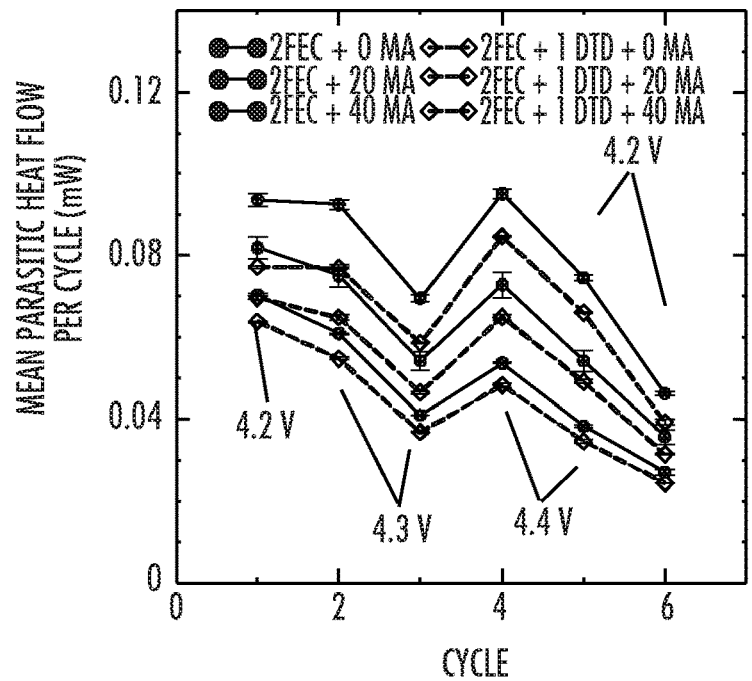

FIG. 14 is a plot that summarizes experimental parasitic heat flow data, including the data shown in FIGS. 11-13.

FIGS. 15A-F are plots of experimental data taken at 20° C. of capacity, normalized capacity, and voltage hysteresis (difference between the average charge voltage and the average charge voltage) versus cycle number for electrolyte systems that contain FEC.

Figure 15A:
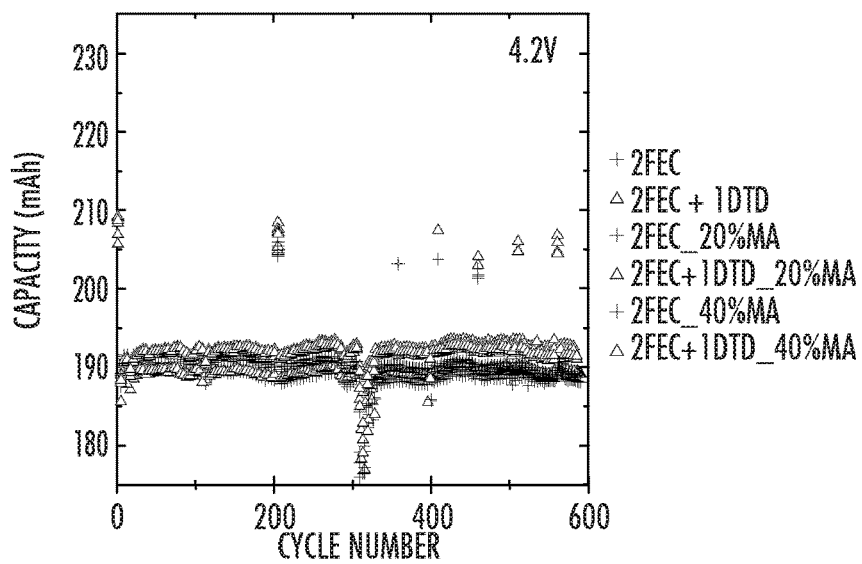

FIG. 15A is a plot of experimental data taken at 20° C. of capacity versus cycle number for electrolyte systems that contain FEC with cycling up to 4.2 V.

Figure 15B:
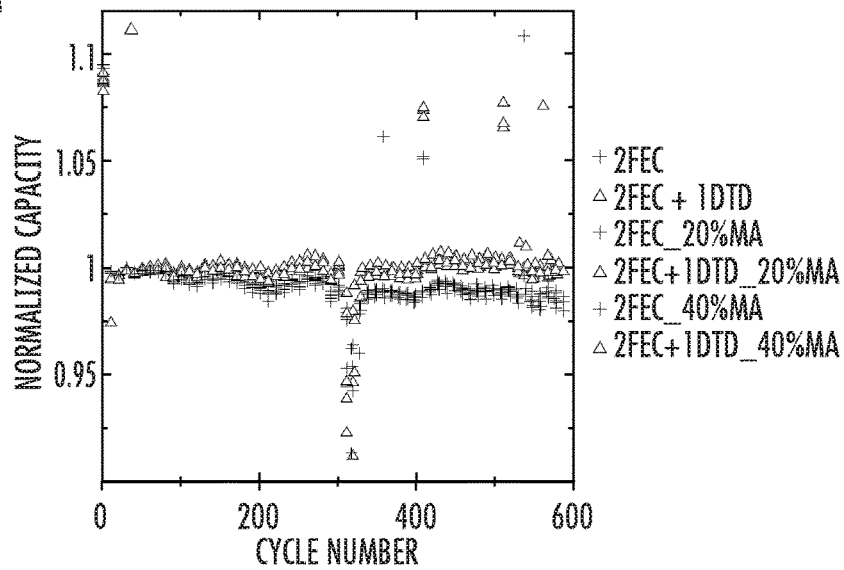

FIG. 15B is a plot of experimental data taken at 20° C. of normalized capacity versus cycle number for electrolyte systems that contain FEC with cycling up to 4.2 V.

Figure 15C:
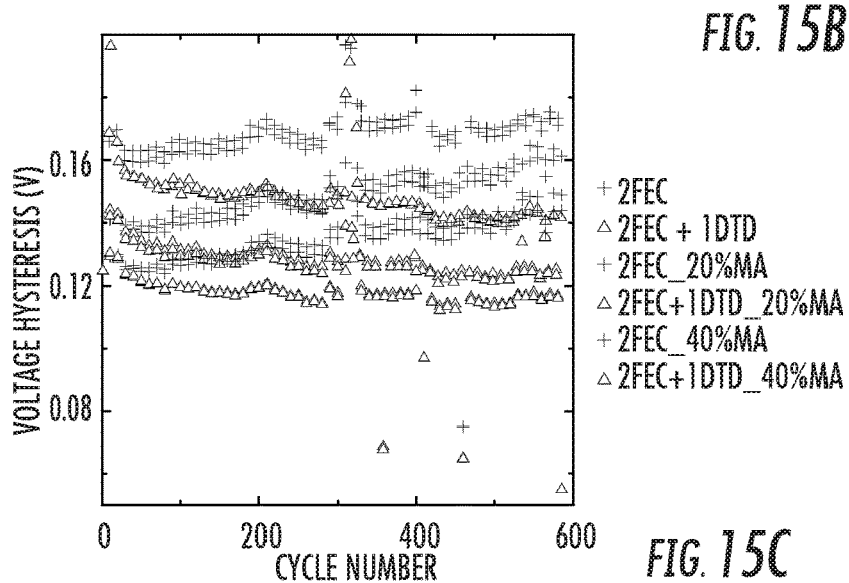

FIG. 15C is a plot of experimental data taken at 20° C. of voltage hysteresis (difference between the average charge voltage and the average charge voltage) versus cycle number for electrolyte systems that contain FEC with cycling up to 4.2 V.

Figure 15D:
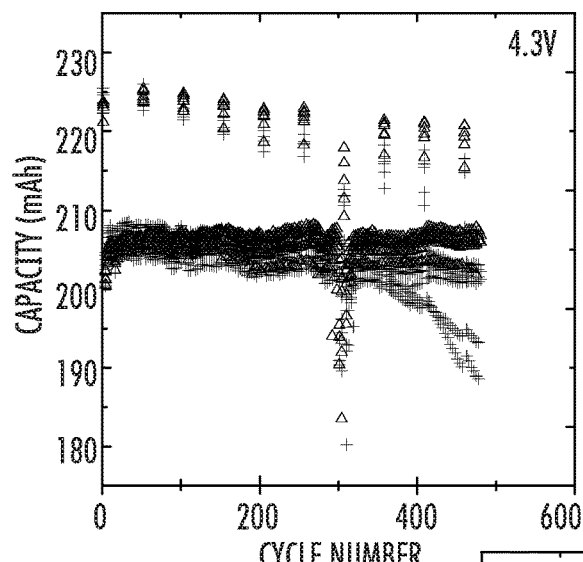

FIG. 15D is a plot of experimental data taken at 20° C. of capacity versus cycle number for electrolyte systems that contain FEC with cycling up to 4.3 V.

Figure 15E:
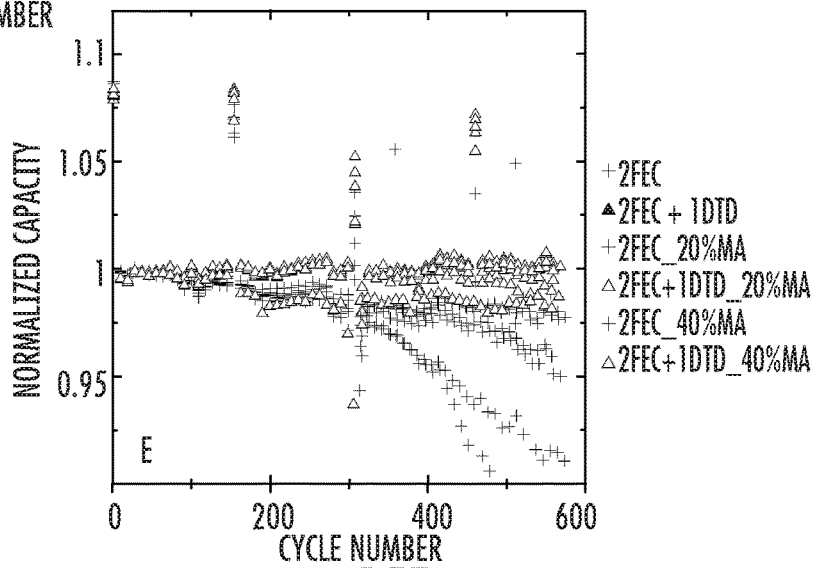

FIG. 15E is a plot of experimental data taken at 20° C. of normalized capacity versus cycle number for electrolyte systems that contain FEC with cycling up to 4.3 V.

Figure 15F:
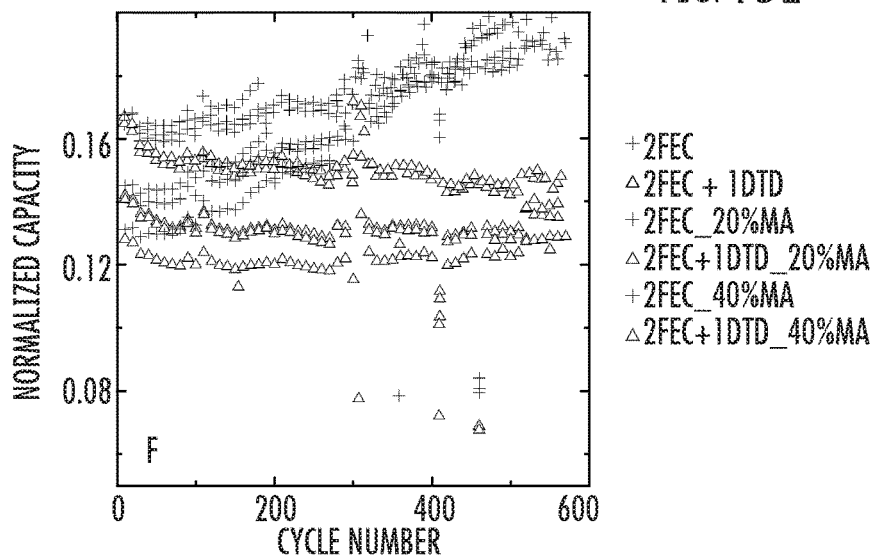

FIG. 15F is a plot of experimental data taken at 20° C. of voltage hysteresis (difference between the average charge voltage and the average charge voltage) versus cycle number for electrolyte systems that contain FEC with cycling up to 4.3 V.

FIGS. 16A-F are plots of experimental data taken at 40° C. of capacity, normalized capacity, and voltage hysteresis for electrolyte systems that contain FEC.

Figure 16A:
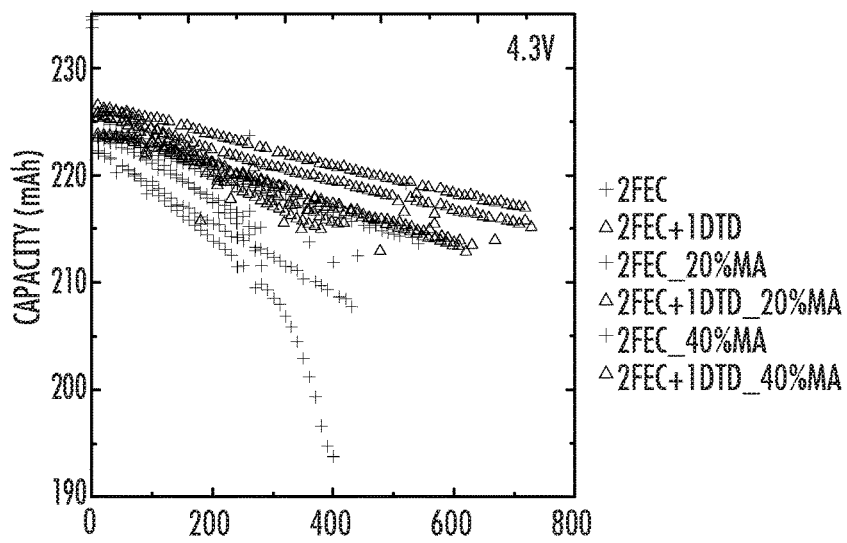

FIG. 16A is a plot of experimental data taken at 40° C. of capacity versus cycle number for electrolyte systems that contain FEC with cycling up to 4.2 V.

Figure 16B:
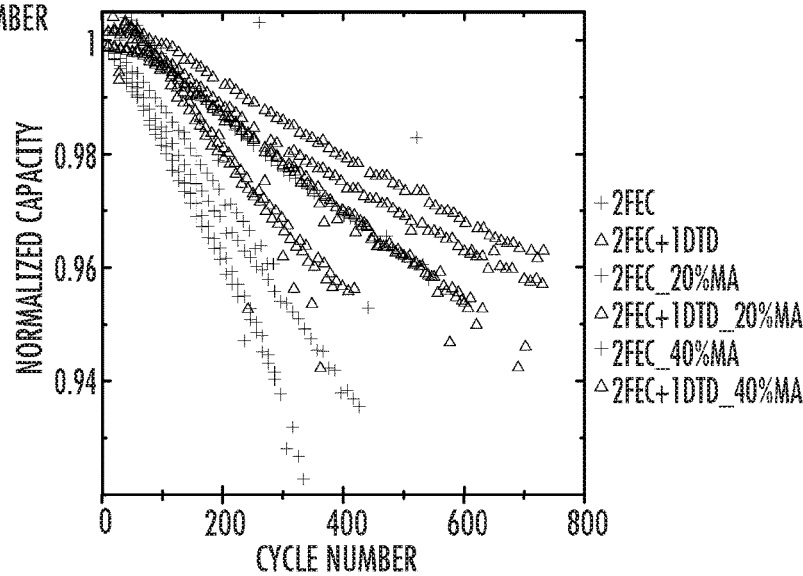

FIG. 16B is a plot of experimental data taken at 40° C. of normalized capacity versus cycle number for electrolyte systems that contain FEC with cycling up to 4.2 V.

Figure 16C:
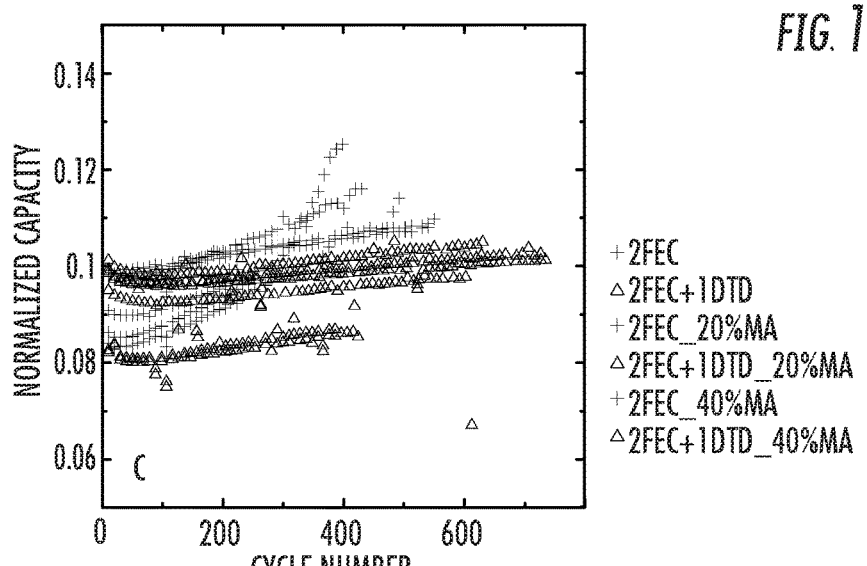

FIG. 16C is a plot of experimental data taken at 40° C. of voltage hysteresis (difference between the average charge voltage and the average charge voltage) versus cycle number for electrolyte systems that contain FEC with cycling up to 4.2 V.

Figure 16D:
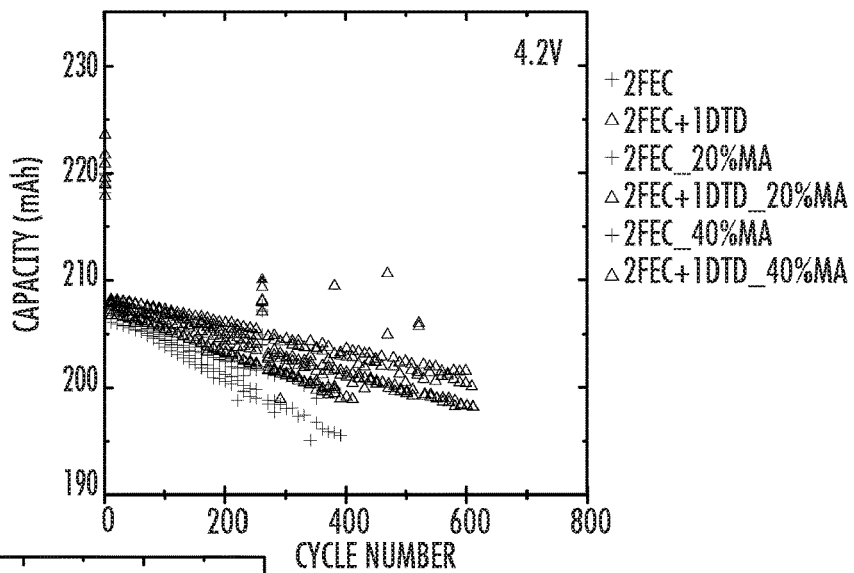

FIG. 16D is a plot of experimental data taken at 40° C. of capacity versus cycle number for electrolyte systems that contain FEC with cycling up to 4.3 V.

Figure 16E:
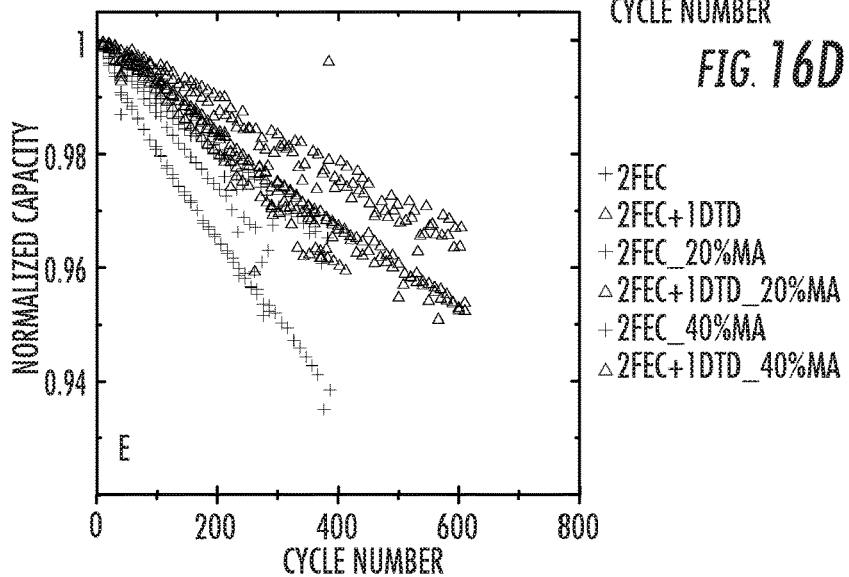

FIG. 16E is a plot of experimental data taken at 40° C. of normalized capacity versus cycle number for electrolyte systems that contain FEC with cycling up to 4.3 V.

Figure 16F:
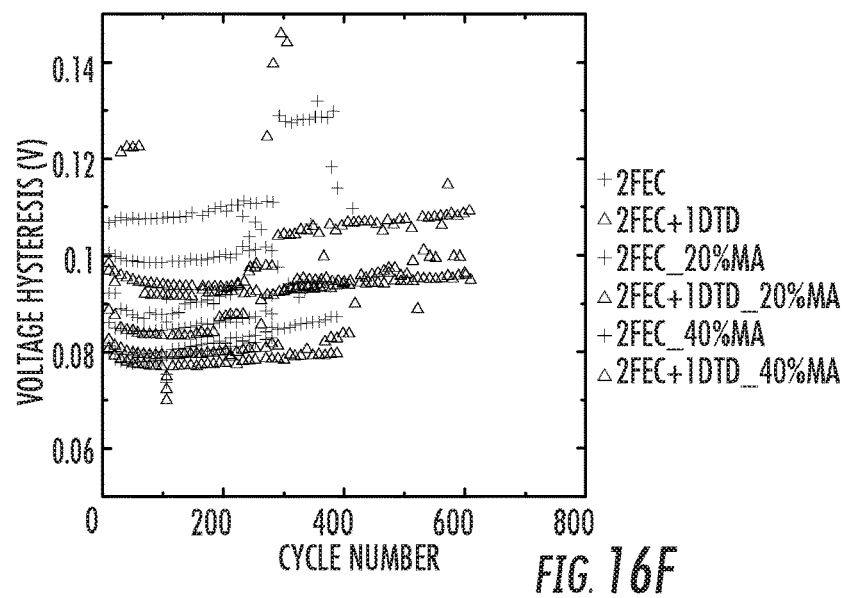

FIG. 16F is a plot of experimental data taken at 40° C. of voltage hysteresis (difference between the average charge voltage and the average charge voltage) versus cycle number for electrolyte systems that contain FEC with cycling up to 4.3 V.

FIGS. 17A-F are plots of experimental data of capacity, normalized capacity, and voltage hysteresis for electrolyte systems that contain FEC, VC, and/or DTD.

Figure 17A:
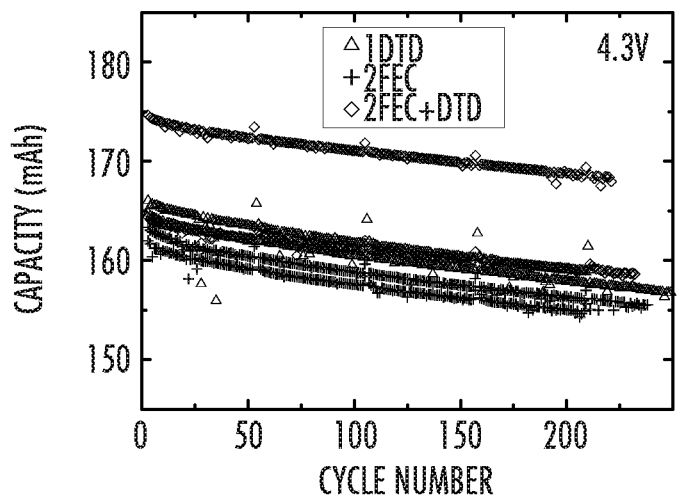

FIG. 17A is a plot of experimental data of capacity versus cycle number for electrolyte systems that contain FEC and/or DTD with cycling up to 4.3 V.

Figure 17B:
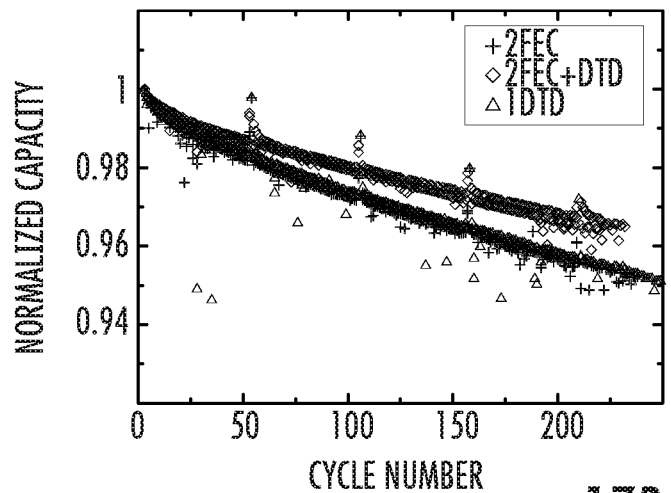

FIG. 17B is a plot of experimental data of normalized capacity versus cycle number for electrolyte systems that contain FEC and/or DTD with cycling up to 4.3 V.

Figure 17C:
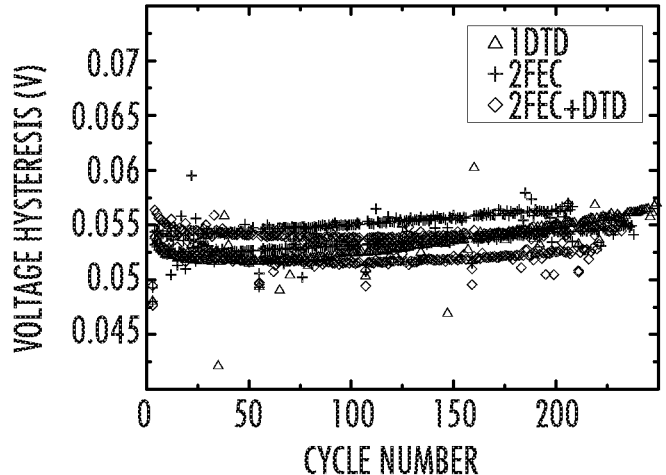

FIG. 17C is a plot of experimental data of voltage hysteresis (difference between the average charge voltage and the average charge voltage) versus cycle number for electrolyte systems that contain FEC and/or DTD with cycling up to 4.3 V.

Figure 17D:
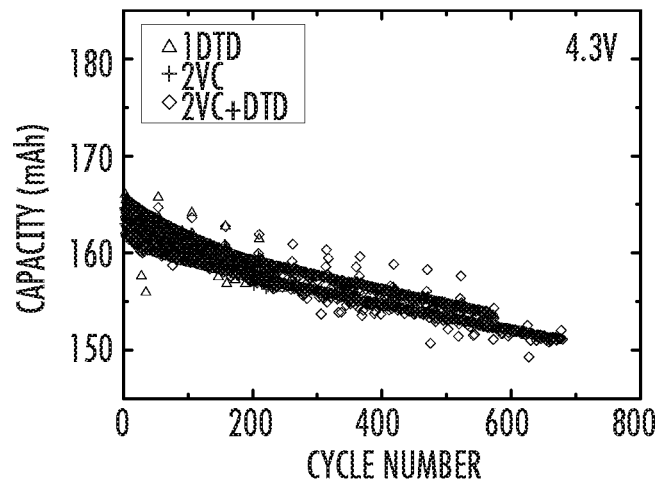

FIG. 17D is a plot of experimental data of capacity versus cycle number for electrolyte systems that contain VC and/or DTD with cycling up to 4.3 V.

Figure 17E:
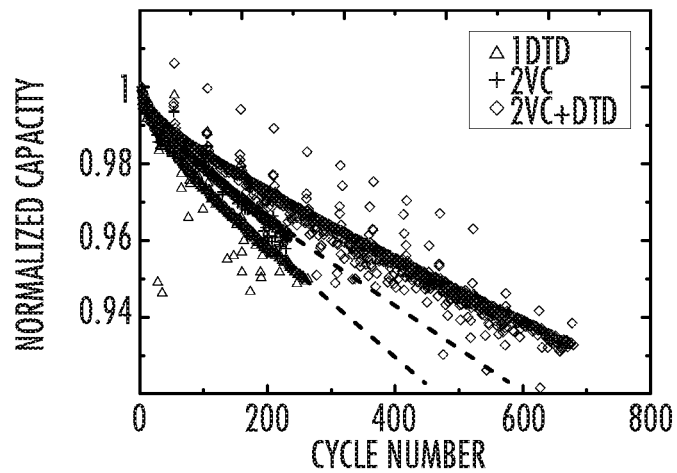

FIG. 17E is a plot of experimental data of normalized capacity versus cycle number for electrolyte systems that contain VC and/or DTD with cycling up to 4.3 V.

Figure 17F:
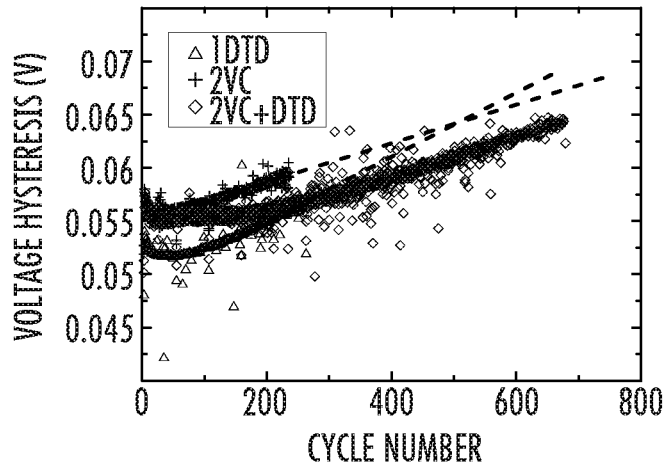

FIG. 17F is a plot of experimental data of voltage hysteresis (difference between the average charge voltage and the average charge voltage) versus cycle number for electrolyte systems that contain VC and/or DTD with cycling up to 4.3 V.

Figure 18A:
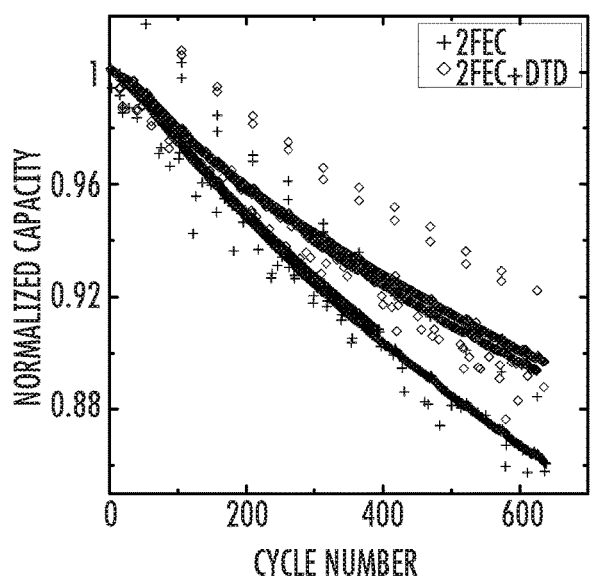

FIG. 18A is a plot of experimental data of capacity versus cycle number for electrolyte systems that contain FEC with cycling up to 4.3 V.

Figure 18B:
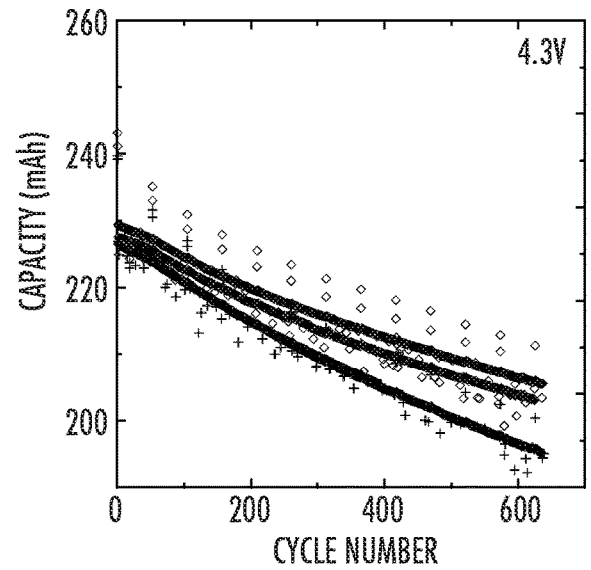

FIG. 18B is a plot of experimental data of normalized capacity versus cycle number for electrolyte systems that contain FEC with cycling up to 4.3 V.

Figure 19:
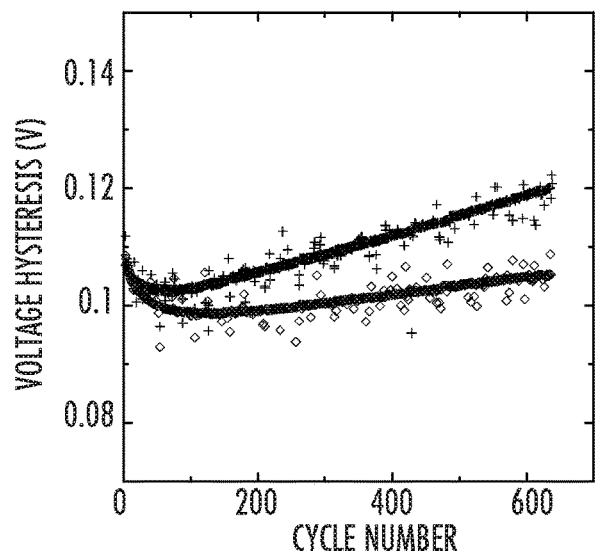

FIG. 19 is a plot of experimental data of voltage hysteresis (difference between the average charge voltage and the average charge voltage) versus cycle number for electrolyte systems that contain FEC with cycling up to 4.3 V.

Figure 20:
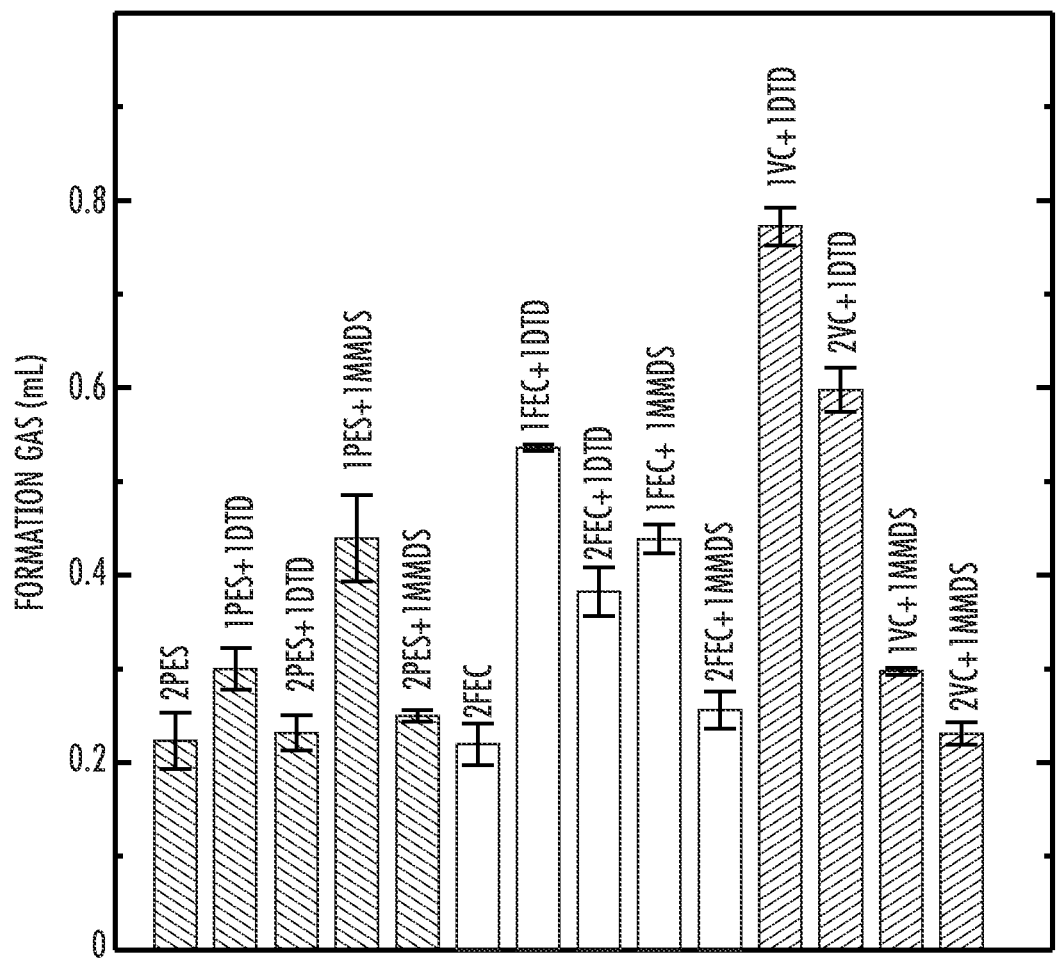

FIG. 20 is a plot that summarizes experimental data of the volume of formation gas generated during cell formation for different electrolyte systems.

Figure 21:
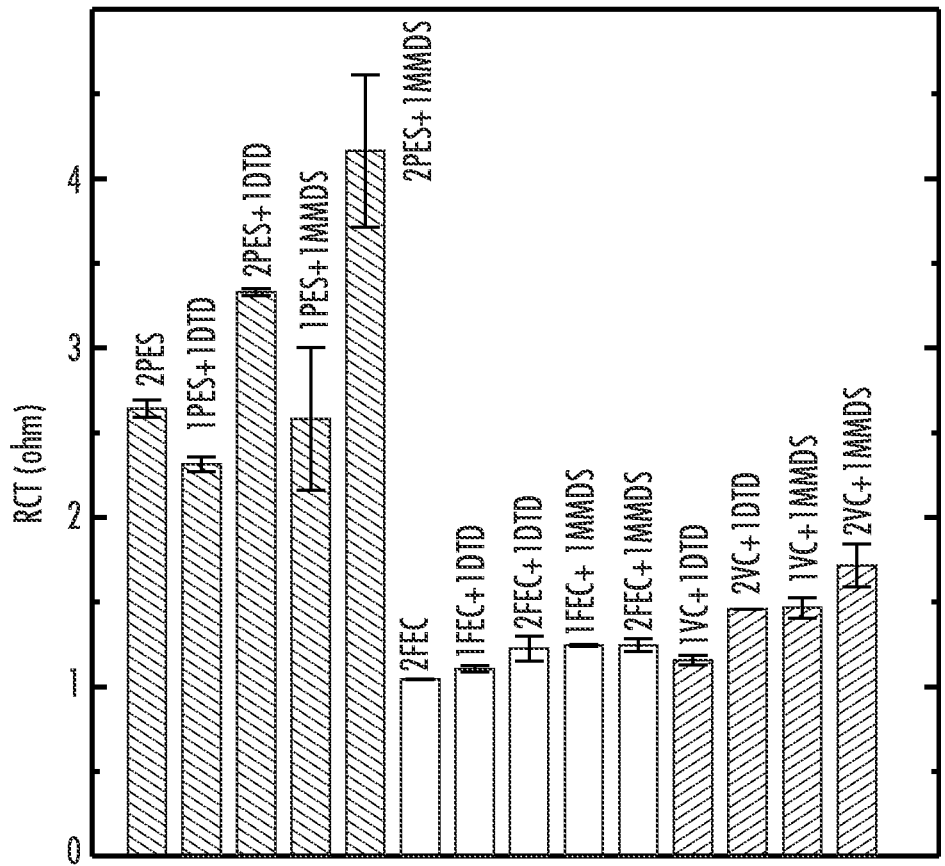

FIG. 21 is a plot that summarizes experimental data of charge transfer impedance for different electrolyte systems.

Figure 22:
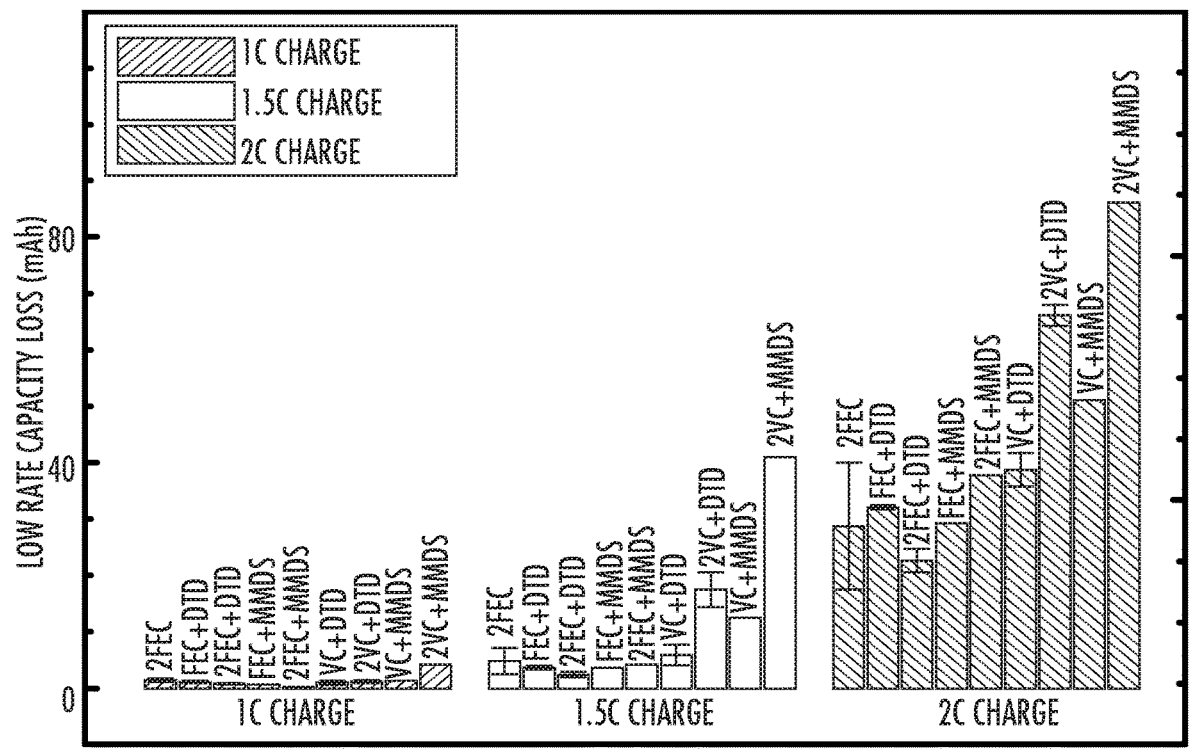

FIG. 22 is a plot summarizing experimental data measuring the low rate capacity loss for different electrolyte systems after cells were charged at three different charge rates at 20° C. for 30 cycles.

Figure 23:
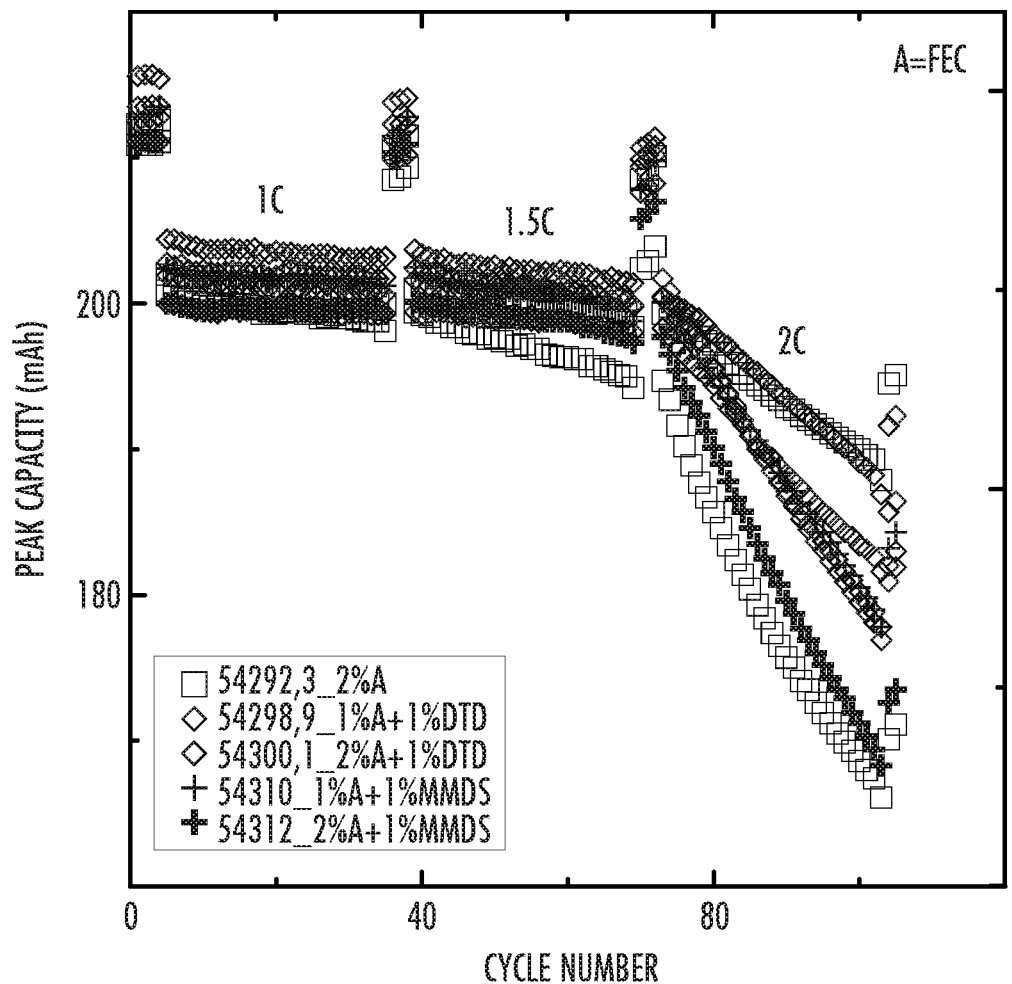

FIG. 23 is a plot summarizing experimental data summarizing the peak capacity as a function of cycle number for different electrolyte systems used in cells being charged at different charge rates at 20° C.

Figure 24:
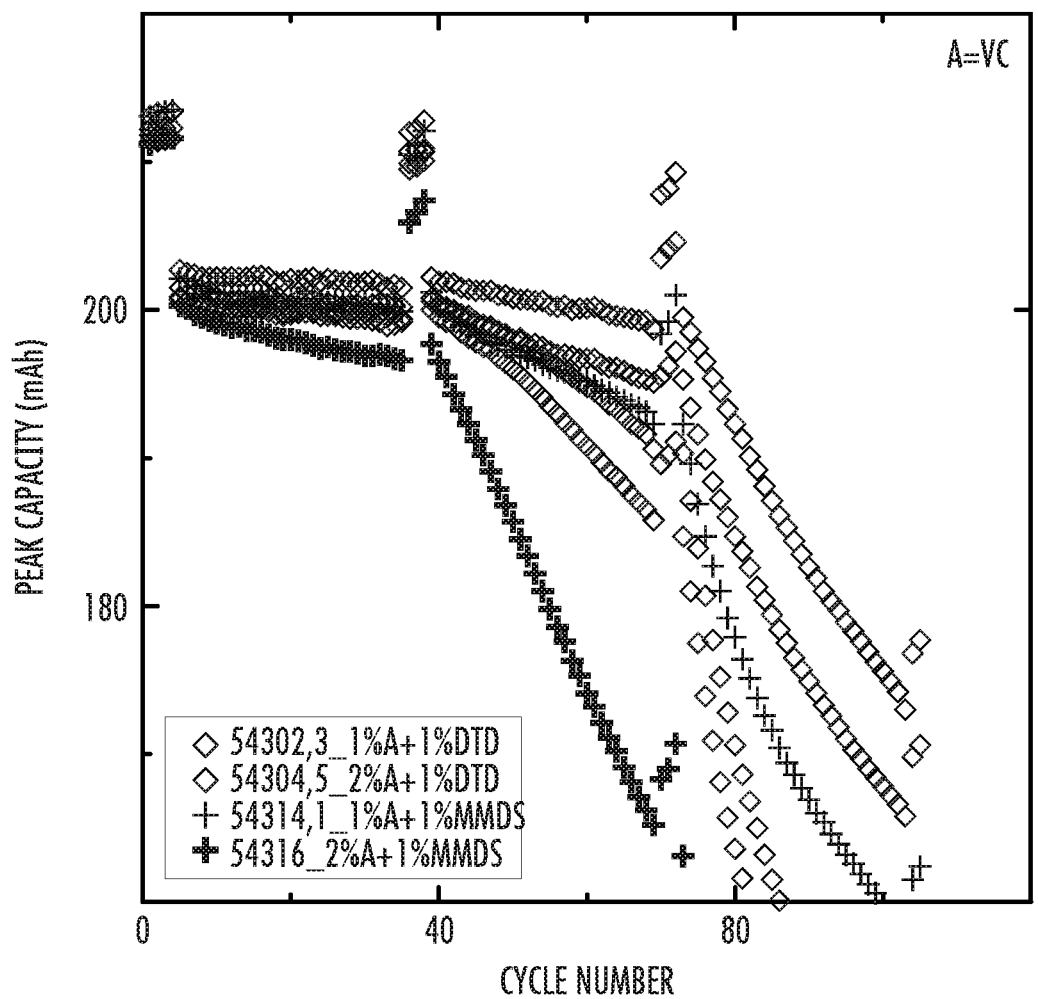

FIG. 24 is a plot summarizing experimental data summarizing the peak capacity as a function of cycle number for different electrolyte systems used in cells being charged at different charge rates at 20° C.

Figure 25:
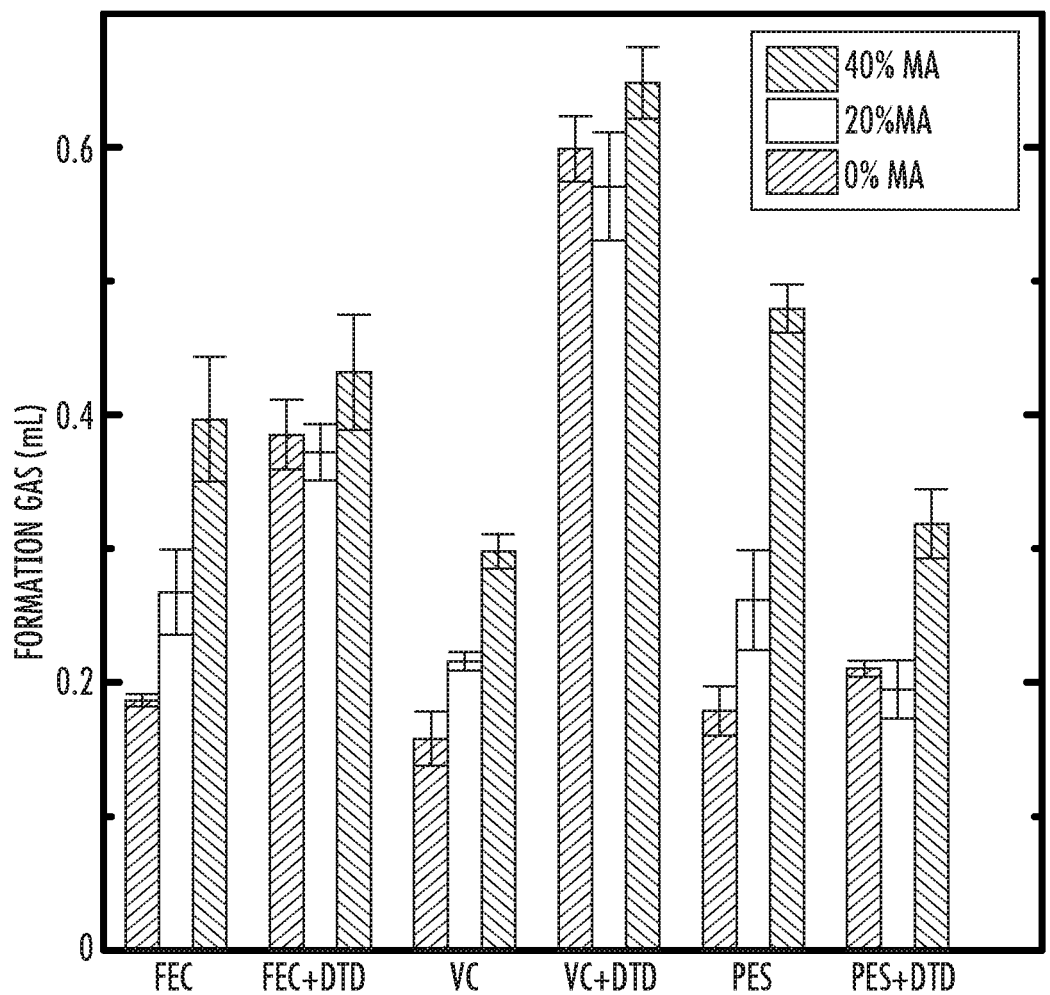

FIG. 25 is a plot that summarizes experimental data of the volume of formation gas for different additives in varying concentrations of MA solvent.

Figure 26:
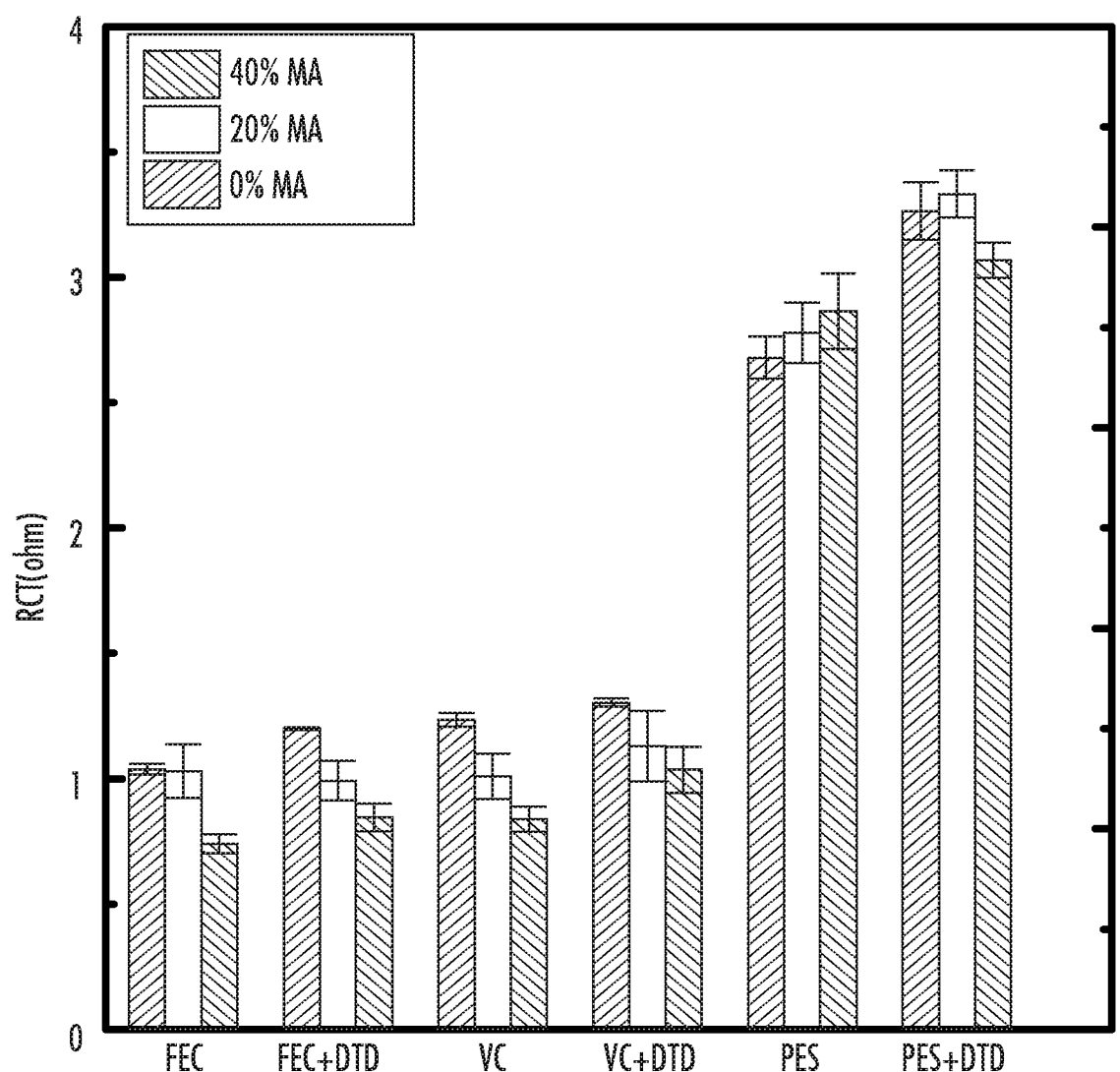

FIG. 26 is a plot that summarizes experimental data of charge transfer impedance for different additives in electrolytes containing varying concentrations of MA solvent.

Figure 27:
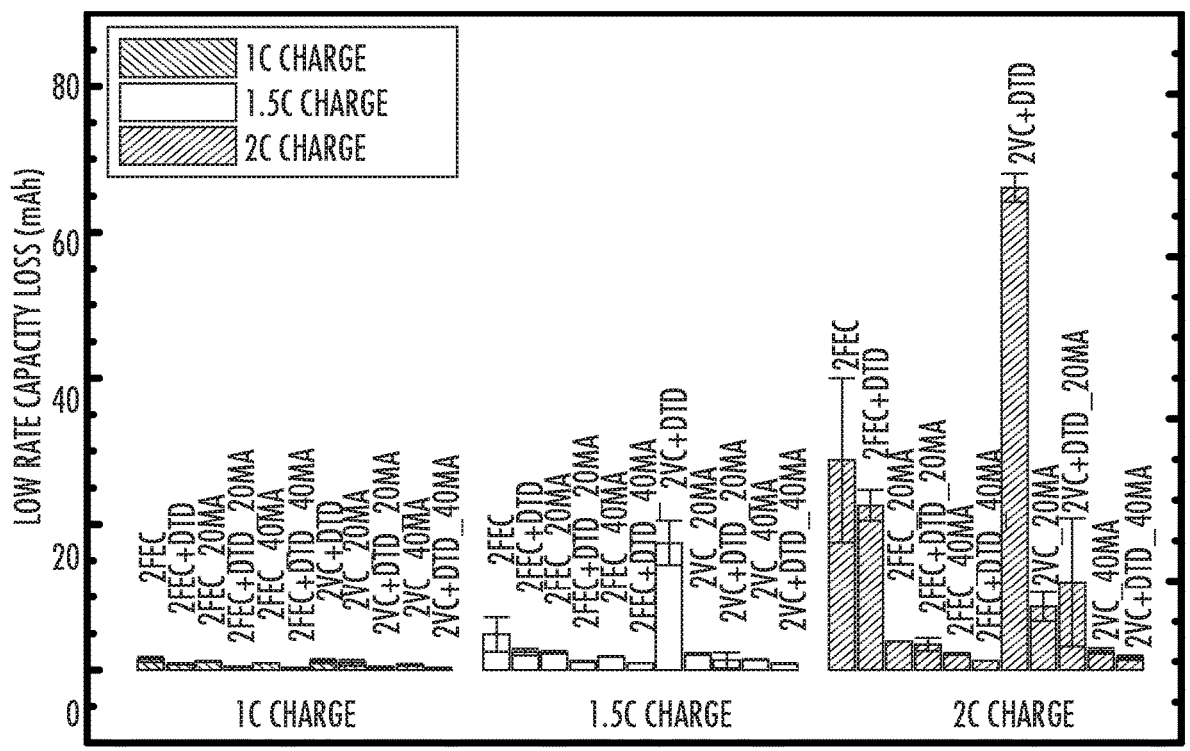

FIG. 27 is a plot that summarizes experimental data of low rate capacity loss for different electrolyte compositions and after charging at 1, 1.5, and 2C for 30 cycles at 20° C.

Figure 28:
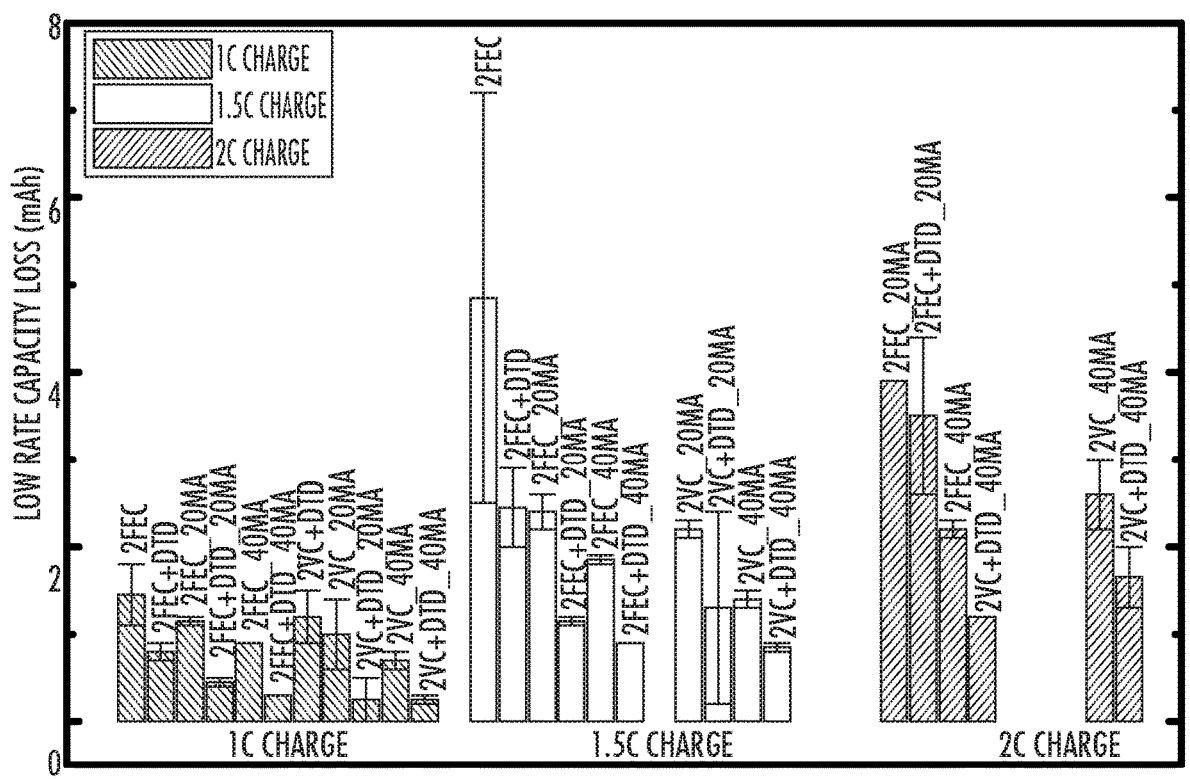

FIG. 28 is a blowup of certain experimental data shown in FIG. 27.

Figure 29:
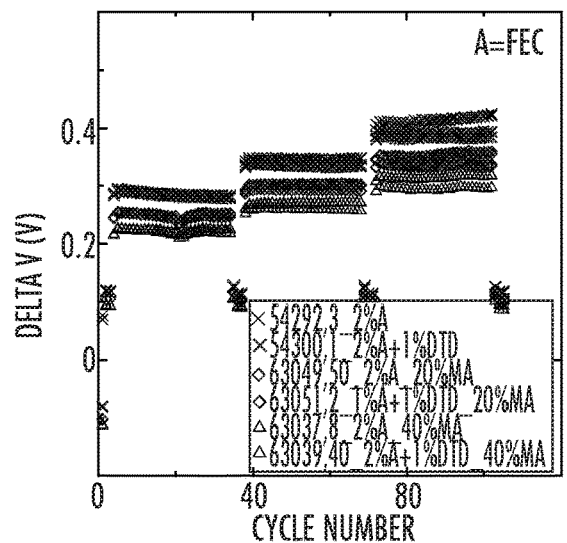

FIG. 29 summarizes experimental data of delta V (difference between the average charge voltage and the average charge voltage) as a function of cycle number for electrolyte systems containing FEC.

Figure 30:
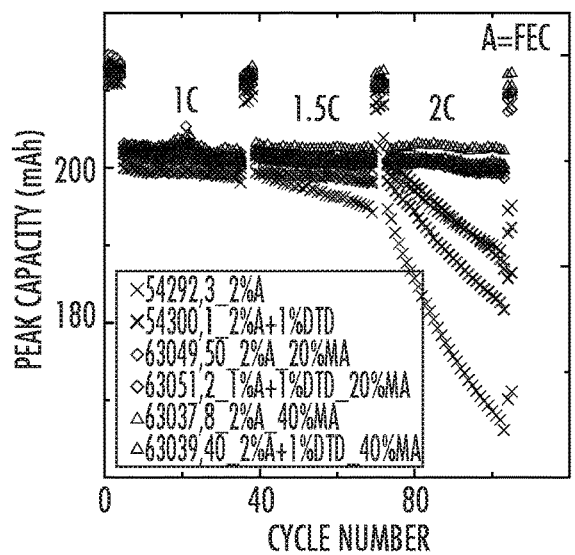

FIG. 30 summarizes experimental data of peak capacity as a function of cycle number for electrolyte systems containing FEC.

Figure 31:
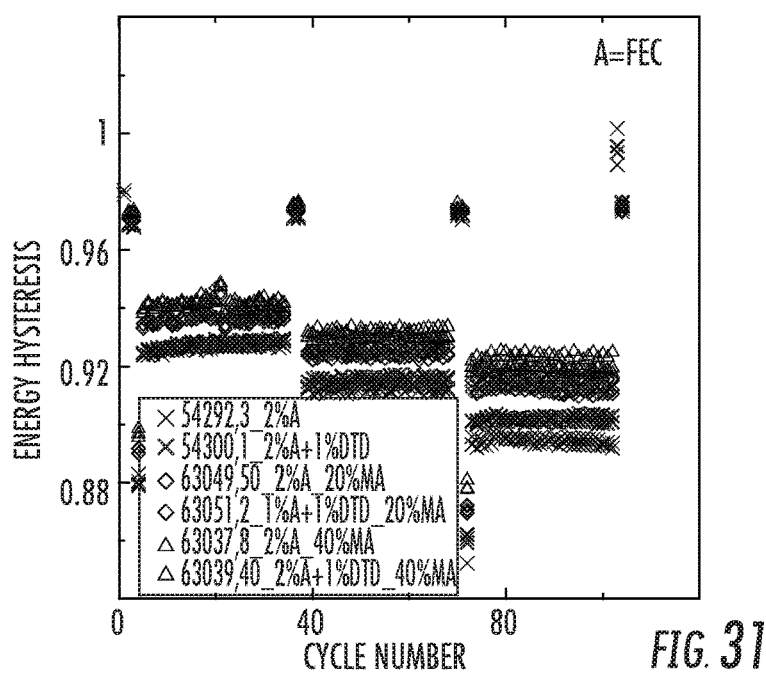

FIG. 31 summarizes experimental data of energy hysteresis as a function of cycle number for electrolyte systems containing FEC.

Figure 32:
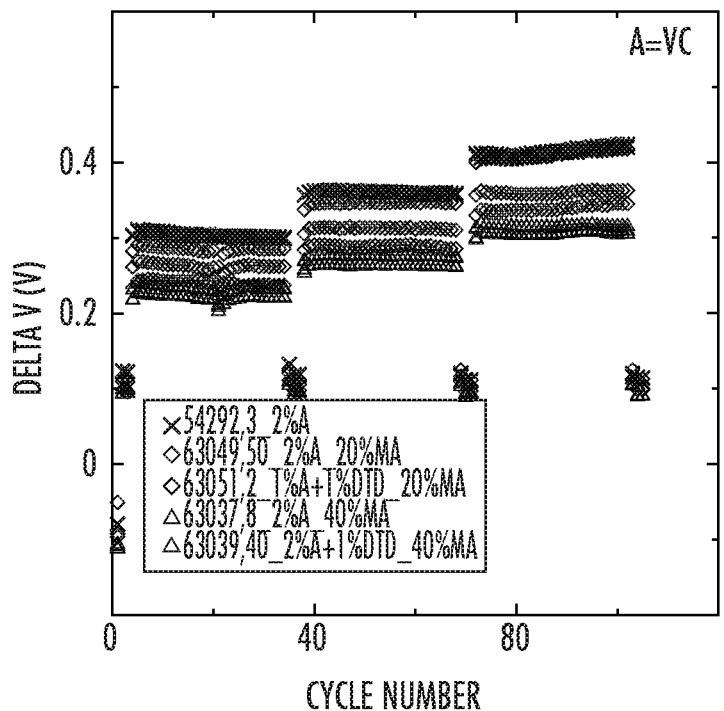

FIG. 32 summarizes experimental data of delta V (difference between the average charge voltage and the average charge voltage) as a function of cycle number for electrolyte systems containing VC.

Figure 33:
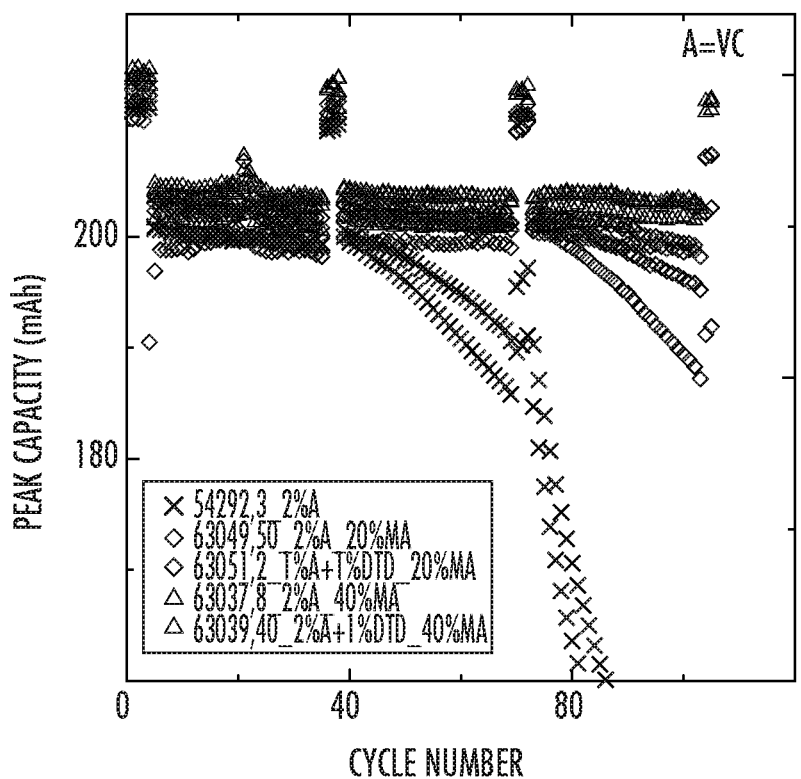

FIG. 33 summarizes experimental data of peak capacity as a function of cycle number for electrolyte systems containing VC.

Figure 34:
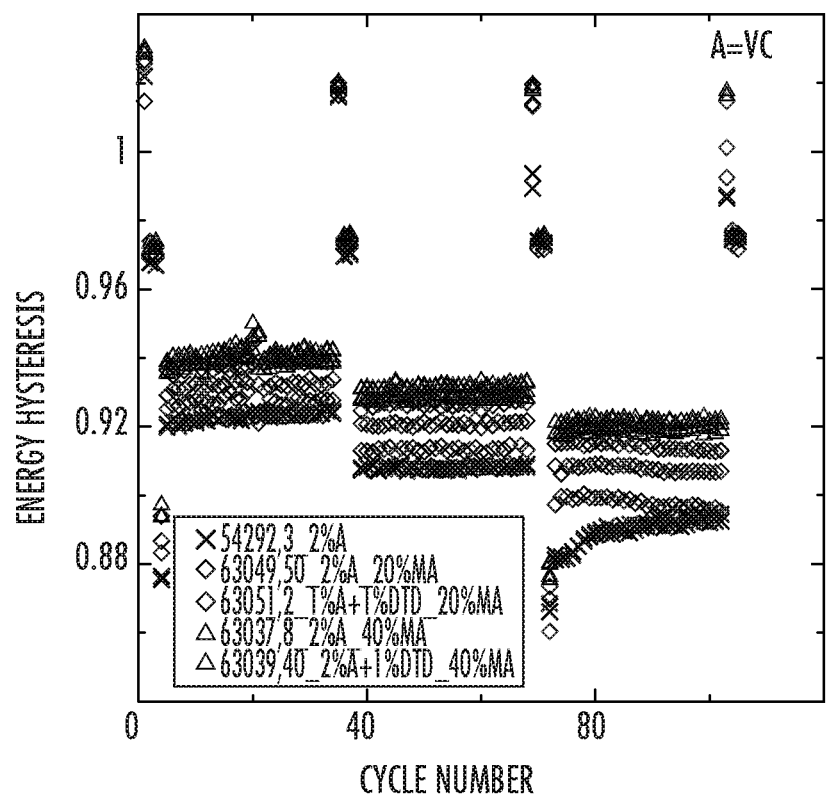

FIG. 34 summarizes experimental data of energy hysteresis as a function of cycle number for electrolyte systems containing VC.

DETAILED DESCRIPTION OF THE DISCLOSURE

Figure 1:
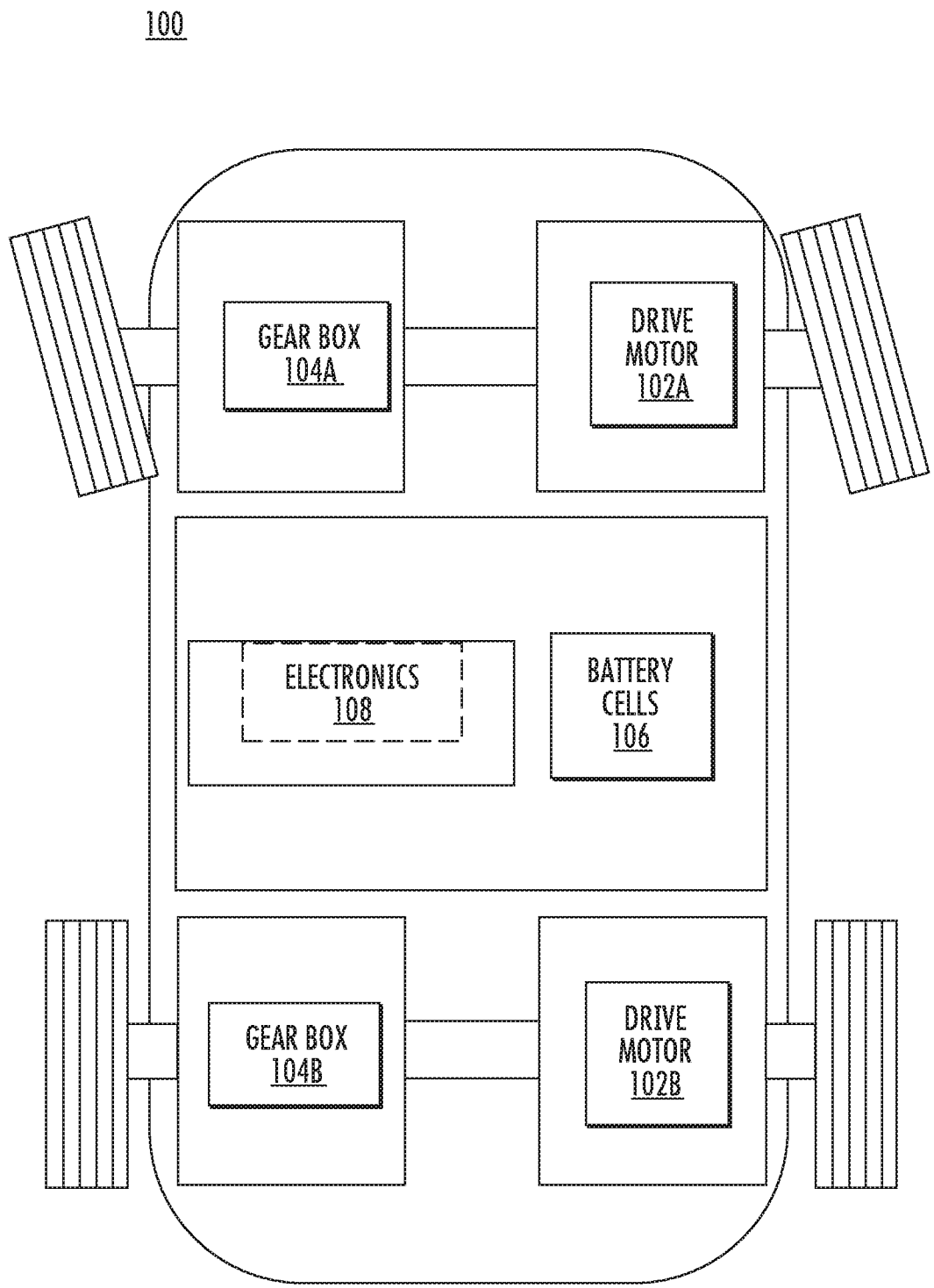
FIG. 1 is a schematic diagram of a vehicle containing a battery storage system.

FIG. 1 illustrates the basic components of a battery powered electric vehicle (electric vehicle) 100. The electric vehicle 100 includes at least one drive motor (traction motor) 102A and/or 102B, at least one gear box 104A and/or 104B coupled to a corresponding drive motor 102A and/or 102B, battery cells 106 and electronics 108. Generally, the battery cells 106 provide electricity to power electronics of the electric vehicle 100 and to propel the electric vehicle 100 using the drive motor 102A and/or 102B. The electric vehicle 100 includes a large number of other components that are not described herein but known to one or ordinary skill. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles. Certain parts created using embodiments of the present disclosure may be used in vehicle 100.

Figure 2:
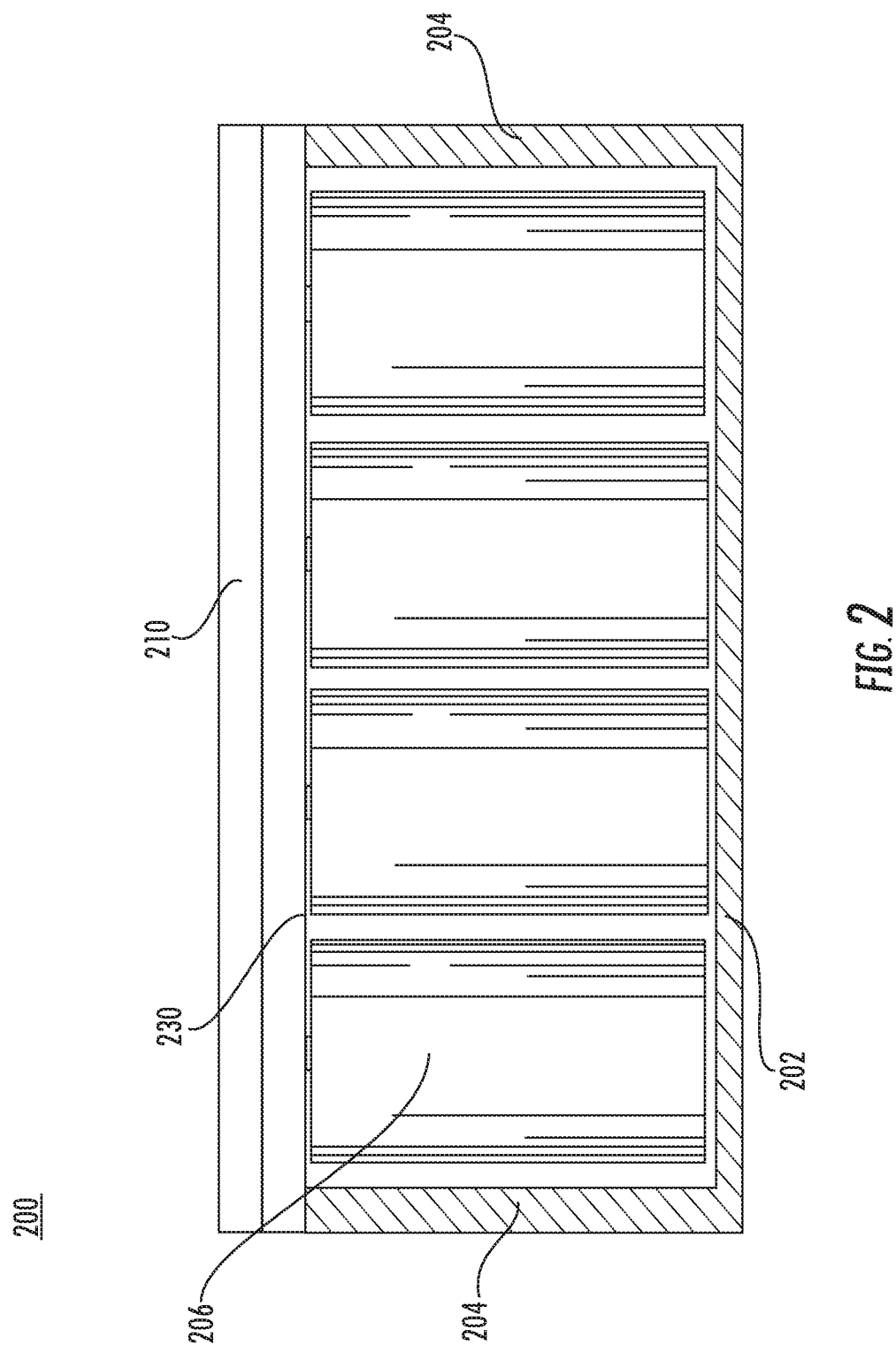
FIG. 2 is a schematic diagram of an exemplary battery storage system.

FIG. 2 illustrates a schematic view of an exemplary energy storage system 200 showing various components. The energy storage system 200 typically includes a modular housing with at least a base 202 and four side walls 204 (only two shown in the figure). The module housing is generally electrically isolated from the housed battery cells 206. This may occur through physical separation, through an electrically insulating layer, through the choice of an insulating material as the module housing, any combination thereof, or another through another method. The base 202 may be an electrically insulating layer on top of a metal sheet or a nonconductive/electrically insulating material, such as polypropylene, polyurethane, polyvinyl chloride, another plastic, a nonconductive composite, or an insulated carbon fiber. Side walls 204 may also contain an insulating layer or be formed out of a nonconductive or electrically insulating material, such as polypropylene, polyurethane, polyvinyl chloride, another plastic, a nonconductive composite, or an insulated carbon fiber. One or more interconnect layers 230 may be positioned above the battery cells 206, with a top plate 210 positioned over the interconnect layer 230. The top plate 210 may either be a single plate or be formed from multiple plates.

Figure 3:
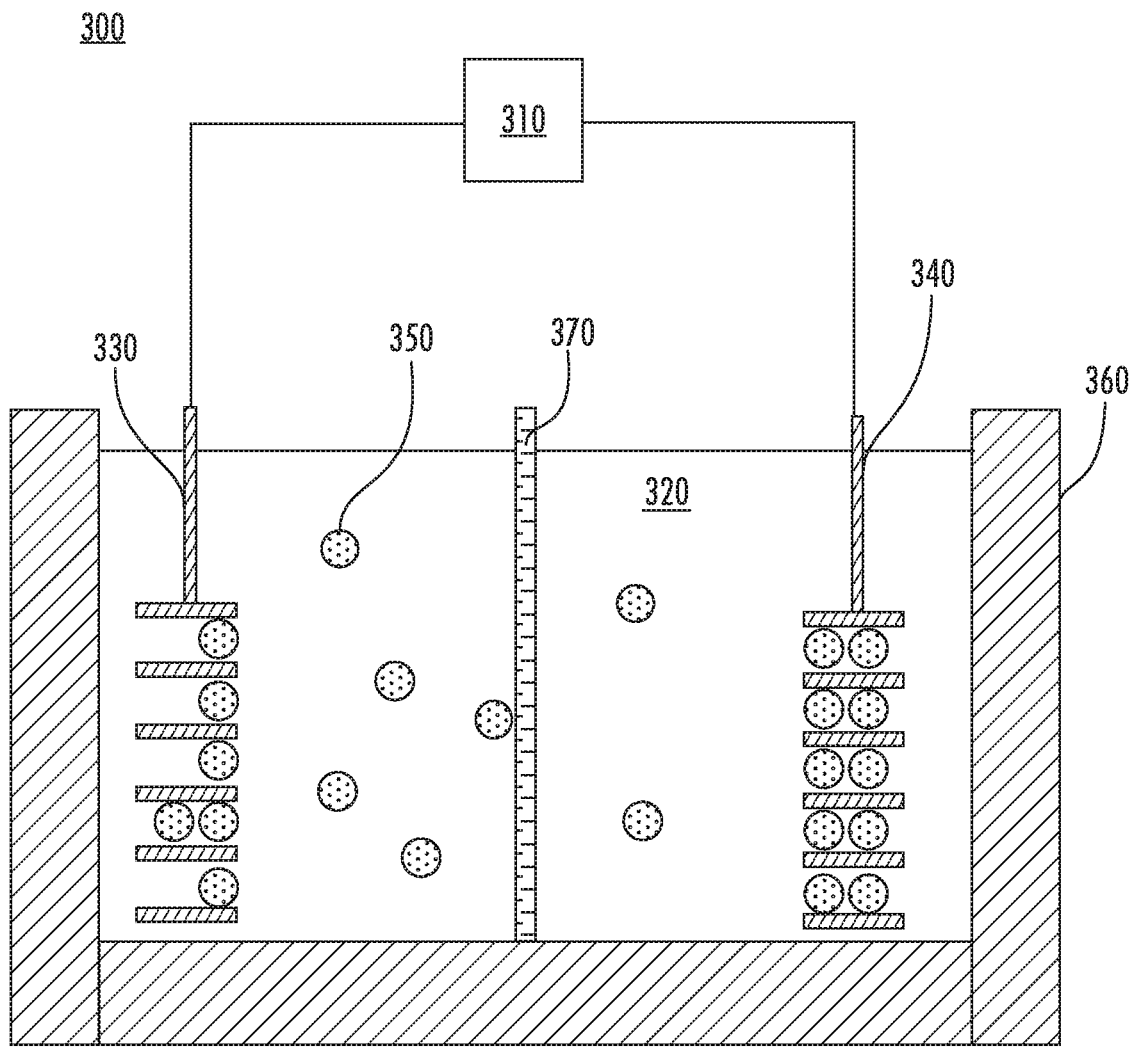
FIG. 3 is a schematic diagram of a lithium-ion, battery-cell system.

Individual battery cells 106 and 206 often are lithium-ion battery cells, with an electrolyte containing lithium ions and positive and negative electrodes. FIG. 3 illustrates a schematic of a lithium ion cell 300. Lithium ions 350 are dispersed throughout electrolyte 320, within container 360. Container 360 may be part of a battery cell. The lithium ions 350 migrate between positive electrode 330 and negative electrode 340. Separator 370 separates the negative electrode and positive electrode. Circuitry 310 connects the negative electrode and positive electrode.

New studies by the inventors have identified novel electrolyte and battery systems for use in grid and electric vehicle applications. These systems are based on two-additive electrolyte systems combined with solvents and electrodes, including 1) vinylene carbonate (VC) combined with 1,3,2-Dioxathiolane-2,2-dioxide (DTD, also known as ethylene sulfate) or another sulfur-containing additive, 2) fluoro ethylene carbonate (FEC) combined with DTD or another sulfur-containing additive, and 3) prop-1-ene-1,3-sultone (PES) combined with DTD or another sulfur-containing additive. These two-additive electrolyte systems are paired with a positive electrode made from lithium nickel manganese cobalt oxide with the composition $LNi_xMn_yCo_zO_2$ (abbreviated NMC generally or NMCxyz where the x, y, and z are the molar ratios of nickel, manganese and cobalt respectively, and x+y+z=1). In certain embodiments, the positive electrode is formed from NMC111, NMC532, NMC811, or NMC622. In certain embodiments, NMC532 positive electrodes formed from single-crystal, micrometer-side particles, which resulted in an electrode with micrometer-size areas of continuous crystal lattice (or grains), have been shown to be particularly robust, in part because the materials and processing conditions result in larger grain sizes than using conventional materials and processing conditions.

Typical processing conditions lead to NMC electrodes with nanometer-sized particles packed into larger micrometer-sized agglomerates, creating grain boundaries on the nanometer scale. Grain boundaries are defects that tend to reduce desirable properties (for example, electrical properties), so it is typically desirable to reduce the number of grains and increase the grain size. Processing can create larger domains, on the micrometer size scale, thereby reducing the number of grain boundaries in the NMC electrodes, increasing electrical properties. The increase in properties is results in more robust battery systems. In certain embodiments, other NMC electrodes may be processed to create larger domain sizes (on the micrometer-size scale or larger), for example, NMC111, NMC811, NMC622, or another NMC compound to create more robust systems.

The positive electrode may be coated with a material such as aluminum oxide ($Al_2O_3$), titanium dioxide ($TiO_2$), or another coating. Coating the positive electrode is advantageous because it can help reduce interfacial phenomena at the positive electrode, such as parasitic reactions, thermal abuse, or another phenomenon, that can deteriorate the system. The negative electrode may be made from natural graphite, artificial graphite, or another material.

The electrolyte may be a lithium salt dissolved (such as $LiPF_6$) in a combination of organic or non-aqueous solvents, including ethylene carbonate, ethyl methyl carbonate, methyl acetate, propylene carbonate, dimethyl carbonate, diethyl carbonate, another carbonate solvent (cyclic or acyclic), another organic solvent, and/or another non-aqueous solvent. Solvents are present in concentrations greater than the additives, typically greater than 6% by weight. While the experimental data was generated using an electrolyte solvent that included EC and EMC (with or without MA), these solvents are merely exemplary of other carbonate solvents in particular and to other non-aqueous solvents. EC and EMC solvents were used in the experiments to control the systems tested in order to understand the effects of the additives, electrodes, and addition of MA as a solvent. Electrolyte systems may therefore may use other carbonate solvents and/or other non-carbonate solvents, including propylene carbonate, ethylene carbonate, dimethyl carbonate, ethyl methyl carbonate, diethyl carbonate, another carbonate solvent (cyclic or acyclic), another organic solvent, and/or another non-aqueous solvent. Solvents are present in concentrations greater than the additives, typically greater than 6% by weight.

In the two-additive mixture FEC and DTD, the concentration of FEC is preferentially between 0.5 to 6% by weight and the concentration of the DTD is preferentially between 0.25 to 5% by weight. In the two-additive mixture VC and DTD, the concentration of VC is preferentially between 0.5 to 6% by weight and the concentration of the DTD is preferentially between 0.25 to 5% by weight.

Certain of these new battery systems may be used in energy-storage applications and also automobile application (including energy storage within an electric vehicle) in which charge and discharge speeds, and lifetime when charging and discharging quickly are important. Specifically, MA may be used as an electrolyte solvent to provide longer lifetime when charging and discharging at higher current rates.

Pre-Experimental Setup

Although the battery systems themselves may be packaged differently according to the present disclosure, the experimental setup typically used machine made "pouch cells" to systematically evaluate the battery systems using a common setup, including the two-additive electrolyte systems and the specific materials for use the positive and negative electrodes. All percentages mentioned within this disclosure are weight percentages unless otherwise specified. A person of skill in the art will appreciate that the type of additive to be used and the concentration to be employed will depend on the characteristics which are most desirably improved and the other components and design used in the lithium ion batteries to be made and will be apartment from this disclosure.

Pouch Cells

The pouch cells used in the experimental setup contain 1 M $LiPF_6$ in the solvent to which additives were added. Depending on the concentration of methyl acetate (0, 20, or 40%), the electrolyte consisted of 1 M $LiPF_6$ in (1) 1.2M $LiPF_6$ in 30% ethylene carbonate and 70% ethyl methyl carbonate, (2) 1.2M $LiPF_6$ in 24% ethylene carbonate, 56% ethyl methyl carbonate, and 20% methyl acetate; or (3) 1.2M $LiPF_6$ in 18% ethylene carbonate, 42% ethyl methyl carbonate, and 40% methyl acetate. To this electrolyte, the additive components were added at specified weight percentages.

The pouch cells used a positive electrode made of NMC532 with micrometer-sized grains (sometimes referred to as single-crystal NMC532), and a negative electrode made of artificial graphite, unless otherwise specified. To test certain battery systems, other positive, including standard NMC532 (with smaller grains than the NMC with micrometer-sized grains) and NMC622, and negative electrodes (including natural graphite) were used.

Before electrolyte filling, the pouch cells were cut open below the heat seal and dried at 100° C. under vacuum for 12 h to remove any residual water. Then the cells were transferred immediately to an argon-filled glove box for filling and vacuum sealing and then were filled with electrolyte. After filling, cells were vacuum-sealed.

After sealing, the pouch cells were placed in a temperature box at 40.0+/−0.1° C. and held at 1.5 V for 24 hours to allow for the completion of wetting. Then, pouch cells were subjected to the formation process. Unless specified otherwise, the formation process consisted of charging the pouch cells at 11 mA (C/20) to 4.2 V and discharging to 3.8 V. C/x indicates the that the time to charge or discharge the cell at the current selected is x hours when the cell has its initial capacity. For example, C/20 indicates that a charge or discharge would take 20 hours. After formation, cells were transferred and moved into the glove box, cut open to release any generated gas and then vacuum sealed again and the appropriate experiments were performed.

Ultrahigh Precision Cycling and Storage Experiments

To study the effectiveness of the battery systems of the present disclosure, including the operative electrolyte additives and electrodes, ultrahigh precision cycling (UHPC) was performed. The standard UHPC procedure consisted of cycling cells between 2.8 and 4.3 V at 40° C. using a current corresponding to C/20 for 15 cycles to produce the data. UPHC is employed to measure the coulombic efficiency, charge endpoint capacity slippage and other parameters to an accuracy of 30 ppm, in the case of the coulombic efficiency. Details of the UHPC procedure are described in in T. M. Bond, J. C. Burns, D. A. Stevens, H. M. Dahn, and J. R. Dahn, *Journal of* the Electrochemical Society, 160, A521 (2013), which is incorporated herein in its entirety.

Metrics measured and/or determined from the UHPC measurements of particular interest include the following: coulombic efficiency, normalized coulombic inefficiency, normalized charge endpoint capacity slippage, normalized discharge capacity (or fade rate), and delta V. Coulombic efficiency is the discharge capacity ($Q_d$) divided by charge capacity ($Q_c$) of the previous cycle. It tracks the parasitic reactions happening at the in the Li-ion cell and includes contributions from both the positive and negative electrodes. A higher CE value indicates less electrolyte degradation in the cell. Coulombic inefficiency per hour (CIE/h) is a normalized (per hour) coulombic inefficiency where the coulombic inefficiency is defined as 1-CE. It is calculated by taking 1-CE and dividing by the time of the cycle for which the CE was measured. Charge endpoint capacity motion (or slippage) tracks the parasitic reactions occurring at the positive electrode as well as the positive material mass loss, if any. Less motion is better and relates to less electrolyte oxidation. Normalized discharge capacity, or fade rate, is another important metric, with a lower fade rate desirable and normally indicative of a battery system with a longer lifetime. Delta V is calculated as the difference between the average charge voltage and average discharge voltage. Delta V change relates closely to polarization growth with lower Delta V change as cycling occurs is preferable. UHPC measurements are particularly appropriate for comparing electrolyte compositions because it allows for the tracking of metrics with a higher accuracy and precision and allows for the evaluation of various degradation mechanisms in a relatively rapid fashion.

Two-Electrolyte Systems With FEC Or VC As Additive: In certain embodiments, two-additive electrolyte systems, the concentration of each additive about 0.25-6%, form part of the battery system. The battery systems may also include positive electrodes made from NMC111, NMC532, NMC811, NMC622, or another NMC composition (NMCxyz). In certain embodiments, positive electrodes made from NMC532 with micrometer-scale grains have been shown to be particularly robust, in part because processing conditions created larger the grain sizes than typically processing conditions create.

Typical processing conditions lead to NMC electrodes with nanometer-sized particles packed into larger micrometer-sized agglomerates, creating grain boundaries on the nanometer scale. Grain boundaries are defects that tend to reduce desirable properties (for example, electrical properties), so it is typically desirable to reduce the number of grains and increase the grain size. Current processing can create larger domains, on the micrometer size scale, thereby reducing the number of grain boundaries in the NMC electrodes, increasing electrical properties. The increase in properties is results in more robust battery systems. In certain embodiments, other NMC electrodes may be processed to create larger domain sizes (on the micrometer-size scale or larger), for example, NMC111, NMC811, NMC622, or another NMC compound to create more robust systems.

The positive electrode may be coated with a material such as aluminum oxide ($Al_2O_3$), titanium dioxide ($TiO_2$), or another coating. FIGS. 4A-J illustrate typical experimental data of two-additive systems of the present disclosure collected during UHPC experiments comparing single-additive electrolyte systems with the novel two-additive electrolyte systems (VC+DTD and FEC+DTD) in a base electrolyte system containing 1.2M LiPF$_6$ in 30% ethylene carbonate and 70% ethyl methyl carbonate, using a positive electrode consisting of single-crystal NMC532 and a negative electrode consisting of artificial graphite. FIGS. 4A-J illustrate benefits of two-additive systems of the present disclosure, specifically adding DTD to an electrolyte system containing VC or FEC.

Figure 4A:
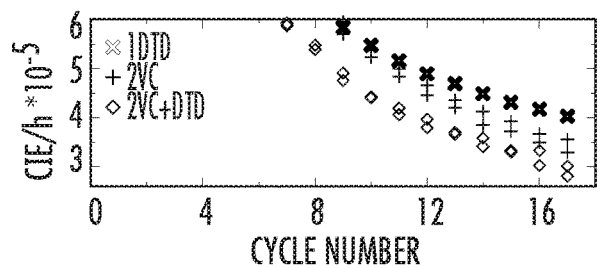
FIGS. 4A-J illustrate typical experimental data collected during ultra-high-precision-charging experiments of battery systems with different electrolyte compositions.
Figure 4B:
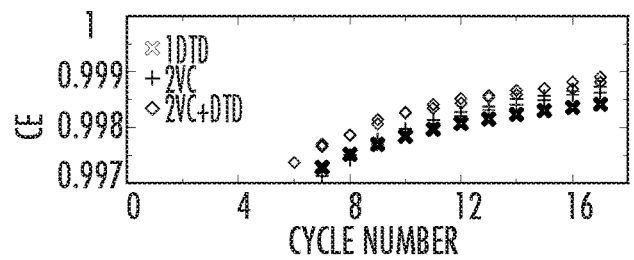
Figure 4C:
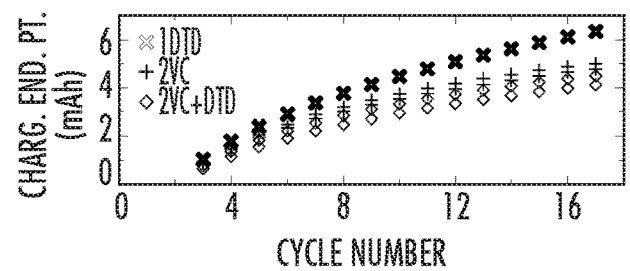
Figure 4D:
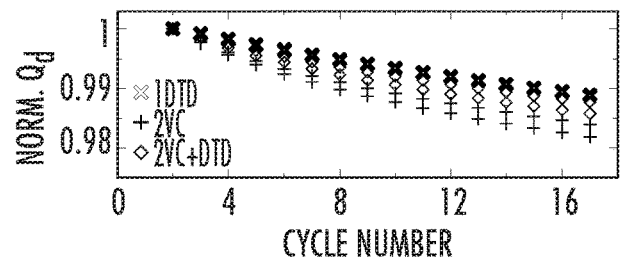
Figure 4E:
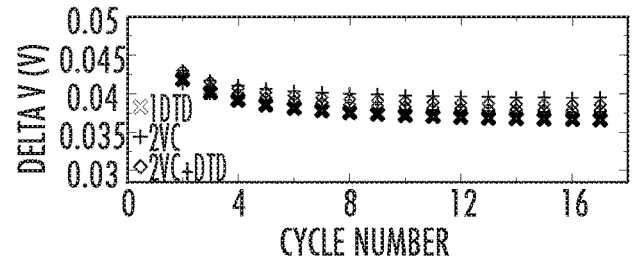
Figure 4F:
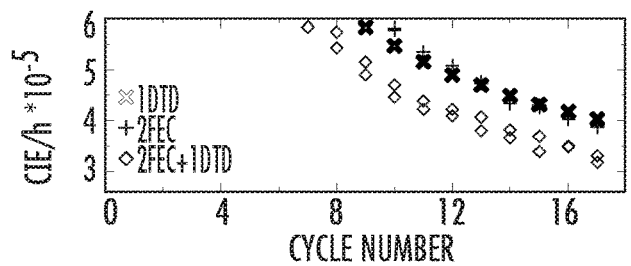
Figure 4G:
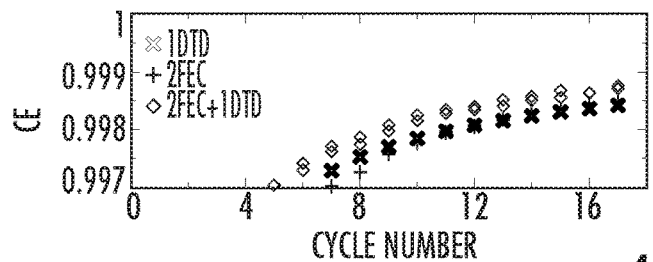
Figure 4H:
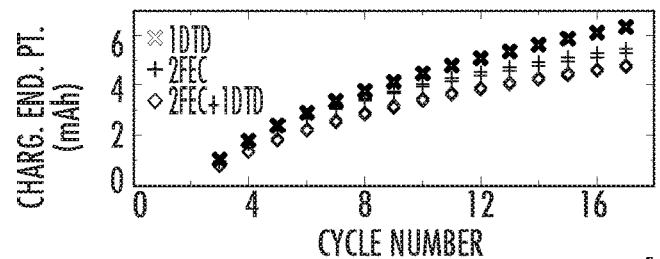
Figure 4I:
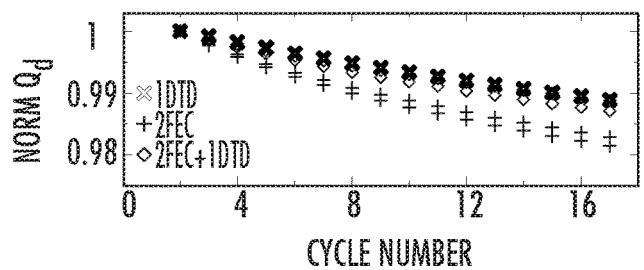
Figure 4J:
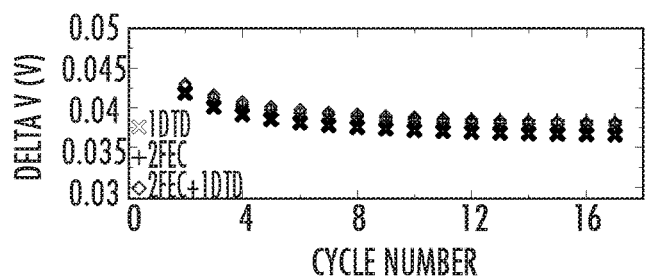

FIG. 4A illustrates time normalized coulombic inefficiency per hour (CIE/h) versus cycle number for electrolyte systems including 1% DTD, 2% VC, and 2% VC+1% DTD. FIG. 4B illustrates coulombic efficiency (CE) versus cycle number for electrolyte systems including 1% DTD, 2% VC, and 2% VC+1% DTD. FIG. 4C illustrates the capacity of the charge endpoint plotted versus cycle number for electrolyte systems including 1% DTD, 2% VC, and 2% VC+1% DTD. FIG. 4D illustrates the discharge capacity versus cycle number for electrolyte systems including 1% DTD, 2% VC, and 2% VC+1% DTD. FIG. 4E illustrates the difference between average charge voltage and average discharge voltage versus cycle number for electrolyte systems including 1% DTD, 2% VC, and 2% VC+1% DTD. FIG. 4F illustrates time normalized coulombic inefficiency per hour (CIE/h) versus cycle number for electrolyte systems including 1% DTD, 2% FEC, and 2% FEC+1% DTD. FIG. 4G illustrates coulombic efficiency (CE) versus cycle number for electrolyte systems including 1% DTD, 2% FEC, and 2% FEC+1% DTD. FIG. 4H illustrates the capacity of the charge endpoint plotted versus cycle number for electrolyte systems including 1% DTD, 2% FEC, and 2% FEC+1% DTD. FIG. 4I illustrates the discharge capacity verses cycle number for electrolyte systems including 1% DTD, 2% FEC, and 2% FEC+1% DTD. FIG. 4J illustrates the difference between average charge voltage and average discharge voltage versus cycle number for electrolyte systems including 1% DTD, 2% FEC, and 2% FEC+1% DTD.

FIGS. 4A-J show the benefits of electrolytes with two additives—specifically VC+DTD and FEC+DTD. The experimental data shows that adding DTD to an electrolyte system containing VC or FEC in a base electrolyte system containing 1.2M LiPF$_6$ in 30% ethylene carbonate and 70% ethyl methyl carbonate by weight increases the performance of electrolyte systems that contain only VC or FEC as additives. Specifically, FIGS. 4A-J illustrate that two-additive systems containing (VC+DTD and FEC+DTD) have a higher CE (lower electrolyte degradation in the cell) and lower charge endpoint motion (lower electrolyte degradation at the positive electrode) compared to systems without the additives, or with only one additive. Further, FIGS. 4A-J also show a desirable lower fade rate ($Q_d$). Thus, an electrolyte system with two additives (VC+DTD and/or FEC+DTD) performs better (in terms of CIE/h, CE, charge end point slippage) than an electrolyte system that only contains a single additive of DTD, VC, or FEC.

Figure 5A:
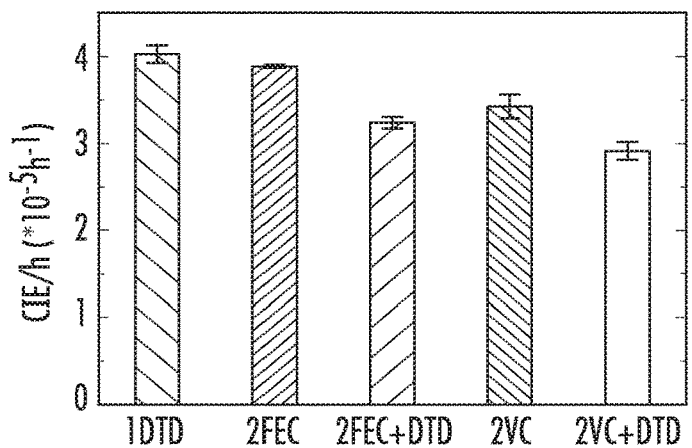
FIGS. 5A-C illustrates the average of the last three cycles of data shown in FIG. 4, and shows lower coulombic inefficiency per hour and lower fractional slippage per hour for the combinations of FEC+DTD and VC+DTD compared to any single additive of FEC, VC, or DTD.
Figure 5B:
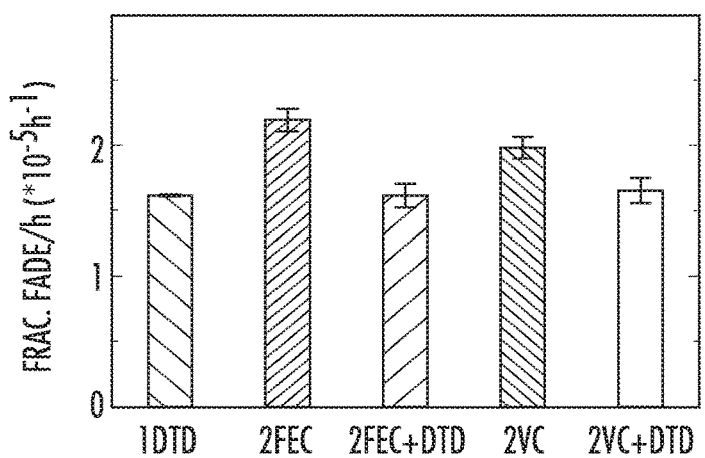
Figure 5C:
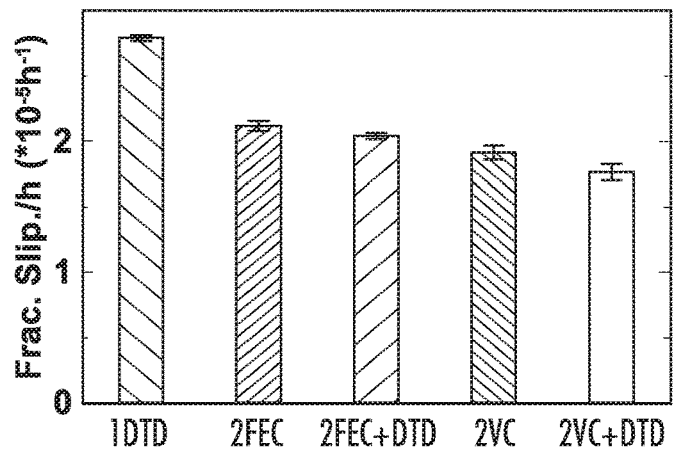

FIG. 5 summarizes the last three cycles of data generated during the experiments shown in FIGS. 4A-J. FIG. 5A shows a summary of the last three cycles of the time normalized coulombic inefficiency per hour (CIE/h) for electrolyte systems including 1% DTD, 2% FEC, 2% FEC+1% DTD, 2% VC, and 2% VC+1% DTD. FIG. 5B shows a summary of the last three cycles of the fractional slippage per hour for electrolyte systems including 1% DTD, 2% FEC, 2% FEC+1% DTD, 2% VC, and 2% VC+1% DTD. FIG. 5C shows a summary of the last three cycles of the fractional fade per hour for 1% DTD, 2% FEC, 2% FEC+1% DTD, 2% VC, and 2% VC+1% DTD.

FIGS. 5A-C show that electrolyte systems that contain VC+DTD and FEC+DTD exhibit lower time normalize coulombic inefficiency (CIE/h), and lower fractional slippage per hour (meaning that these electrolyte systems have longer lifetimes) compared to systems that only contained one additional additive-2% FEC, 2% VC, or 1% DTD. FIGS. 5A and 5B show that 1% DTD without another additive shows the highest CIE/h and fractional slippage. However, when DTD is combined with VC or FEC, the two additives form a previously unexpected, synergistic effect causing the CIE/h and fractional slippage to be less in the two-additive electrolyte system compared to either single additive. FIG. 5C shows that the presence of 1% DTD decreases the fractional fade per hour, either as a single additive or as part of a two-additive electrolyte system with VC or FEC. This indicates that DTD is an important additive for increasing lifetime of the battery systems of the current invention. In addition to DTD, other sulfur-containing compounds can function in a similar manner and increase battery lifetime.

Methyl Acetate As Electrolyte Solvent: In certain embodiments, methyl acetate is used as a solvent (in concentrations of up to 60%) to improve battery-system lifetime when higher charging and discharging rates are expected as well as other properties. This is particularly important for vehicle and other applications. FIGS. 9A-I illustrate typical data collected during some of the ultra-high-precision-charging experiments that show that methyl acetate can be added to electrolyte systems containing VC or FEC with DTD to increase electrolyte conductivity and lower viscosity without sacrificing much lifetime. Increasing conductivity and decreasing viscosity is important for certain applications requiring a faster rate of charge.

FIG. 9A illustrates coulombic efficiency (CE) versus cycle number for electrolyte systems including 2% FEC in a base electrolyte of 1.2M LiPF$_6$ in 30% ethylene carbonate and 70% ethyl methyl carbonate; 2% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate.

FIG. 9B illustrates the capacity of the charge endpoint plotted versus cycle number for electrolyte systems including 2% FEC in a base electrolyte of 1.2M LiPF$_6$ in 30% ethylene carbonate and 70% ethyl methyl carbonate; 2% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate.

FIG. 9C illustrates the discharge capacity versus cycle number for electrolyte systems including 2% FEC in a base electrolyte of 1.2M LiPF$_6$ in 30% ethylene carbonate and 70% ethyl methyl carbonate; 2% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate.

FIG. 9D illustrates the difference between average charge voltage and average discharge voltage versus cycle number for electrolyte systems including 2% FEC in a base electrolyte of 1.2M LiPF$_6$ in 30% ethylene carbonate and 70% ethyl methyl carbonate; 2% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate.

FIG. 9F illustrates coulombic efficiency (CE) versus cycle number for electrolyte systems including 2% VC in a base electrolyte of 1.2M LiPF$_6$ in 30% ethylene carbonate and 70% ethyl methyl carbonate; 2% VC+1% DTD in a base electrolyte of 1.2M LiPF$_6$ in 30% ethylene carbonate and 70% ethyl methyl carbonate; 2% VC in a base electrolyte of 1.2M LiPF$_6$ in 24% ethylene carbonate, 56% ethyl methyl carbonate, and 20% methyl acetate; 2% VC+1% DTD in a base electrolyte of 1.2M LiPF$_6$ in 24% ethylene carbonate, 56% ethyl methyl carbonate, and 20% methyl acetate; 2% VC in a base electrolyte of 1.2M LiPF$_6$ in 18% ethylene carbonate, 42% ethyl methyl carbonate, and 40% methyl acetate; and 2% VC+1% DTD in a base electrolyte of 1.2M LiPF$_6$ in 18% ethylene carbonate, 42% ethyl methyl carbonate, and 40% methyl acetate.

FIG. 9G illustrates the capacity of the charge endpoint plotted versus cycle number for electrolyte systems including 2% VC in a base electrolyte of 1.2M LiPF$_6$ in 30% ethylene carbonate and 70% ethyl methyl carbonate; 2% VC+1% DTD in a base electrolyte of 1.2M LiPF$_6$ in 30% ethylene carbonate and 70% ethyl methyl carbonate; 2% VC in a base electrolyte of 1.2M LiPF$_6$ in 24% ethylene carbonate, 56% ethyl methyl carbonate, and 20% methyl acetate; 2% VC+1% DTD in a base electrolyte of 1.2M LiPF$_6$ in 24% ethylene carbonate, 56% ethyl methyl carbonate, and 20% methyl acetate; 2% VC in a base electrolyte of 1.2M LiPF$_6$ in 18% ethylene carbonate, 42% ethyl methyl carbonate, and 40% methyl acetate; and 2% VC+1% DTD in a base electrolyte of 1.2M LiPF$_6$ in 18% ethylene carbonate, 42% ethyl methyl carbonate, and 40% methyl acetate.

FIG. 9H illustrates the discharge capacity versus cycle number for electrolyte systems including 2% VC in a base electrolyte of 1.2M LiPF$_6$ in 30% ethylene carbonate and 70% ethyl methyl carbonate; 2% VC+1% DTD in a base electrolyte of 1.2M LiPF$_6$ in 30% ethylene carbonate and 70% ethyl methyl carbonate; 2% VC in a base electrolyte of 1.2M LiPF$_6$ in 24% ethylene carbonate, 56% ethyl methyl carbonate, and 20% methyl acetate; 2% VC+1% DTD in a base electrolyte of 1.2M LiPF$_6$ in 24% ethylene carbonate, 56% ethyl methyl carbonate, and 20% methyl acetate; 2% VC in a base electrolyte of 1.2M LiPF$_6$ in 18% ethylene carbonate, 42% ethyl methyl carbonate, and 40% methyl acetate; and 2% VC+1% DTD in a base electrolyte of 1.2M LiPF$_6$ in 18% ethylene carbonate, 42% ethyl methyl carbonate, and 40% methyl acetate.

FIG. 9I illustrates the difference between average charge voltage and average discharge voltage versus cycle number for electrolyte systems including 2% VC in a base electrolyte of 1.2M LiPF$_6$ in 30% ethylene carbonate and 70% ethyl methyl carbonate; 2% VC+1% DTD in a base electrolyte of 1.2M LiPF$_6$ in 30% ethylene carbonate and 70% ethyl methyl carbonate; 2% VC in a base electrolyte of 1.2M LiPF$_6$ in 24% ethylene carbonate, 56% ethyl methyl carbonate, and 20% methyl acetate; 2% VC+1% DTD in a base electrolyte of 1.2M LiPF$_6$ in 24% ethylene carbonate, 56% ethyl methyl carbonate, and 20% methyl acetate; 2% VC in a base electrolyte of 1.2M LiPF$_6$ in 18% ethylene carbonate, 42% ethyl methyl carbonate, and 40% methyl acetate; and 2% VC+1% DTD in a base electrolyte of 1.2M LiPF$_6$ in 18% ethylene carbonate, 42% ethyl methyl carbonate, and 40% methyl acetate.

FIGS. 9A-I show that in systems that include both VC and FEC, the addition of MA as an electrolyte solvent does not significantly sacrifice the overall performance of the battery system and as the long-term-cycling and plating experiments to be described later will show, it increases lifetime under higher charging rates. In particular, the performance of the two-additive electrolyte systems of the present disclosure are not sacrificed with the addition of MA as a solvent. FIGS. 10A-C show the average of three last cycles of data generated during the experiments shown in FIGS. 9A-I. FIGS. 10A-C confirm that the addition of MA as an electrolyte solvent does not significantly sacrifice the overall performance of the battery systems of the present disclosure that include two-additive electrolyte systems.

Long Term Cycling

Lifetime of a battery system is an important property of a battery system. Charging and discharging rates can affect lifetime. Long term cycling experiments help determine how resilient battery systems are over time under anticipated operation conditions. It is important to select battery systems that have sufficient lifetimes for the desired application.

Embodiments of the present disclosure exhibit desirable long term cycling for different applications, including grid and vehicle storage. Specifically, two-additive electrolyte systems of VC+DTD and FEC+DTD in which MA, in concentrations of up to 60%, is used as a solvent are particularly relevant for automobile applications (especially energy storage within an electric vehicle) in which charging and discharging rates are typically higher than for grid-storage applications.

In the long-term-cycling experiments, single-crystal NMC532 was typically used as the positive electrode (unless otherwise specified) and artificial graphite was used as the negative electrode (unless otherwise specified). Before the long term cycling experiments, pouch cells were subjected to the formation process. The cells were first charged at 11 mA (C/20) to 4.2 V and discharged to 3.8 V. Cells were transferred and moved into the glove box, cut open to release gas generated and then vacuum sealed again. After formation, cells were cycled on a Neware charging systems. Cells were housed in a temperature controlled box at 40° C.+/−0.2° C. or 20° C.+/−0.2° C. The cells were cycled between 3.0 V and the top of charge (4.2 V or 4.3 V) with a current of C/3 (half cycle of 3 h) and a constant voltage step at the top of charge until the current dropped below C/20. Every 50 cycles, cells underwent one full cycle at C/20.

Figure 6A:
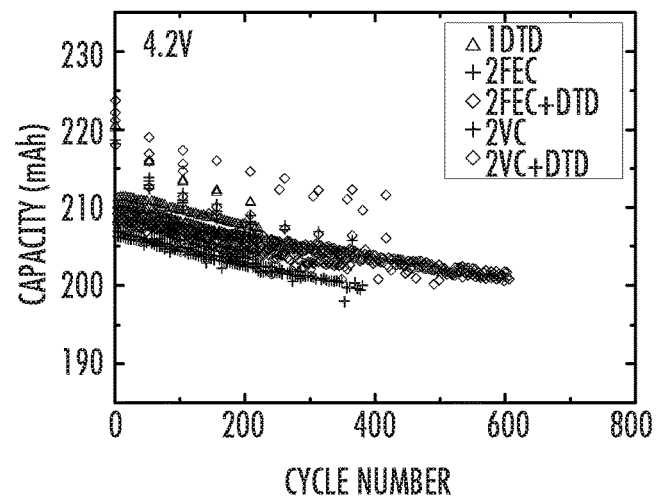
FIGS. 6A-F illustrate typical experimental data studying long term cycling at 40° C., C/3 CCCV showing the advantage of including DTD as an additive to an electrolyte system containing VC or FEC.
Figure 6B:
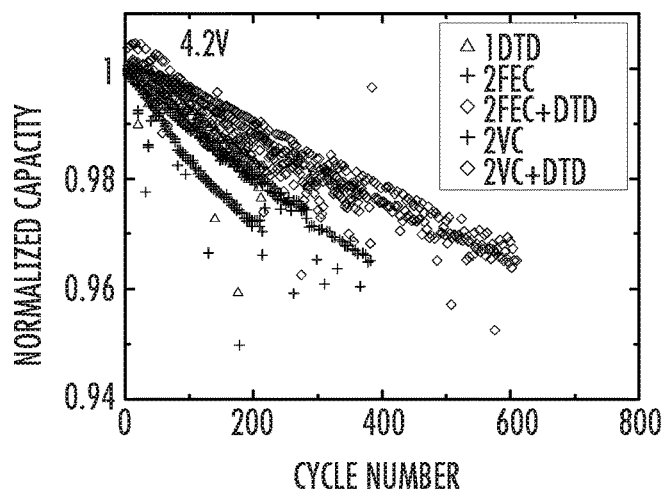
Figure 6C:
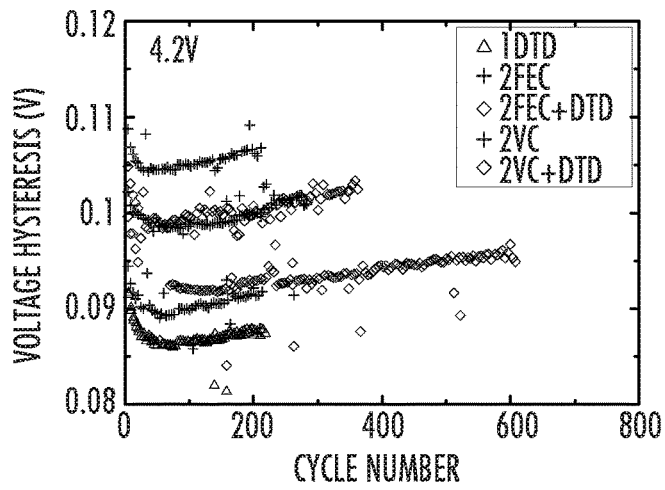
Figure 6D:
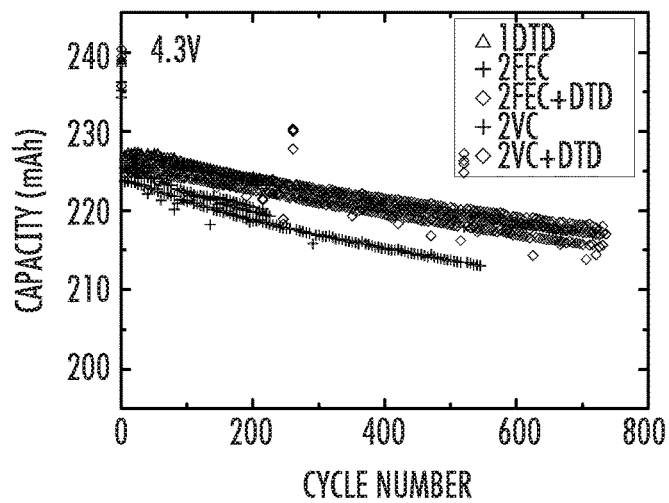
Figure 6E:
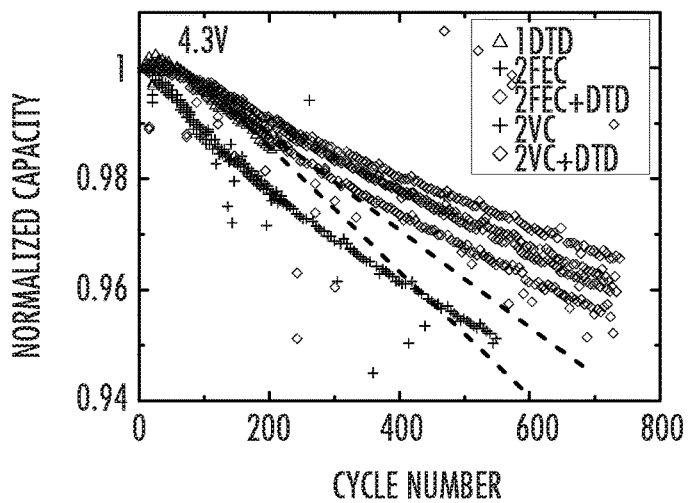
Figure 6F:
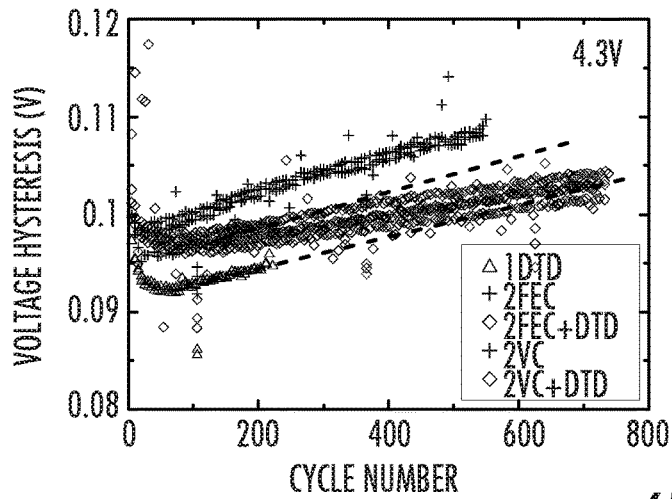

Two-Electrolyte Systems With FEC Or VC As Additive: In certain embodiments, two-additive electrolyte systems, the concentration of each additive about 0.25-6%, form part of the battery system. FIGS. 6A-F illustrate typical experimental data studying long term cycling at 40° C., and a C/3 constant charge, constant voltage (CCCV) charging rate. FIGS. 6A-F illustrate the advantage of two-additive electrolyte systems of the present disclosure, specifically, electrolytes that include DTD with VC or FEC. FIG. 6A shows experimental data of capacity versus cycle number for electrolyte systems including 1% DTD, 2% FEC, 2% FEC+1% DTD, 2% VC, and 2% VC+1% DTD, cycling between 3.0 V and 4.2 V. FIG. 6B shows experimental data of normalized capacity versus cycle number for electrolyte systems including 1% DTD, 2% FEC, 2% FEC+1% DTD, 2% VC, and 2% VC+1% DTD, cycling between 3.0 V and 4.2 V. FIG. 6C shows experimental data of voltage hysteresis (difference between average charge voltage and average discharge voltage) versus cycle number for electrolyte systems including 1% DTD, 2% FEC, 2% FEC+1% DTD, 2% VC, and 2% VC+1% DTD, cycling between 3.0 V and 4.2 V. FIG. 6D shows experimental data of capacity versus cycle number for electrolyte systems including 1% DTD, 2% FEC, 2% FEC+1% DTD, 2% VC, and 2% VC+1% DTD, cycling between 3.0 V and 4.2 V. FIG. 6E shows experimental data of normalized capacity versus cycle number for electrolyte systems including 1% DTD, 2% FEC, 2% FEC+1% DTD, 2% VC, and 2% VC+1% DTD, cycling between 3.0 V and 4.2 V. FIG. 6F shows experimental data of voltage hysteresis versus cycle number for electrolyte systems including 1% DTD, 2% FEC, 2% FEC+1% DTD, 2% VC, and 2% VC+1% DTD, cycling between 3.0 V and 4.2 V. The experimental data shows that the two-additive electrolyte systems (DTD+FEC and DTD+VC) experience less capacity loss when cycling to 4.2 or 4.3 V and also lower polarization growth compared to the single additive electrolyte systems of VC or FEC.

Figure 7A:
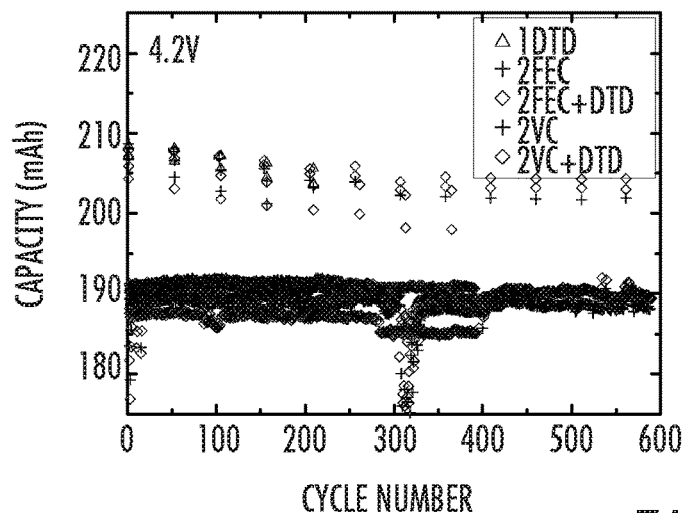
FIGS. 7A-F illustrate typical experimental data studying long term cycling at 20° C., C/3 CCCV showing the advantage of including DTD as an additive to an electrolyte system containing VC or FEC.
Figure 7B:
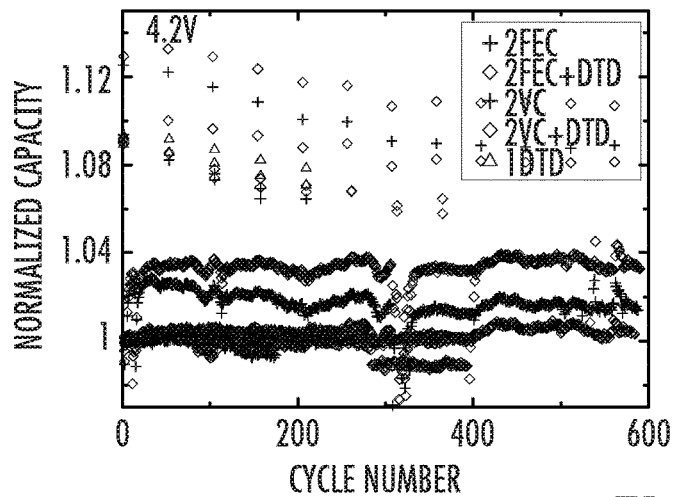
Figure 7C:
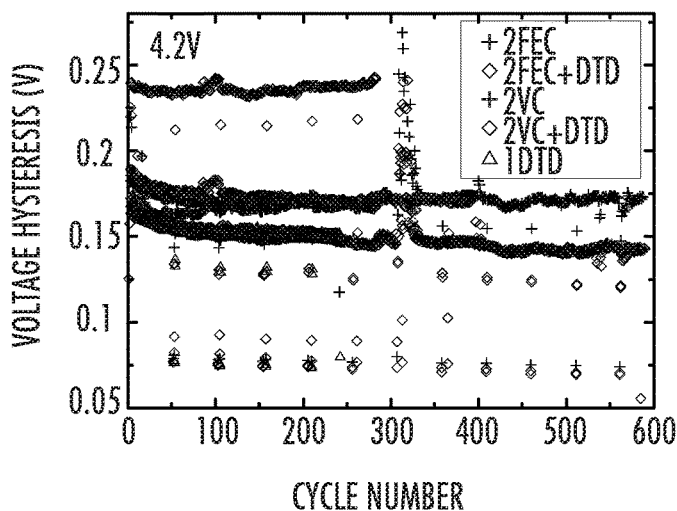
Figure 7D:
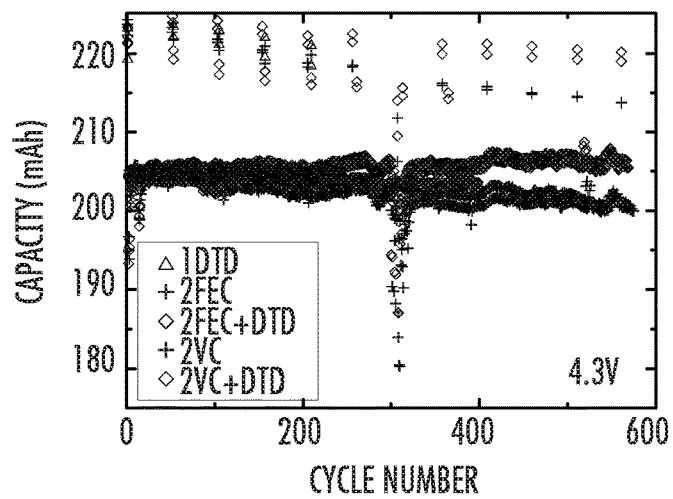
Figure 7E:
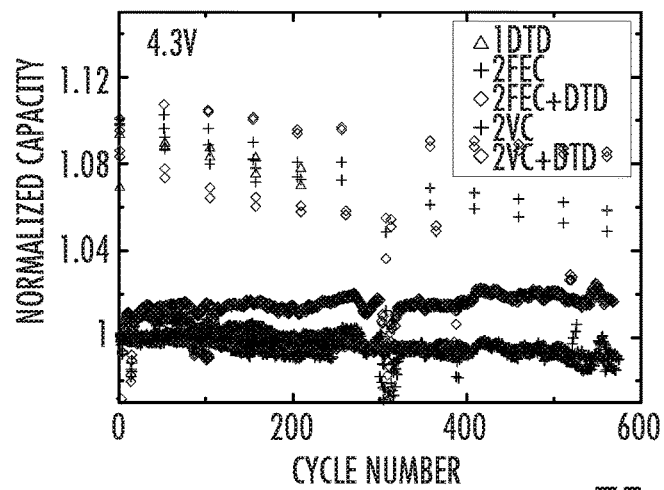
Figure 7F:
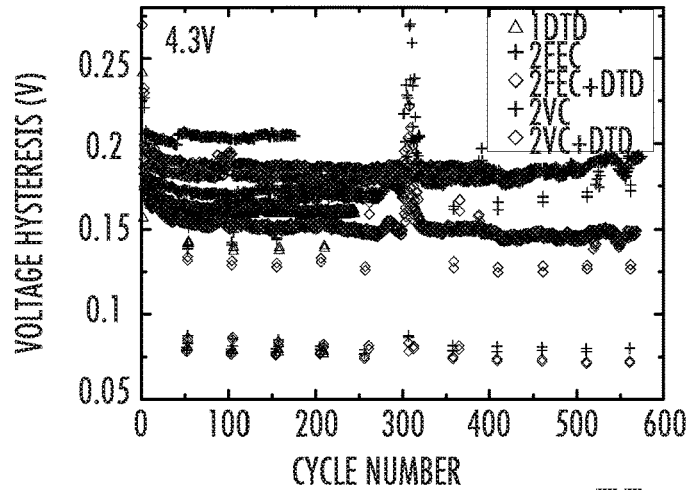

FIGS. 7A-F illustrate typical experimental data studying long term cycling at 20° C., C/3 CCCV charging rate. Similar to FIGS. 6A-F, FIGS. 7A-F illustrate the advantage of including DTD as an additive to an electrolyte system containing VC or FEC. FIGS. 7A-F confirm that the advantages seen at 40° C. are still present at lower temperatures, 20° C. in this case. FIG. 7A shows experimental data of capacity versus cycle number for electrolyte systems including 1% DTD, 2% FEC, 2% FEC+1% DTD, 2% VC, and 2% VC+1% DTD, cycling between 3.0 V and 4.3 V. FIG. 7B shows experimental data of normalized capacity versus cycle number for electrolyte systems including 1% DTD, 2% FEC, 2% FEC+1% DTD, 2% VC, and 2% VC+1% DTD, cycling between 3.0 V and 4.3 V. FIG. 7C shows experimental data of voltage hysteresis (difference between average charge voltage and average discharge voltage) versus cycle number for electrolyte systems including 1% DTD, 2% FEC, 2% FEC+1% DTD, 2% VC, and 2% VC+1% DTD, cycling between 3.0 V and 4.3 V. FIG. 7D shows experimental data of capacity versus cycle number for electrolyte systems including 1% DTD, 2% FEC, 2% FEC+1% DTD, 2% VC, and 2% VC+1% DTD, cycling between 3.0 V and 4.3 V. FIG. 7E shows experimental data of normalized capacity versus cycle number for electrolyte systems including 1% DTD, 2% FEC, 2% FEC+1% DTD, 2% VC, and 2% VC+1% DTD, cycling between 3.0 V and 4.3 V. FIG. 7F shows experimental data of voltage hysteresis (difference between average charge voltage and average discharge voltage) versus cycle number for electrolyte systems including 1% DTD, 2% FEC, 2% FEC+1% DTD, 2% VC, and 2% VC+1% DTD, cycling between 3.0V and 4.3V. FIGS. 7A-F confirm the advantages of including DTD in the electrolyte with VC or FEC, especially when cycling occurs up to 4.3 V.

FIGS. 6A-F illustrate the benefits of two-additive electrolyte systems consisting of DTD+VC or DTD+FEC. FIGS. 6A-F show that the inclusion of DTD with VC or FEC as part of a two-additive electrolyte system and cycling at 40° C., leads to less capacity loss at 4.2 and 4.3 V and lowers polarization growth. Similarly, FIGS. 7A-F shows the benefits of DTD when long-term cycling at 20° C. FIGS. 7A-F show that the inclusion of DTD with VC or FEC as part of a two-additive electrolyte system and cycling at 20° C., leads to less capacity loss at 4.2 V (slightly) and 4.3 V (more significantly) and lowers polarization growth. Thus, at either 20° C. or 40° C., two-additive systems including DTD with VC or FEC improves the battery system by reducing the capacity loss and lowering the polarization growth.

In certain embodiments, the positive electrode is formed from NMC111, NMC532, NMC822, NMC622, and/or NMCxyz. In particular, positive electrodes made from single-crystal NMC532 have been shown to be particularly robust, in part because the grain size of NMC532 is larger than the grain size of other standard NMC materials that are more polycrystalline, having smaller grain sizes. FIGS. 8A-I shows typical experiential data collected during cycling experiments for electrolyte compositions according to certain embodiments of the present disclosure that include a positive electrode formed from single-crystal NMC532. FIG. 8A shows experimental data of peak capacity versus cycle number for electrolyte systems including 2% FEC, 1% FEC+1% DTD, 2% FEC+1% DTD, 1% FEC+1% MMDS, and 2% FEC+1% MMDS, cycling between 3.0 V and 4.3 V at 40° C. in a base electrolyte of 1.2M LiPF$_6$ in 30% ethylene carbonate and 70% ethyl methyl carbonate. FIG. 8B shows experimental data of normalized capacity versus cycle number for electrolyte systems including 2% FEC, 1% FEC+1% DTD, 2% FEC+1% DTD, 1% FEC+1% MMDS, and 2% FEC+1% MMDS, cycling between 3.0 V and 4.3 V at 40° C. in a base electrolyte of 1.2M LiPF$_6$ in 30% ethylene carbonate and 70% ethyl methyl carbonate. FIG. 8C shows experimental data of voltage hysteresis (difference between average charge voltage and average discharge voltage) versus cycle number for electrolyte systems including 2% FEC, 1% FEC+1% DTD, 2% FEC+1% DTD, 1% FEC+1% MMDS, and 2% FEC+1% MMDS, cycling between 3.0 V and 4.3 V at 40° C. in a base electrolyte of 1.2M LiPF$_6$ in 30% ethylene carbonate and 70% ethyl methyl carbonate. FIG. 8D shows experimental data of peak capacity versus cycle number for electrolyte systems including 2% VC, 1% VC+1% DTD, 2% VC+1% DTD, 1% VC+1% MMDS, and 2% VC+1% MMDS, cycling between 3.0 V and 4.3 V at 40° C. in a base electrolyte of 1.2M LiPF$_6$ in 30% ethylene carbonate and 70% ethyl methyl carbonate. FIG. 8E shows experimental data of normalized capacity versus cycle number for electrolyte systems including 2% VC, 1% VC+1% DTD, 2% VC+1% DTD, 1% VC+1% MMDS, and 2% VC+1% MMDS, cycling between 3.0 V and 4.3 V at 40° C. in a base electrolyte of 1.2M LiPF$_6$ in 30% ethylene carbonate and 70% ethyl methyl carbonate. FIG. 8F shows experimental data of voltage hysteresis (difference between average charge voltage and average discharge voltage) versus cycle number for electrolyte systems including 2% FEC, 1% VC+1% DTD, 2% VC+1% DTD, 1% VC+1% MMDS, and 2% VC+1% MMDS, cycling between 3.0 V and 4.3 V at 40° C. in a base electrolyte of 1.2M LiPF$_6$ in 30% ethylene carbonate and 70% ethyl methyl carbonate by weight. FIG.

8G shows experimental data of peak capacity versus cycle number for electrolyte systems including 2% PES, 1% PES+1% DTD, 2% PES+1% DTD, 1% PES+1% MMDS, and 2% PES+1% MMDS, cycling between 3.0 V and 4.3 V at 40° C. in a base electrolyte of 1.2M LiPF$_6$ in 30% ethylene carbonate and 70% ethyl methyl carbonate. FIG. 8H shows experimental data of normalized capacity versus cycle number for electrolyte systems including 2% PES, 1% PES+1% DTD, 2% PES+1% DTD, 1% PES+1% MMDS, and 2% PES+1% MMDS, cycling between 3.0 V and 4.3 V at 40° C. in a base electrolyte of 1.2M LiPF$_6$ in 30% ethylene carbonate and 70% ethyl methyl carbonate. FIG. 8I shows experimental data of voltage hysteresis (difference between average charge voltage and average discharge voltage) for electrolyte systems including 2% FEC, 1% PES+1% DTD, 2% PES+1% DTD, 1% PES+1% MMDS, and 2% PES+1% MMDS, cycling between 3.0 V and 4.3 V at 40° C. in a base electrolyte of 1.2M LiPF$_6$ in 30% ethylene carbonate and 70% ethyl methyl carbonate. FIGS. 8A-I illustrate that NMC532 performs well with two-additive electrolyte systems of 1% DTD with 1% VC, 2% VC, 1% FEC, or 2 FEC. DTD performed better as an additive with VC or FEC than did MMDS.

Methyl Acetate As Electrolyte Solvent: In certain embodiments, methyl acetate is used as an electrolyte solvent, in concentrations up to 60% (by weight) and generally in combination with ethylene carbonate and/or ethyl methyl carbonate. FIGS. 15A-F and 16A-F shows the results of experiments run at 20° C. and 40° C., respectively. Cells with DTD performed better than cells without DTD in cells containing MA as a solvent.

FIG. 15A is a plot of experimental data taken at 20° C. of capacity versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.2 V.

FIG. 15B is a plot of experimental data taken at 20° C. of normalized capacity versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.2 V.

FIG. 15C is a plot of experimental data taken at 20° C. of voltage hysteresis (difference between average charge voltage and average discharge voltage) versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.2 V.

FIG. 15D is a plot of experimental data taken at 20° C. of capacity versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.3 V.

FIG. 15E is a plot of experimental data taken at 20° C. of normalized capacity versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.3 V.

FIG. 15F is a plot of experimental data taken at 20° C. of voltage hysteresis (difference between average charge voltage and average discharge voltage) versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.3 V.

FIGS. 15A-F illustrates the importance of DTD in systems containing FEC and systems that use MA as a solvent at 20° C. Cells with DTD performed better than cells without DTD, especially in the cells that contained MA. In particular, 2% FEC+1% DTD with 20% MA solvent shows very stable capacity retention at 4.3 V.

FIGS. 16A-F shows the results of experiments run at 40° C. Cells with DTD performed better than cells without DTD in cells containing MA. FIG. 16A is a plot of experimental data taken at 40° C. of capacity versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.2 V.

FIG. 16B is a plot of experimental data taken at 40° C. of normalized capacity versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.2 V.

FIG. 16C is a plot of experimental data taken at 40° C. of voltage hysteresis (difference between average charge voltage and average discharge voltage) versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.2 V.

FIG. 16D is a plot of experimental data taken at 40° C. of capacity versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.3 V.

FIG. 16E is a plot of experimental data taken at 40° C. of normalized capacity versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.3 V.

FIG. 16F is a plot of experimental data taken at 40° C. of voltage hysteresis (difference between average charge voltage and average discharge voltage) versus cycle number for electrolyte systems including 2% FEC in a base electrolyte of 1.2M LiPF$_6$ in 30% ethylene carbonate and 70% ethyl methyl carbonate; 1% FEC+1% DTD in a base electrolyte of 1.2M LiPF$_6$ in 30% ethylene carbonate and 70% ethyl methyl carbonate; 2% FEC in a base electrolyte of 1.2M LiPF$_6$ in 24% ethylene carbonate, 56% ethyl methyl carbonate, and 20% methyl acetate; 2% FEC+1% DTD in a base electrolyte of 1.2M LiPF$_6$ in 24% ethylene carbonate, 56% ethyl methyl carbonate, and 20% methyl acetate; 2% FEC in a base electrolyte of 1.2M LiPF$_6$ in 18% ethylene carbonate, 42% ethyl methyl carbonate, and 40% methyl acetate; and 2% FEC+1% DTD in a base electrolyte of 1.2M LiPF$_6$ in 18% ethylene carbonate, 42% ethyl methyl carbonate, and 40% methyl acetate with cycling up to 4.3 V.

FIGS. 16A-F illustrates the importance of DTD in systems containing FEC and systems that use MA as a solvent at 40° C. Generally, cells with DTD performed better than cells without DTD, especially in the cells that contained MA. In the two-additive electrolyte system with 2% FEC+1% DTD with 20% MA solvent, the impact of the DTD is a bit muted compared to the same-two additive electrolyte system, but without MA as a solvent. Further, the addition of up to 40% MA at 4.3 V reduces the cycle life. That is, DTD and MA can have a symbiotic increase of the performance of the two-additive electrolyte system, but this increase is muted when operating on cycles up to 4.3 V. Thus, in certain embodiments of this present disclosure, the electrolyte system only operates up to 4.2 V. In other embodiments of the present disclosure, the electrolyte system operates up to 4.3 V, but with a MA concentration of less than 40%.

NMC622 As Positive Electrode: In certain embodiments, the battery systems have a positive electrode made from NMC622. In certain embodiments, the positive electrode is coated with a material such as aluminum oxide ($Al_2O_3$), titanium dioxide ($TiO_2$), or another coating. FIGS. 17A-F shows experimental data for long term cycling of one- and two-additive electrolyte systems with a coated NMC622 as the positive electrode at 40° C., C/3 CCCV. The dashed lines are extrapolated from the experimental data.

More specifically, FIG. 17A is a plot of experimental data of capacity versus cycle number for electrolyte systems that contain FEC and/or DTD with cycling up to 4.3 V. FIG. 17B is a plot of experimental data of normalized capacity versus cycle number for electrolyte systems that contain FEC and/or DTD with cycling up to 4.3 V. FIG. 17C is a plot of experimental data of voltage hysteresis (difference between average charge voltage and average discharge voltage) versus cycle number for electrolyte systems that contain FEC and/or DTD with cycling up to 4.3 V. FIG. 17D is a plot of experimental data of capacity versus cycle number for electrolyte systems that contain VC and/or DTD with cycling up to 4.3 V. FIG. 17E is a plot of experimental data of normalized capacity versus cycle number for electrolyte systems that contain VC and/or DTD with cycling up to 4.3 V. FIG. 17F is a plot of experimental data of voltage hysteresis (difference between average charge voltage and average discharge voltage) versus cycle number for electrolyte systems that contain VC and/or DTD with cycling up to 4.3 V.

FIGS. 17A-F illustrate that even when a different positive electrode is chosen, the experimental data shows that an electrolyte system with two additives—VC+DTD and FEC+DTD—performs superior to any single additive of VC, FEC, or DTD.

Natural Graphite As Negative Electrode: In certain embodiments, the battery systems have negative electrode made from natural graphite. FIGS. 18A-B and 19 show data from additional long-term cycling experiments carried out using single-crystal NMC532 as the positive electrode and natural graphite as the negative electrode at 40° C., C/3 CCCV. FIG. 18A shows capacity plotted versus cycle number. FIG. 18B shows normalized capacity plotted versus cycle number. FIG. 19 shows voltage hysteresis (difference between average charge voltage and average discharge voltage) versus cycle number. FIGS. 18A-B and 19 illustrate that the two-electrolyte additive system, including DTD+FEC improves performance over an electrolyte system that only includes FEC as an additive, but comparisons to FIGS. 6-F in which an artificial-graphite negative electrode was used, suggests that the performance of this specific artificial-graphite negative electrode outperforms this specific natural-graphite negative electrode in the two-additive electrolyte systems of the present disclosure.

In certain embodiments, the battery system has a natural graphite negative electrode. Using natural graphite as the negative electrode is important as a cost savings measure over artificial graphite, which is typically more expensive. Thus, when cost is the primary driver and some performance tradeoffs may be made, natural graphite may be a good choice.

Microcalorimetry Measurements

Microcalorimetry measures heat flow to the cell during operation. The heat flow to the cell is a combination of three different effects: (1) ohmic heating, (2) entropy changes due to Li intercalating in the electrodes, and (3) parasitic reactions (electrolyte, including additive, degradation at either electrode). Because the test cells contain the same physical design, different only in the electrolyte, the difference in heat flow is primarily due to the differences in parasitic heat flow. Nevertheless, the parasitic heat flow can be extracted from the total heat flow using the procedures developed by Downie et al. (*Journal of the Electrochemical Society*, 161, A1782-A1787 (2014)) and by Glazier et al. (*Journal of the Electrochemical Society*, 164 (4) A567-A573 (2017)). Both of these references are incorporated herein in their entirety. Cells that have lower parasitic heat flow during cycling have better lifetimes. The voltage dependence of the parasitic reaction rate may be observed by plotting the measured parasitic heat flow as a function of cell voltage.

Microcalorimetry Measurement Procedure: Two cells of each electrolyte were connected to a Maccor charger and inserted into a TAMIII Microcalorimeter (TA Instruments, stability +/−0.0001° C., accuracy +/−1 μW, precision +/−1 nW) at 40.0° C. The baseline drift over the course of the experiments did not exceed +/−0.5 μW. All specifications and information regarding microcalorimetry calibration, cell connections, and operation procedures can be found in previous literature. (For example, Downie et al, *ECS Electrochemical Letters* 2, A106-A109 (2013).) Cells were cycled four times at a C/20 rate between 3.0 V and 4.2 V to ensure well-formed, stable SEIs and were then charged between 4.0 V and different upper cut off limits at 1 mA to investigate the performance and the parasitic heat flow in different voltage ranges. Each pair of cells yielded near identical performance, so only one set of heat flow data is presented for each electrolyte.

The 1 mA cycling protocol was:

1. Charge to 4.2 V, discharge to 4.0 V
2. Charge to 4.3 V, discharge to 4.0 V (repeat)
3. Charge to 4.4 V, discharge to 4.0 V (repeat)
6. Charge to 4.2 V, discharge to 4.0 V Additional experimental detail is described in the *Journal of the Electrochemical Society*, 164 (4) A567-A573 (2017), which is incorporated herein by reference in its entirety.

In the experimental data shown in FIGS. 11-14, pouch cells with a positive electrode made from single-crystal NMC532 and an artificial-graphite negative electrode were used. Excluding additives, the electrolyte was either (1) 1.2M $LiPF_6$ in 30% ethylene carbonate and 70% ethyl methyl carbonate, (2) 1.2M $LiPF_6$ in 24% ethylene carbonate, 56% ethyl methyl carbonate, and 20% methyl acetate; or (3) 1.2M $LiPF_6$ in 18% ethylene carbonate, 42% ethyl methyl carbonate, and 40% methyl acetate, depending on the concentration of methyl acetate (0, 20, or 40%).

FIG. 11 shows experimental data of calorimetry experiments (parasitic heat flow versus voltage) when charging to 4.2 V. FIGS. 12A and B show experimental data of calorimetry experiments (parasitic heat flow versus voltage) when charging to 4.3 V. Since the charging to 4.3 V was repeated, each plot shows the results of the one charging. FIGS. 13A and B show experimental data (parasitic heat flow versus voltage) when charging to 4.4 V. Since the charging to 4.4V was repeated, each plot shows the results of the one charging. The plot of the difference (lower plot in FIGS. 11, 12A, 12B, 13A, and 13B) is calculated by taking the heat flow for each electrolyte mixture and subtracting the heat flow produced by the control (2% FEC). FIG. 14 shows a summary of the experimental data conveyed in FIGS. 11-13. Table 1 summarizes the data displayed in FIG. 14 in tabular form.

TABLE 1

Average Parasitic Heat Flow per Cycle (μW)
(40.° C., 4.0 V to UCV, 1 mA)

| Upper Cut Off Voltage | 2 FEC | Error | 20 MA + 2 FEC | Error | 40 MA + 2 FEC | Error |
|---|---|---|---|---|---|---|
| 4.2 | 70.4 | 0.2 | 82 | 3 | 94 | 2 |
| 4.3 | 60.9 | 0.1 | 75 | 3 | 93 | 1 |
| 4.3 | 41.00 | 0.07 | 54 | 2 | 69.6 | 0.9 |
| 4.4 | 53.7 | 0.2 | 73 | 3 | 95 | 1 |
| 4.4 | 38.3 | 0.3 | 54 | 3 | 74.5 | 0.7 |
| 4.2 | 27.1 | 0.6 | 36 | 2 | 46.3 | 0.5 |

TABLE 1-continued

Average Parasitic Heat Flow per Cycle (µW)
(40.° C., 4.0 V to UCV, 1 mA)

|  | 2 FEC 1 DTD | Error | 20 MA + 2 FEC 1 DTD | Error | 40 MA + 2 FEC 1 DTD | Error |
|---|---|---|---|---|---|---|
| 4.2 | 63.9 | 0.2 | 69.7 | 0.3 | 77.3 | 0.3 |
| 4.3 | 54.7 | 0.3 | 64.9 | 0.7 | 76.95 | 0.07 |
| 4.3 | 36.8 | 0.2 | 46.5 | 0.3 | 58.6 | 0.1 |
| 4.4 | 48.4 | 0.5 | 65.0 | 0.6 | 84.7 | 0.1 |
| 4.4 | 34.6 | 0.4 | 49.1 | 0.6 | 66.0 | 0.2 |
| 4.2 | 24.44 | 0.04 | 31.4 | 0.3 | 39.3 | 0.7 |

FIGS. 11-14 and Table 1 show that that adding DTD to FEC leads to lowers parasitic heat flow (lower parasitic reaction rate). FIGS. 11-14 and Table 1 also show that adding MA leads to higher parasitic heat flow (higher parasitic reaction rate), but this increase may be mitigated by DTD, which helps reduce the increased parasitic reaction rate from the addition of the MA.

Plating Experiments

Plating experiments test the ability to charge at a fast rate. Fast charging is very important in energy-storage when part of a vehicle, while slower charging rates may be acceptable in grid-storage applications. High rate charging is mainly limited by lithium plating on the negative electrode which leads to safety issues and diminishes cycle and calendar life. Electrolyte systems that allow higher charging rates without plating are thus advantageous. To study plating on the negative electrode, plating experiments were performed. Larger capacity loss indicates greater lithium plating.

Plating experiments were performed to test the charging ability of cells. After EIS measurements, cells were charged and discharged with constant currents (C-rates) of 1 C, 1.5 C, and 2.0 C between 2.8 and 4.1 V using a Maccor charger system at 20.0±0.1° C. Pair cells were tested for every charge rate to ensure reproducibility. In order to determine the active lithium loss during cycling, cells were cycled at C/20 one time before and after the high charge rate segments. The upper cutoff voltage was set to 4.1 V in order to minimize electrolyte oxidation at the positive electrode and to ensure that the cells were far from having a fully loaded negative electrode which would occur at 4.4 V for these cells. All pouch cells were cycled with external clamps to eliminate effects of small amounts of gas that may be produced during cycling. Cells were stopped after about 350 hours cycling or after the capacity loss reached 20%.

Two-Electrolyte Systems With FEC Or VC As Additive: In certain embodiments, two-additive electrolyte systems, the concentration of each additive at about 0.25-6%, form part of the battery system. FIG. 22 shows experimental data of the plating experiments for different battery systems at different current charging rates. FIG. 22 indicates that addition of DTD does not significantly increase the maximum current at which plating occurs. For example, the low rate capacity loss of the electrolyte system consisting of two additives-2% FEC+1% DTD—is decreased compared to the electrolyte system consisting of the single additive 2% FEC at 1C, 1.5C, and 2C. Similarly, FIG. 22 shows that the low rate capacity loss of the electrolyte system consisting of two additives-1% FEC+1% DTD—is decreased compared to the electrolyte system consisting of the single additive 2% FEC at 1C and 1.5C. It is also only slightly higher at 2C.

FIG. 23 shows experimental data from plating tests, in which after every 30 cycles, the charging current was increased. A large capacity loss rate indicates lithium plating. At a charging current of 2C, every cell began to plate lithium. However, cells with DTD lose less capacity during plating. This indicates that the amount of plating in cells with DTD is less than in cells without. In addition to DTD, other sulfur-containing compounds can function in a similar manner to decrease plating.

FIG. 24 shows the results of experimental data of peak capacity as a function of cycle number for different electrolyte systems. DTD performed better than MMDS in retaining the peak capacity of the two-additive electrolyte system when DTD or MMDS were combined with VC.

Methyl Acetate As Electrolyte Solvent: Methyl acetate, in concentrations of up to 60% by weight, is used as a solvent to reduce plating according to certain embodiments. FIGS. 27-34 illustrate the impact of using MA as a solvent in the presence of different electrolyte systems. FIG. 27 shows the results of plating experiments to determine the impact of MA as a solvent and the presence of DTD as an additive on the cell impedance. The electrolyte systems tested include 2% of an additive (VC, FEC, and PES) in an electrolyte with 0%, 20%, and 40% MA. The remaining electrolyte for 0% MA is 1.2M $LiPF_6$ in 30% ethylene carbonate and 70% ethyl methyl carbonate. The remaining electrolyte for 20% MA is 1.2M $LiPF_6$ in 24% ethylene carbonate and 56% ethyl methyl carbonate. The remaining electrolyte for 40% MA is 1.2M $LiPF_6$ in 18% ethylene carbonate and 42% ethyl methyl carbonate. FIG. 28 is an expanded view of certain data shown in in FIG. 27 that had a small low rate capacity loss.

In FIGS. 27 and 28, a larger capacity loss indicates greater lithium plating. FIGS. 27 and 28 show that the presence of MA decreases the low rate capacity loss, even at charging rates of 2C. Thus, electrolyte systems containing 20% or 40% of MA are good candidates for use in applications that fast charging, such as energy storage in a vehicle that may be subjected to high charging current rates.

FIGS. 29, 30, and 31 show the results of experimental data of electrolyte systems containing FEC as an additive. Different data sets include DTD and/or MA, as indicated by the legend in the figures. FIGS. 29, 30, and 31 show that the addition of MA to one- and two-additive electrolyte systems with FEC allows for higher charging rates, including charging up to 2 C, without significant plating.

Similarly, FIGS. 32, 33, and 34 show the results of experimental data of electrolyte systems containing VC as an additive. Different data sets include DTD and/or MA, as indicated by the legend in the figures. FIGS. 32, 33, and 34 show that the addition of MA to one- and two-additive electrolyte systems with VC allows for higher charging rates, including charging up to 2 C, without significant plating.

Gas Volume Measurements

The formation process is performed prior to cells being used in their intended application, such as grid storage or energy storage in an automobile, such as an electric vehicle. During formation, cells are subject to a precisely controlled charge and discharge cycle, which is intended to activate the electrodes and electrolyte for use in their intended application. During formation, gas is generated. If sufficient amounts of gas are generated (depending on the specific tolerances allowed by the cell and cell packaging), the gas may need to be released after the formation process and prior to application use. This typically requires the additional steps of breaking of a seal followed by a resealing. While these steps are common for many battery systems, it is desirable to remove them if possibly by choosing a system that produces less gas.

Gas volume experiments proceeded as follows: Ex-situ (static) gas measurements were used to measure gas evolution during formation and during cycling. The measurements were made using Archimedes' principle with cells suspended from a balance while submerged in liquid. The changes in the weight of the cell suspended in fluid, before and after testing are directly related to the volume changes by the change in the buoyant force. The change in mass of a cell, $\Delta m$, suspended in a fluid of density, $\rho$, is related to the change in cell volume, $\Delta v$, by $\Delta v = \Delta m / \rho$.

Two-Electrolyte Systems With FEC Or VC As Additive: In certain embodiments, two-additive electrolyte systems, the concentration of each additive about 0.25-6%, form part of the battery system. FIG. 20 shows the results of gas-generation experiments, in which the amount of gas generated was measured according to the procedure described above. FIG. 20 shows that systems without DTD typically performed better, for example a system containing only 2% FEC as an additive, performs better than 1% FEC+1% DTD and 2% FEC+1% DTD. That is, DTD leads to higher gas volume production during formation, if DTD is to be used as an additive because of its desirable properties when combined with other additives, for example VC and FEC, then the system must include a mechanism to safely deal with the gas produced by the DTD, such as gas release after formation as discussed above. FIG. 20 shows that two-additive electrolyte systems that include MMDS and PES or FEC do not produce much (if any) additional gas than when 2% PES or FEC is the only additive.

Methyl Acetate As Electrolyte Solvent: Methyl acetate, in concentrations of up to 60% by weight, is used as a solvent to reduce plating according to certain embodiments. FIG. 25 shows the results of gas-generation experiments to determine the impact of MA as a solvent and presence of DTD as an additive on the formation gas generated. The electrolyte systems tested include 2% of an additive (VC, FEC, and PES) in an electrolyte with 0%, 20%, and 40% MA. The remaining electrolyte for 0% MA is 1.2M LiPF$_6$ in 30% ethylene carbonate and 70% ethyl methyl carbonate. The remaining electrolyte for 20% MA is 1.2M LiPF$_6$ in 24% ethylene carbonate and 56% ethyl methyl carbonate. The remaining electrolyte for 40% MA is 1.2M LiPF$_6$ in 18% ethylene carbonate and 42% ethyl methyl carbonate.

FIG. 25 shows that in two-additive electrolyte systems that contain VC or FEC with DTD, the increase of the amount of gas with the addition of MA varies less as the amount of MA increases. That is, the marginal amount of gas generated is less when DTD is part of the two-additive electrolyte system compared to a one-additive electrolyte system that has only VC or FEC.

Cell Impedance

The two-additive electrolyte systems and novel battery systems disclosed herein have low cell impedance. Minimizing cell impedance is desirable since cell impedance decrease the energy efficiency of a cell. Conversely, low impedance leads to a higher charging rate and higher energy efficiency.

Cell impedance was measured using electrochemical impedance spectroscopy (EIS). The pouch cells used a single-crystal NMC532 positive electrode and an artificial negative electrode unless stated otherwise, with the EIS measurements performed after formation. Cells were charged or discharged to 3.80 V before they were moved to a 10.0+/−0.1° C. temperature box. AC impedance spectra were collected with ten points per decade from 100 kHz to 10 mHz with a signal amplitude of 10 mV at 10.0+/−0.1° C. From the measured AC impedance, the charge transfer resistance (R$_{ct}$) was calculated and plotted.

Two-Electrolyte Systems With FEC Or VC As Additive: In certain embodiments, two-additive electrolyte systems, the concentration of each additive about 0.25-6%, form part of the battery system. FIG. 21 shows experimental data of cell charge transfer impedance experiments for two-additive electrolyte systems consisting of 1% DTD with 1% or 2% of PES, FEC, or VC. FIG. 21 shows that these two-additive electrolyte systems of 1% DTD with 1% or 2% of PES, FEC, or VC do not significantly increase the cell charge transfer impendence. In particular, systems of 1% DTD with 1% VC, 1% DTD with 2% VC, 1% DTD with 1% FEC, and 1% DTD with 2% FEC exhibit cell impedance values similar to the cell charge transfer impendence observed for the single-additive systems with DTD excluded. Therefore, these novel two-additive electrolyte systems do not sacrifice significant charge transfer impedance performance by including DTD.

Methyl Acetate As Electrolyte Solvent: Methyl acetate, in concentrations of up to 60% by weight, is used as a solvent to reduce plating according to certain embodiments. FIG. 26 shows the results of cell-charge transfer impedance experiments on electrolyte systems consisting of one- and two-additive systems with MA as one of the solvents. The additive-electrolyte systems tested included 2% of additives VC, FEC, and PES without and without 1% DTD to show impact of the DTD and MA to the electrolyte system in an electrolyte solvent with 0%, 20%, and 40% MA. The electrolyte for 0% MA is 1.2M LiPF$_6$ in 30% ethylene carbonate and 70% ethyl methyl carbonate. The remaining electrolyte for 20% MA is 1.2M LiPF$_6$ in 24% ethylene carbonate and 56% ethyl methyl carbonate. The remaining electrolyte for 40% MA is 1.2M LiPF$_6$ in 18% ethylene carbonate and 42% ethyl methyl carbonate. FIG. 26 shows that DTD produces only slight increases in charge transfer impedance. Further, in two-additive electrolyte systems that contain VC or FEC with DTD, the addition of MA decreases cell charge transfer impedance. At 40% MA solvent, the VC+DTD and FEC+DTD systems showed reduced charge transfer impedance from the corresponding systems without DTD and no MA as a solvent. In the PES+DTD two-additive electrolyte system, MA also reduced the charge transfer impedance of the system.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims. Reference to additives in the specification are generally to operative additives unless otherwise noted in the specification.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Reference to "about" or "approximately" is to be construed to mean plus or minus 10%. Similarly, reference to any percentage of an additive is construed to mean plus or minus 10%.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A nonaqueous electrolyte for a lithium ion battery comprising:
   a lithium salt consisting essentially of lithium hexafluorophosphate;
   a nonaqueous solvent system comprising methyl acetate and a carbonate solvent selected from the group consisting of ethylene carbonate (EC), ethyl methyl carbonate (EMC), dimethyl carbonate, and combinations thereof; and
   an additive mixture consisting essentially of a first operative additive selected from the group consisting of vinylene carbonate, fluoro ethylene carbonate and combinations thereof, and a second operative additive of 1,3,2-dioxathiolane-2,2-dioxide,
   wherein the first operative additive is at a concentration of about 0.25-6% by weight, and
   wherein the second operative additive is at a concentration of at most about 2% by weight.

2. The nonaqueous electrolyte of claim 1, wherein the nonaqueous electrolyte does not comprise additional additives.

3. The nonaqueous electrolyte of claim 1, wherein the nonaqueous solvent system comprises at least two carbonate solvents.

4. The nonaqueous electrolyte of claim 3, wherein the at least two carbonate solvents comprise ethylene carbonate (EC) and ethyl methyl carbonate (EMC).

5. The nonaqueous electrolyte of claim 1, wherein the nonaqueous electrolyte comprises less than 0.25 wt. % of tris(-trimethly-silyl)-phosphate.

6. The nonaqueous electrolyte of claim 1, wherein the nonaqueous electrolyte comprises less than 0.25 wt. % of tris(-trimethyl-silyl)-phosphite.

7. A lithium-ion battery comprising:
   a negative electrode;
   a positive electrode; and
   a nonaqueous electrolyte comprising a lithium salt consisting essentially of lithium hexafluorophosphate, dissolved in a first nonaqueous solvent comprising methyl acetate and a carbonate solvent selected from the group consisting of ethylene carbonate (EC), ethyl methyl carbonate (EMC), dimethyl carbonate, and combinations thereof, and an additive mixture-comprising:
      a first operative additive of vinylene carbonate, wherein a concentration of the first operative additive is in a range from 0.25 to 6% by weight;
      a second operative additive of 1,3,2-dioxathiolane-2,2-dioxide, wherein a concentration of the second operative additive is in a range from 0.25 to 6% by weight; and
      excluding an operative additive of 0.25% by weight or more of tris(-trimethly-silyl)-phosphate and tris(-trimethyl-silyl)-phosphite,
   wherein a concentration of the methyl acetate is in a range from 20-60% by weight, and
   wherein a concentration of the carbonate solvent is in a range from 30-80% by weight.

8. The lithium-ion battery of claim 7 wherein the nonaqueous electrolyte does not comprise a third operative additive.

9. The lithium-ion battery of claim 7 wherein the first nonaqueous solvent comprises at least two carbonate solvents.

10. The lithium-ion battery of claim 9 wherein the at least two carbonate solvents comprise ethylene carbonate (EC) and ethyl methyl carbonate (EMC).

11. The lithium-ion battery of claim 10 wherein the positive electrode comprises either NMC532 or NMC622, with a grain size of greater than 0.5 micrometers.

12. The lithium-ion battery of claim 11 wherein the positive electrode is coated with aluminum oxide or titanium dioxide.

13. The lithium-ion battery of claim 7 further comprising a second nonaqueous solvent of methyl acetate.

14. An electric vehicle with a rechargeable battery comprising:
   a drive motor;
   gear box;
   electronics; and
   a battery system comprising:
      a negative electrode;
      a positive electrode; and
      a nonaqueous electrolyte comprising:
         a lithium salt consisting essentially of lithium hexafluorophosphate;
         a first nonaqueous solvent comprising methyl acetate and a carbonate solvent selected from the group consisting of ethylene carbonate (EC), ethyl methyl carbonate (EMC), dimethyl carbonate, and combinations thereof;

a second nonaqueous solvent comprising methyl acetate; and an additive mixture consisting essentially of a first operative additive of selected from the group consisting of vinylene carbonate, fluoro ethylene carbonate and combinations thereof, and a second operative additive of 1,3,2-dioxathiolane-2,2-dioxide, wherein each of the first and second operative additive is at a concentration of about 0.25-6% by weight, wherein the positive electrode comprises either NMC532 or NMC622, with a grain size of greater than 0.5 micrometers, and wherein the battery system has 95% retention of initial capacity after 200 cycles between 3.0 V and 4.3 V at a charging rate of C/3 CCCV at 40° C.

15. The lithium-ion battery of claim 7 wherein the positive electrode comprises either NMC532 or NMC622, with a grain size of greater than 0.5 micrometers.

16. The lithium-ion battery of claim 15 wherein the battery has 95% retention of initial capacity after 200 cycles between 3.0 V and 4.3 V at a charging rate of C/3 CCCV at 40° C.

* * * * *

UNITED STATES PATENT AND TRADEMARK OFFICE
CERTIFICATE OF CORRECTION

| | |
|---|---|
| PATENT NO. | : 12,100,812 B2 |
| APPLICATION NO. | : 17/073176 |
| DATED | : September 24, 2024 |
| INVENTOR(S) | : Jeffery R. Dahn et al. |

It is certified that error appears in the above-identified patent and that said Letters Patent is hereby corrected as shown below:

On the Title Page

In Column 2, Line 4, item (56) under Other Publications, delete "liquid chromatography-andem quadrupole", and insert --liquid chromatography-tandem quadrupole--.

In the Drawings

On Sheet 15 of 36, Line 1, FIG 10B, delete "PER PER", and insert --PER--.

In the Specification

In Column 1, Line 64, delete "tris(-trimethly-silyl)-phosphate", and insert --tris(-trimethyl-silyl)- phosphate--.

In Column 6, Line 41, delete "FIG. 12A-B", and insert --FIGS. 12A-B--.

In Column 6, Line 48, delete "FIG. 13A-B", and insert --FIGS. 13A-B--.

In Column 10, Line 15, delete "may therefore may", and insert --may therefore--.

In Column 11, Line 65, delete "data. UPHC is", and insert --data. UHPC is--.

In Column 23, Line 66, delete "into a TAMIII Microcalorimeter", and insert --into a TAM III Microcalorimeter--.

In the Claims

In Column 30, Claim 5, Line 6, delete "tris(-trimethly-silyl)-phosphate.", and insert --tris(-trimethyl-silyl)- phosphate.--.

Signed and Sealed this
Seventh Day of January, 2025

Derrick Brent
*Acting Director of the United States Patent and Trademark Office*

CERTIFICATE OF CORRECTION (continued)
U.S. Pat. No. 12,100,812 B2

In Column 30, Claim 7, Line 29, delete "tris(-trimethly-silyl)-phosphate", and insert --tris(-trimethyl-silyl)- phosphate--.

In Column 31, Claim 16, Line 20, delete "claim 15 wherein", and insert --claim 15, wherein--.